(12) United States Patent
Tour et al.

(10) Patent No.: US 8,703,090 B2
(45) Date of Patent: Apr. 22, 2014

(54) METHODS FOR PREPARATION OF GRAPHENE NANORIBBONS FROM CARBON NANOTUBES AND COMPOSITIONS, THIN FILMS AND DEVICES DERIVED THEREFROM

(75) Inventors: James M. Tour, Bellaire, TX (US); Dmitry V. Kosynkin, Houston, TX (US); Amanda Higginbotham, Los Alamos, NM (US); Brandi Katherine Price, Houston, TX (US)

(73) Assignee: William Marsh Rice University, Houston, TX (US)

( * ) Notice: Subject to any disclaimer, the term of this patent is extended or adjusted under 35 U.S.C. 154(b) by 1054 days.

(21) Appl. No.: 12/544,017

(22) Filed: Aug. 19, 2009

(65) Prior Publication Data
US 2010/0105834 A1   Apr. 29, 2010

Related U.S. Application Data

(60) Provisional application No. 61/090,125, filed on Aug. 19, 2008, provisional application No. 61/178,136, filed on May 14, 2009, provisional application No. 61/153,873, filed on Feb. 19, 2009, provisional application No. 61/180,505, filed on May 22, 2009, provisional application No. 61/185,640, filed on Jun. 10, 2009, provisional application No. 61/187,071, filed on Jun. 15, 2009, provisional application No. 61/187,130, filed on Jun. 15, 2009.

(51) Int. Cl.
*D01F 9/12*       (2006.01)
*C01B 31/00*   (2006.01)
*C08F 290/14* (2006.01)

(52) U.S. Cl.
USPC ............. 423/447.1; 423/447.2; 423/415.1; 525/50

(58) Field of Classification Search
USPC ............. 423/447.1, 447.6, 447.7, 445 B; 977/734, 842, 847, 848, 888, 896
See application file for complete search history.

(56) References Cited

U.S. PATENT DOCUMENTS 5,698,175 A    12/1997   Hiura et al.
6,627,595 B2   9/2003    Wurtz et al.
(Continued)

FOREIGN PATENT DOCUMENTS

WO   2008/118960   10/2008
WO   2009/070380   6/2009
WO   2009/089391   7/2009

OTHER PUBLICATIONS

Hummers et al., Preparation of Graphitic Oxide, 1958, p. 1339.*
(Continued)

*Primary Examiner* — Bijay Saha
(74) *Attorney, Agent, or Firm* — Winstead PC

(57) ABSTRACT

Methods for producing macroscopic quantities of oxidized graphene nanoribbons are disclosed herein. The methods include providing a plurality of carbon nanotubes and reacting the plurality of carbon nanotubes with at least one oxidant to form oxidized graphene nanoribbons. The at least one oxidant is operable to longitudinally open the carbon nanotubes. In some embodiments, the reacting step takes place in the presence of at least one acid. In some embodiments, the reacting step takes place in the presence of at least one protective agent. Various embodiments of the present disclosure also include methods for producing reduced graphene nanoribbons by reacting oxidized graphene nanoribbons with at least one reducing agent. Oxidized graphene nanoribbons, reduced graphene nanoribbons and compositions and articles derived therefrom are also disclosed herein.

33 Claims, 41 Drawing Sheets

(56) References Cited

U.S. PATENT DOCUMENTS

| | | | |
|---|---|---|---|
| 2005/0002849 A1* | 1/2005 | Mitsui et al. | 423/447.1 |
| 2006/0057388 A1* | 3/2006 | Jin et al. | 428/408 |
| 2007/0292622 A1 | 12/2007 | Rowley et al. | |
| 2008/0176983 A1 | 7/2008 | Niu et al. | |

OTHER PUBLICATIONS

Becerril et al., "Evaluation of Solution-Processed Reduced Graphene Oxide Films as Transparent Conductors," 2008, ACS Nano, vol. 2, No. 3, pp. 463-470.*

Sutton et al., "A novel technique for the examination of internal morphologies in thin film specimens: embedding and etching of polypyrrole," 1993, Journal of Materials Science, vol. 28, No. 18, pp. 4962-4969.*

Vaisman et al., "The role of surfactants in dispersion of carbon nanotubes," 2006, Advances in Colloid and Interface Science, 128-130, pp. 37-46.*

Han et el, "Energy Band-Gap Engineering of Graphene Nanoribbons", PRL 98, 206805 (2007) 206805-1 to 206805-4.*

International Search Report and Written Opinion for PCT/US09/54334.

Li, et al., "Oxygen-Driven Unzipping of Graphitic Materials", Phys. Rev. Lett., 96:2006, p. 176101 (4 pages).

Kosynkin, et al., "Longitudinal unzipping of carbon nanotubes to form graphene nanoribbons", Nature, 458:2009, pp. 872-876.

Hiura, et al., "Opening and Purification of Carbon Nanotubes in High Yields", Adv. Mater., 7:1995, pp. 275-276.

Geim, et al., "The rise of graphene", Nature Mater. 6:2007, pp. 183-191.

Novoselov, et al., "Two-dimensional gas of massless Dirac fermions in Graphene", Nature 438:2005, pp. 197-200.

Zhang, et al., "Experimental observation of the quantum Hall effect and Berry's phase in graphene", Nature 438:2005, pp. 201-204.

Areshkin, et al., "Ballistic transport in graphene nanostrips in the presence of disorder: importance of edge effects", Nano Lett. 7:2007, pp. 204-210.

Nakada, et al., "Edge state in graphene ribbons: nanometer size effect and edge shape dependence" Phys. Rev. B, 54:1996, pp. 17954-17961.

Son, et al., "Energy gaps in graphene nanoribbons", Phys. Rev. Lett. 97:2006, pp. 216803 (4 pages).

Han, et al., "Energy band-gap engineering of graphene nanoribbons", Phys. Rev. Lett. 98:2007, pp. 206805 (4 pages).

Chen, et al., "Graphene nano-ribbon electronics", Physica E, 40:2007, pp. 228-232.

Schniepp, et al., "Functionalized single graphene sheets derived from splitting graphite oxide", J. Phys. Chem. B 110:2006, pp. 8535-8539.

Rollings, et al., "Synthesis and characterization of atomically thin graphite films on a silicon carbide substrate", J. Phys. Chem. Solids, 67:2006, pp. 2172-2177.

Li, et al., "Chemically derived, ultrasmooth graphene nanoribbon semiconductors", Science, 319:2008, pp. 1229-1232.

Yang, et al., "Two-dimensional graphene nanoribbons", J. Am. Chem. Soc. 130:2008, pp. 4216-4217.

Campos-Delgado, et al., "Bulk production of a new form of sp2 carbon: crystalline graphene nanoribbons", Nano Lett. 8:2008, pp. 2773-2778.

Saito, et al., "Chemical treatment and modification of multi-walled carbon nanotubes", Physica B, 323:2002, pp. 280-283.

Son, et al., "Half-metallic graphene nanoribbons", Nature 444:2006, pp. 347-349.

Liang, et al., "Performance projections for ballistic graphene nanoribbon field-effect transistors", IEEE Trans. Electron. Dev. 54:2007, pp. 677-682.

Wang, et al., "Room-temperature all-semiconducting sub-10-nm graphene nanoribbon field-effect transistors", Phys. Rev. Lett., 100:2008, pp. 206803 (4 pages).

Ajayan, et al., "Oxygen breaks into carbon world", Nature, 441:2006, pp. 818-819.

Lerf, et al., "Structure of graphite oxide revisited", J. Phys. Chem. B, 102:1998, pp. 4477-4482.

Li, et al., "Processable aqueous dispersions of graphene nanosheets", Nature Nanotechnol., 3:2008, pp. 101-105.

Stankovich, et al., "Synthesis of graphene-based nanosheets via chemical reduction of exfoliated graphite oxide", Carbon, 45:2007, pp. 1558-1565.

Bourlinos, et al., "Graphite oxide: chemical reduction to graphite and surface modification with primary aliphatic amines and amino acids", Langmuir, 19:2003, pp. 6050-6055.

Eda, et al., "Large-area ultrathin films of reduced graphene oxide as a transparent and flexible electronic material", Nature Nanotechnol., 3:2008, pp. 270-274.

Stankovich, et al.,"Stable aqueous dispersions of graphitic nanoplatelets via the reduction of exfoliated graphite oxide in the presence of poly(sodium 4-styrenesulfonate)", J. Mater. Chem., 16:2006, pp. 155-158.

Novoselov, et al., "Electric field effect in atomically thin carbon films", Science, 306:2004, pp. 666-669.

* cited by examiner

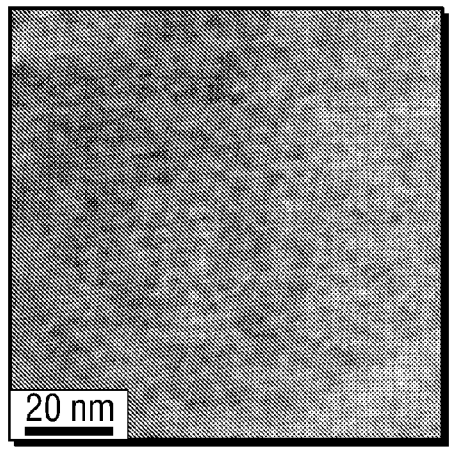
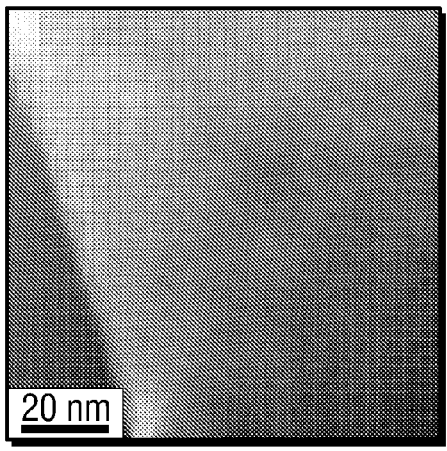
FIG. 22A  FIG. 22B
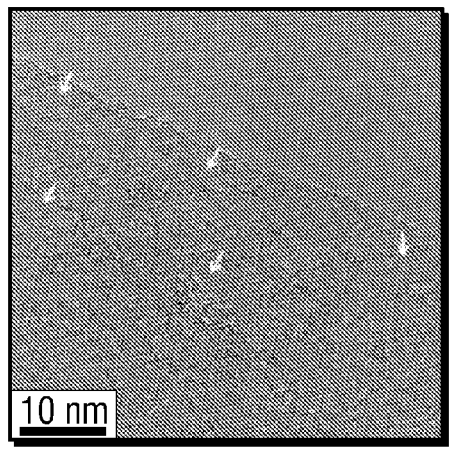
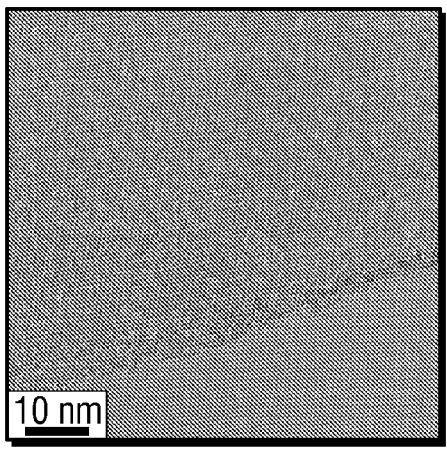
FIG. 22C  FIG. 22D
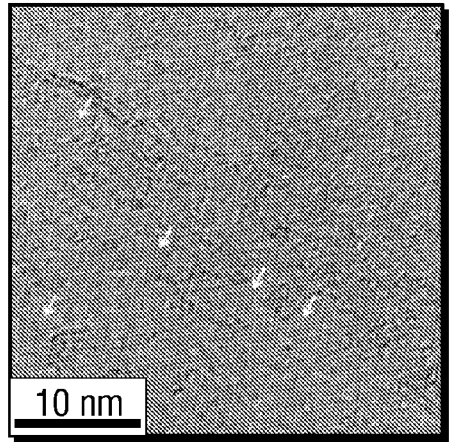
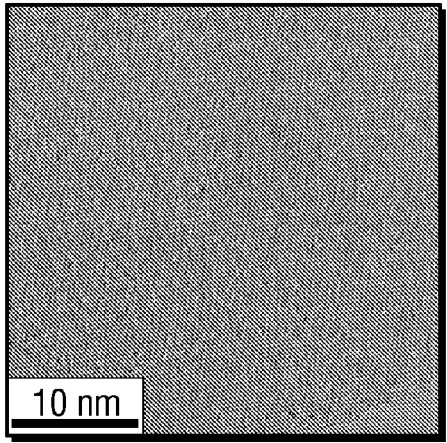
FIG. 22E  FIG. 22F

METHODS FOR PREPARATION OF GRAPHENE NANORIBBONS FROM CARBON NANOTUBES AND COMPOSITIONS, THIN FILMS AND DEVICES DERIVED THEREFROM

CROSS-REFERENCE TO RELATED APPLICATIONS

This application claims priority to U.S. provisional patent applications 61/090,125 filed Aug. 19, 2008 and 61/178,136 filed May 14, 2009. This application also claims the priority of U.S. provisional patent applications 61/153,873 filed Feb. 19, 2009, 61/180,505 filed May 22, 2009, 61/185,640 filed Jun. 10, 2009, 61/187,071 filed Jun. 15, 2009, and 61/187,130 filed Jun. 15, 2009. Each of the applications named hereinabove are incorporated by reference herein in its entirety.

STATEMENT REGARDING FEDERALLY SPONSORED RESEARCH

This invention was made with government support under Grant Number N00014-08-1-0274, awarded by the Department of Defense; Grant Number HR0011-08-1-0010, awarded by the Department of Defense; Grant Number 2007-G-010, awarded by the Federal Aviation Administration; and Grant No. FA8650-05-D-5807, awarded by the Department of Defense. The Government has certain rights in the invention.

BACKGROUND

Graphene typically refers to a material having less than about 10 graphitic layers. The graphitic layers are characterized by an 'infinite' two-dimensional basal plane having a hexagonal lattice structure and various edge functionalities, which may include, for example, carboxylic acid groups, hydroxyl groups, epoxide groups and ketone groups. Graphene nanoribbons are a special class of graphene, which are similarly characterized by a two-dimensional basal plane, but with a large aspect ratio of their length to their width. In this regard, graphene nanoribbons bear similarity to carbon nanotubes, which have a comparable large aspect ratio defined by one or more layers of graphene sheets rolled up to form a cylinder.

Graphene nanoribbons possess a number of useful properties, including, for example, beneficial electrical properties. Unlike carbon nanotubes, which can be metallic, semimetallic or semiconducting depending on their chiral geometry and diameter, the electrical properties of graphene nanoribbons are governed by their width and their edge configurations and functionalization. For example, graphene nanoribbons of less than about 10 nm in width are semiconductors, whereas similar graphene nanoribbons having a width greater than about 10 nm are metallic or semimetallic conductors. The edge configurations of graphene nanoribbons having an "armchair" or "zigzag" arrangement of carbon atoms, along with the terminal edge functional groups, are also calculated to affect the transmission of electron carriers. Such "armchair" and "zigzag" arrangements are analogous to those defined in the carbon nanotube art. In addition to the aforesaid electrical properties, graphene nanoribbons maintain many of the desirable mechanical properties that carbon nanotubes and graphene sheets also possess.

Various methods for making graphene sheets are known, including, for example, adhesive tape exfoliation of individual graphene layers from graphite, chemical-based exfoliation of graphene layers from graphite, and chemical vapor deposition processes, each process providing on the order of picogram quantities of graphene. Several lithographic and synthetic procedures have been developed for producing minuscule amounts of graphene nanoribbons. Microscopic quantities of graphene nanoribbons have been produced by partial encapsulation of carbon nanotubes in a polymer, followed by plasma etching to longitudinally cut the carbon nanotubes. Upon removal of the polymer, graphene nanoribbons are formed. MWNTs have also been non-selectively longitudinally opened by intercalation and reaction with lithium in liquid ammonia solvent, resulting in exfoliation to produce multilayered graphitic structures such as partially opened MWNTs, graphene flakes, and graphene nanoribbons terminated with hydrogens. Macroscopic quantities of graphene nanoribbons have also been produced by a chemical vapor deposition process. Graphene nanoribbons prepared by these processes are typically characterized by multiple graphene layers with a kinked morphology and irregular atomic structure.

In view of the foregoing, more efficient methods for preparation of macroscopic quantities of graphene nanoribbons would be of exceptional benefit. In particular, facile methods to prepare graphene nanoribbons with a more regular atomic structure than are currently available would represent a significant advance in the art.

SUMMARY

In various embodiments, methods for preparing graphene nanoribbons are disclosed herein. The methods include providing a plurality of carbon nanotubes and reacting the plurality of carbon nanotubes with at least one oxidant to form oxidized graphene nanoribbons. The at least one oxidant is operable to longitudinally open the carbon nanotubes. In various embodiments, oxidized graphene nanoribbons prepared by the above methods are disclosed. In other various embodiments, reduced graphene nanoribbons may be prepared from the oxidized graphene nanoribbons made by these methods.

In various embodiments, additional methods for preparing oxidized graphene nanoribbons are also disclosed herein. The methods include providing a plurality of multi-wall carbon nantoubes and reacting the plurality of multi-wall carbon nanotubes with at least one oxidant in the presence of at least one acid. The at least one oxidant is operable to longitudinally open the multi-wall carbon nanotubes (MWNTs). In some embodiments, oxidized graphene nanoribbons prepared by the above methods are disclosed. In still other embodiments, reduced graphene nanoribbons may be prepared from the oxidized graphene nanoribbons made by these methods.

In various embodiments, still further methods for preparing oxidized graphene nanoribbons are disclosed herein. The methods include providing a plurality of multi-wall carbon nanotubes and reacting the plurality of multi-wall carbon nanotubes with at least one oxidant in the presence of at least one protective agent and at least one acid. The at least one oxidant is operable to longitudinally open the multi-wall carbon nanotubes. In some embodiments, oxidized graphene nanoribbons prepared by the above methods are disclosed. In still other embodiments, reduced graphene nanoribbons may be prepared from the oxidized graphene nanoribbons made by these methods.

In various embodiments, methods for preparing reduced graphene nanoribbons are disclosed herein. The methods include providing oxidized graphene nanoribbons and reacting the oxidized graphene nanoribbons with at least one reducing agent. In various embodiments, reduced graphene nanoribbons prepared by these methods are disclosed herein. In other various embodiments, reduced graphene nanoribbons functionalized with a plurality of functional groups are disclosed herein. The plurality of functional groups are introduced, for example, using a diazonium species.

In still other various embodiments, shortened graphene nanoribbons are disclosed herein. The shortened graphene nanoribbons may include, for example, oxidized graphene nanoribbons, reduced graphene nanoribbons and combinations thereof.

In still other various embodiments, thin films including graphene nanoribbons are disclosed herein. The graphene nanoribbons may include oxidized graphene nanoribbons, reduced graphene nanoribbons and combinations thereof. In some embodiments, the thin films are electrically conductive. In some embodiments, the thin films are semiconductive. In various embodiments, the thin films are deposited by a method including, for example, spin-coating, dip-coating, doctor-blading, inkjet printing, gravure printing and brushing.

In various other embodiments disclosed herein, field emission cathodes, electronic devices, transistors, memories, sensors, ultracapacitors and supercapacitors, filter membranes, gas separation membranes, polymer composites, concrete compositions, drilling fluids, water-soluble compositions (including drug-delivery compositions) and wound dressings including graphene nanoribbons are also described.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing a specific embodiment of the disclosure, wherein:

FIGS. 22A-22F show illustrative side-by-side comparative images of oxidized graphene nanoribbons prepared in the presence (FIGS. 22B, 22D and 22F) and in the absence (FIGS. 22A, 22C and 22E) of phosphoric acid protective agent;

DETAILED DESCRIPTION

Figure 1:
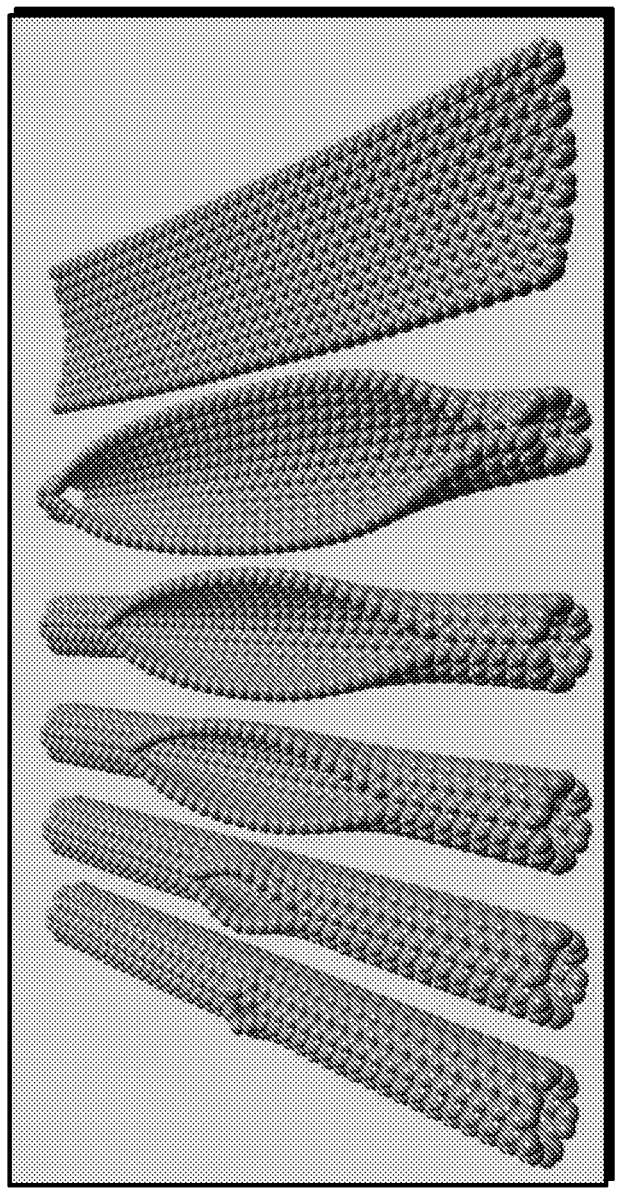
FIG. 1 shows an illustrative schematic demonstrating a longitudinal opening of a carbon nanotube into a graphene nanoribbon.

In the following description, certain details are set forth such as specific quantities, sizes, etc. so as to provide a thorough understanding of the present embodiments disclosed herein. However, it will be obvious to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing a particular embodiment of the disclosure and are not intended to be limiting thereto. Drawings are not necessarily to scale.

While most of the terms used herein will be recognizable to those of skill in the art, it should be understood, however, that when not explicitly defined, terms should be interpreted as adopting a meaning presently accepted by those of skill in the art. In cases where the construction of the term would render it meaningless or essentially meaningless, the definition should be taken from Webster's Dictionary, 3rd Edition. Definitions and/or interpretations should not be incorporated from other patent applications, patents, or publications, related or not, unless specifically stated in this specification or if the incorporation is necessary for maintaining validity.

The following definitions are set forth to aid in understanding of the various embodiments of the present disclosure. Terms in addition to those below are defined, as required, throughout the Detailed Description.

"Graphene nanoribbons," as defined herein, refer to, for example, single- or multiple layers of graphene that have an aspect ratio of greater than about 5, based on their length and their width. Graphene nanoribbons may be prepared in either oxidized or reduced forms. When not otherwise specified herein, the term graphene nanoribbons should be interpreted to encompass both oxidized graphene nanoribbons and reduced graphene nanoribbons.

"Longitudinally opening," as defined herein, refers to, for example, opening of carbon nanotubes along their longitudinal axis to form graphene nanoribbons. Such longitudinal opening may be thought of as an "unzipping" reaction of the carbon nanotubes.

"Narrow graphene nanoribbons," as defined herein, refers to, for example, graphene nanoribbons having widths less than about 10 nm.

"Wide graphene nanoribbons," as defined herein, refers to, for example, graphene nanoribbons having widths greater than about 10 nm. In some embodiments herein, wide graphene nanoribbons have widths greater than about 100 nm.

"Shortened graphene nanoribbons," as defined herein, refers to, for example, graphene nanoribbons that have had their aspect ratios reduced by a cutting technique through their long axis. When not otherwise specified herein, the term shortened graphene nanoribbons should be interpreted to encompass both oxidized graphene nanoribbons and reduced graphene nanoribbons that have been shortened by cutting. Non-limiting means through which cutting can occur include, for example, mechanically, through application of high shear forces, through high-energy sonication, or chemically. In some embodiments, shortened graphene nanoribbons have aspect ratios of less than about 5. In other embodiments, shortened graphene nanoribbons have aspect ratios of less than about 3, or less than about 2.

In the discussion that follows, the term "multi-wall carbon nanotubes" (MWNTs) will be understood to be inclusive of both double-wall carbon nanotubes and any carbon nanotubes having more than two or more walls.

According to theoretical predictions, single- and multiple-atomic layer graphene nanoribbons have a high surface energy that is thought to prevent their growth directly from the gas phase, even with proper nucleation. The failure to grow graphene nanoribbons directly from the gas phase is thought to be due to their tendency either to stack into graphite crystals or to fold into carbon nanotubes or similar closed structures. Although a strain energy barrier results from the curvature of the carbon nanotubes, the strain energy of the carbon nanotubes is less than the surface energy of the graphene sheets. Hence, carbon nanotubes are a preferred gas phase reaction product.

The methods for preparing graphene nanoribbons described herein take place either in a liquid medium or on a surface. Without being bound by theory or mechanism, it is though that when a free-standing graphene sheet (in the form of a graphene nanoribbon) is in solution, the excess surface energy may be stabilized by solvation energy such that folding into a carbon nanotube becomes energetically unfavorable (i.e., endothermic). As a result of the solvation energy, the reverse process of longitudinally opening a carbon nanotube into a graphene nanoribbon becomes energetically favorable in an appropriate liquid medium. FIG. 1 shows an illustrative schematic demonstrating such a longitudinal opening of a carbon nanotube into a graphene nanoribbon.

According to current understanding, the oxidative longitudinal opening of carbon nanotubes appears to occur along a line to afford predominantly straight-edged oxidized graphene nanoribbons as depicted schematically in FIG. 1. Although FIG. 1 depicts a linear longitudinal cut, one of ordinary skill in the art will recognize that the longitudinal opening can also occur in a spiraling manner according to the chiral angle of the carbon nanotubes. Furthermore, although FIG. 1 depicts the longitudinal opening as proceeding from the mid-section of the carbon nanotube and proceeding outward toward the ends, longitudinal opening may begin at any point on the carbon nanotube. Present characterization of the longitudinal opening processes have not precisely located the initial point of opening, but any process that induces longitudinal opening of carbon nanotubes to produce oxidized graphene nanoribbons lies within the spirit and scope of the present disclosure, regardless of the point of origin of the longitudinal opening. The predominantly straight-edged graphene nanoribbons produced by the methods of the present disclosure are distinguished over the graphene nanoribbons conventionally produced in the art, which are often typified by more ragged edges.

A number of different carbon nanotube oxidation processes are well established in the art. However, Applicants believe that none of the known carbon nanotube oxidation processes are capable of selective longitudinal opening of carbon nanotubes to produce graphene nanoribbons as described in the present disclosure. For example, treatment of single-wall carbon nanotubes with a mixture of oxidizing acids ($H_2SO_4$ and $HNO_3$) is known to attack defect sites in the carbon nanotubes to form shortened carbon nanotubes having opened ends that are functionalized with a plurality of carboxylic acid groups. Similar treatment of multi-wall carbon nanotubes leads to extensive oxidation of the outer carbon nanotube layers. In neither case are graphene nanoribbons formed. According to present mechanistic understanding of the $H_2SO_4/HNO_3$ oxidation process, an intermediacy of free radicals has been proposed. Detectable nitrogen content in the oxidized carbon nanotube product suggests concomitant nitration, which is consistent with the proposed oxidation mechanism.

In other processes utilizing multi-wall carbon nanotubes, reducing metals such as, for example, lithium or sodium in a solvent such as, for example, liquid ammonia may intercalate between multi-wall carbon nanotube layers. This reaction results in non-selective opening of the multi-wall carbon nanotubes to form incompletely opened multi-wall carbon nanotubes, flake graphene and graphene nanoribbons having extremely jagged and irregular edges that are terminated with hydrogen.

In contrast to the known carbon nanotube oxidation processes, which are incapable of producing graphene nanoribbons, the methods of the present disclosure enable the longitudinal opening of a carbon nanotube in solution to form oxidized graphene nanoribbons. Such longitudinal opening is accomplished utilizing oxidants that are commonly used to break carbon-carbon bonds. For example, longitudinal opening of carbon nanotubes may be accomplished using an oxidation such as, for example, potassium permanganate ($KMnO_4$) in an acid such as, for example, sulfuric acid ($H_2SO_4$). The longitudinal opening may further be conducted in the presence of a protective agent such as, for example, trifluoroacetic acid or phosphoric acid ($H_3PO_4$), to improve the molecular integrity of the oxidized graphene nanoribbons so produced. Additional details concerning the longitudinal opening of carbon nanotubes to form oxidized graphene nanoribbons is considered hereinbelow, following discussion of a proposed mechanism of the longitudinal opening process.

Figure 2:
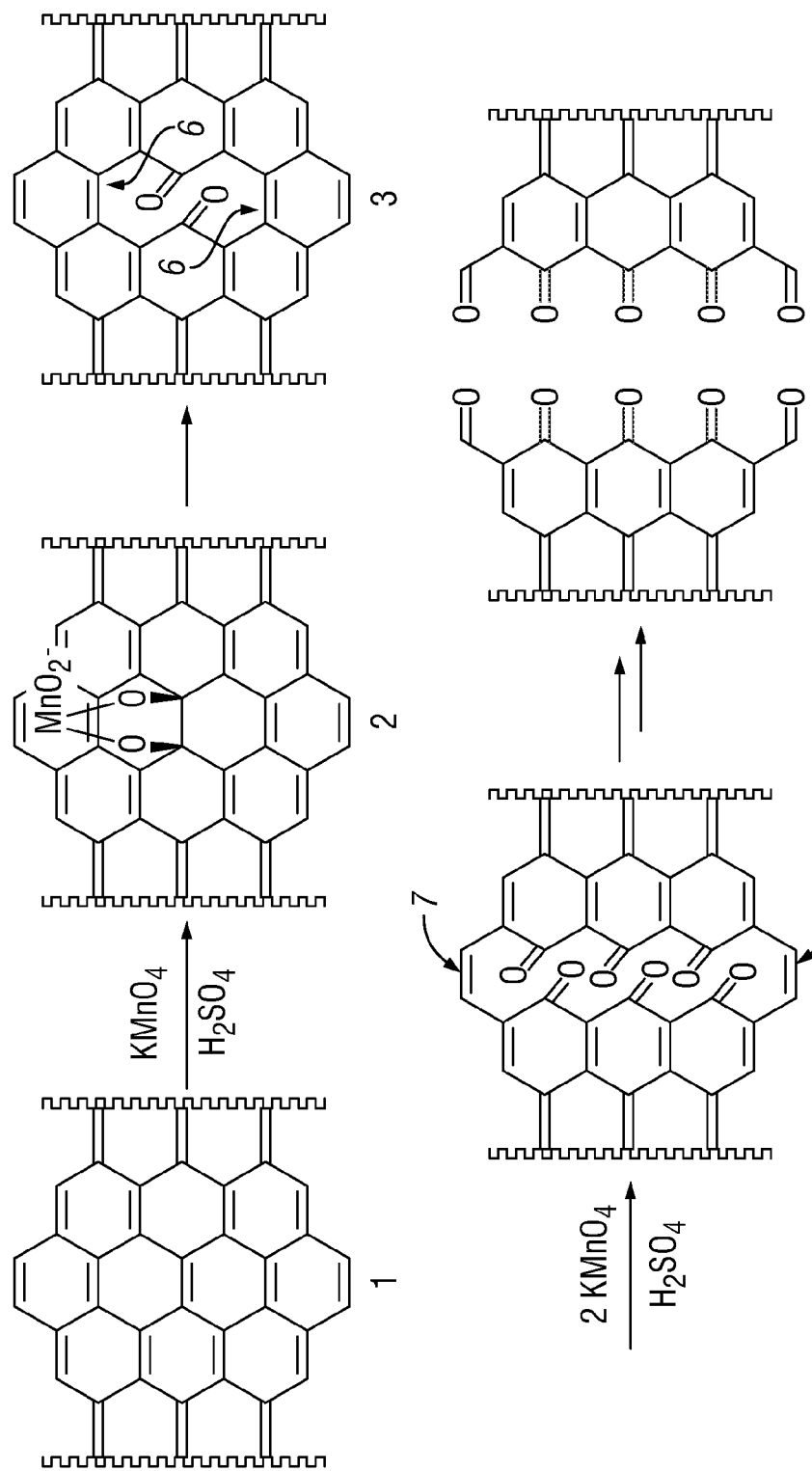
FIG. 2 shows a non-limiting proposed mechanism for the longitudinal opening of carbon nanotubes using $KMnO_4$ oxidant.

Without begin bound by theory or mechanism, it is believed that the longitudinal opening of carbon nanotubes begins with steps that are similar to the oxidation of alkenes by permanganate in acid. However, the selectivity of the longitudinal opening process herein distinguishes the methods of the present disclosure from conventional oxidation of alkenes. FIG. 2 shows a non-limiting proposed mechanism for the longitudinal opening of carbon nanotubes using $KMnO_4$ oxidant. FIG. 2 depicts a carbon nanotube section 1 for purposes of clarity, rather than a full carbon nanotube structure. Starting from carbon nanotube section 1, the first step of the longitudinal opening process is thought to be formation of manganate ester 2, as the rate-determining step. Further oxidation then occurs to form dione 3 in the presence of a dehydrating medium (i.e., the acid). Juxtaposition of the buttressing ketones in dione 3 results in distortion of the $\beta,\gamma$-alkenes 6, making them more susceptible to further attack by $KMnO_4$ as outlined above. The process to longitudinally open the carbon nanotubes continues as shown in intermediate 4. In intermediate 4, the buttressing-induced strain on the β,γ-alkenes 7 lessens because there is more space for carbonyl projection. However, bond-angle strain induced by the enlarging hole (or tear if originating from an end of the carbon nanotube) makes the β,γ-alkenes 7 increasingly more reactive. Relief of bond-angle strain through opening of the carbon nanotube to form oxidized graphene nanoribbons 5 slows or stops further dione formation and cutting.

The oxidized graphene nanoribbons prepared as above generally also possess carbonyls, epoxides, carboxylic acids, and hydroxyl groups both on their edges and in their basal plane. Additional edge and basal plane functionality, other than that shown, have been omitted from the structure of the oxidized graphene nanoribbons 5 for purposes of clarity. Oxidized graphene nanoribbons are generally poor electrical conductors because the surface oxidation disrupts the π-conjugated network of the graphene plane. However, the oxidized graphene nanoribbons may possess semiconducting properties, as discussed in more detail hereinbelow.

In view of the non-limiting proposed mechanism illustrated in FIG. 2, the selectivity of the longitudinal opening process can be explained as follows. Once opening of a carbon nanotube has been initiated by $KMnO_4$ in the presence of an acid, the rate of further opening is enhanced relative to an unopened carbon nanotube or an uninitiated site on the same carbon nanotube being longitudinally opened. Although the ketones in oxidized graphene nanoribbons 5 can potentially be further converted, through their O-protonated forms, to edge carboxylic acids, oxidized graphene nanoribbons 5 are far less susceptible to further oxidative cleavage due to relief of bond-angle strain on their double bonds. The stepwise bond cleavage in the longitudinal opening process of the present disclosure is contrasted with the random attack by a nitronium species in the $H_2SO_4/HNO_3$ oxidation process referenced hereinabove. Furthermore, the $H_2SO_4/HNO_3$ oxidation process produces short carbon nanotubes having opened ends, rather than oxidized graphene nanoribbons.

In various embodiments, methods for preparing graphene nanoribbons are disclosed herein. The methods include providing a plurality of carbon nanotubes and reacting the plurality of carbon nanotubes with at least one oxidant to form oxidized graphene nanoribbons. The at least one oxidant is operable to longitudinally open the carbon nanotubes. In various embodiments, the reacting step occurs in the presence of at least one acid. In various embodiments, the reacting step occurs in the presence of at least one protective agent. In various embodiments, the methods further include reacting the oxidized graphene nanoribbons with at least one reducing agent to form reduced graphene nanoribbons. In various embodiments, the graphene nanoribbons are shortened by cutting means. In various embodiments, the graphene nanoribbons are exfoliated.

In various embodiments, methods for preparing oxidized graphene nanoribbons are disclosed herein. The methods include providing a plurality of multi-wall carbon nanotubes and reacting the plurality of multi-wall carbon nanotubes with at least one oxidant in the presence of at least one acid. The at least one oxidant is operable to longitudinally open the multi-wall carbon nanotubes.

In various embodiments, methods for preparing reduced graphene nanoribbons are disclosed herein. The methods include providing oxidized graphene nanoribbons and reacting the oxidized graphene nanoribbons with at least one reducing agent.

In general, oxidants operable to longitudinally open carbon nanotubes may be selected from a wide range of compounds. In some embodiments, the at least one oxidant includes a transition metal that mediates a cis oxidation of double bonds. In some embodiments, the transition metal is in a high oxidation state. In some embodiments, the at least one oxidant may be, for example, permanganate, ferrate, osmate, ruthenate, chlorate, chlorite, nitrate, osmium tetroxide, ruthenium tetroxide, lead dioxide and combinations thereof. For any of the referenced oxidants which are cations or anions, any suitable counteranion forming a salt of the oxidant cation or anion may be used in practicing the methods of the present disclosure. However, one of ordinary skill in the art will recognize that certain salts may be more advantageous than others in such properties as, for example, their solubility and stability. In some embodiments, the at least one oxidant includes potassium permanganate.

In general, a wide range of acids may be used in practicing the longitudinal opening methods of the present disclosure. In various embodiments, the at least one oxidant referenced above is dissolved in at least one acid. The carbon nanotubes may be added before or after the addition of the at least one oxidant. The at least one acid may include, for example, oleum (fuming sulfuric acid), sulfuric acid, chlorosulfonic acid, fluorosulfonic acid, trifluoromethanesulfonic acid, and combinations thereof. In various embodiments, the oleum may have a free sulfur trioxide concentration ranging from about 0.1% to about 20%. In various embodiments, the at least one acid is sulfuric acid and the at least one oxidant is potassium permanganate. In various embodiments, the sulfuric acid has a concentration greater than about 90% (v/v). Such sulfuric acid concentrations have been shown to advantageously exfoliate both the carbon nanotubes and the oxidized graphene nanoribbons produced in the longitudinal opening process. However, exfoliated oxidized graphene nanoribbons may also be formed by other routes. Although the Experimental Examples hereinbelow have typically utilized potassium permanganate as the at least one oxidant and sulfuric acid as the at least one acid, one of ordinary skill in the art will recognize that any combination of oxidants and acids referenced hereinabove, or like oxidants and acids, may be used to achieve a similar result when longitudinally opening carbon nanotubes.

In various embodiments, the temperature for reacting carbon nanotubes with at least one oxidant may range from about −50° C. to about 200° C. In other embodiments, the temperature may range from about 0° C. to about 100° C. In still other embodiments, the temperature may range from about 50° C. to about 95° C. In some embodiments, the carbon nanotubes are added to a solution of the at least one oxidant and the at least one acid at room temperature, and the reaction mixture is then warmed to about 70° C. Particularly, in some embodiments involving longitudinal opening of single-wall carbon nanotubes, the temperature may range from about −50° C. to about 30° C. In some embodiments involving single-wall carbon nanotubes, the temperature is about 25° C.

In various embodiments, reaction times may vary from about 1 hour to about 72 hours. In other embodiments, reaction times may vary from about 1 hour to about 24 hours. In still other embodiments, reaction times may vary from about 1 hour to about 6 hours. In some embodiments, the reaction times are about 2 hours.

In some embodiments, the at least one oxidant is present in at least a stoichiometric amount relative to the amount of carbon in the plurality of carbon nanotubes. For example, on a mole ratio, at least one equivalent of oxidant is added per equivalent of carbon. In other embodiments, the at least one oxidant is present in a sub-stoichiometric amount relative to the amount of carbon in the plurality of carbon nanotubes. In such embodiments, the step of reacting the plurality of carbon nanotubes with at least one oxidant further includes adding at least one co-oxidant to regenerate the at least one oxidant. Non-limiting examples of co-oxidants which may regenerate the at least one oxidant operable for carbon nanotube longitudinal opening include, for example, oxygen and N-methyl-morpholine N-oxide (NMO).

Figure 3:
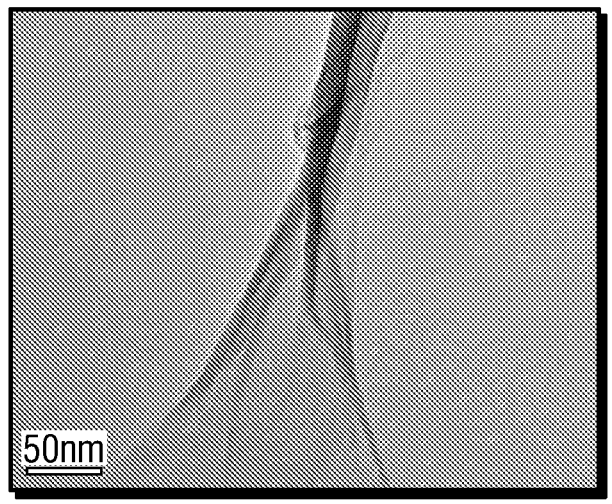
FIG. 3 shows an illustrative TEM image of a carbon nanotube that has been incompletely longitudinally opened.

Variable amounts of the at least one oxidant may be added in the methods for longitudinally opening carbon nanotubes. By adjusting both the reaction temperature and the stoichiometry of the at least one oxidant, the amount of longitudinal opening of the carbon nanotubes can be controlled. For example, in some embodiments, when a sub-stoichiometric amount of the at least one oxidant is used, longitudinal opening of the carbon nanotubes may not be complete, and incompletely longitudinally opened carbon nanotubes are produced. For example, FIG. 3 presents an illustrative TEM image of a carbon nanotube that has been incompletely longitudinally opened.

Considering $KMnO_4$ as an illustrative oxidant operable for the longitudinal opening of carbon nanotubes, the theoretical stoichiometric amount of $KMnO_4$ need to completely open the carbon nanotubes is a weight-weight ratio of about 4.4 ($KMnO_4$ weight to carbon nanotube weight). Experimentally, longitudinal opening of carbon nanotubes using $KMnO_4$ is typically conducted with a slight excess of $KMnO_4$ such as, for example, with a weight-weight ratio of about 5. When the weight-weight ratio of $KMnO_4$ weight to carbon nanotube weight is about 5, this amount represents a modest excess of permanganate relative to the number of double bonds in infinite size graphite crystals of comparable weight. However, one of ordinary skill in the art will recognize that when even greater amounts of oxidant are used, the oxidized carbon nanotubes so produced will be oxidized to an even greater degree. For example, if eight weight equivalents of $KMnO_4$ are used instead of the typical five weight equivalents of oxidant, oxidized graphene nanoribbons having different physical properties are obtained. Comparative data for oxidized graphene nanoribbons produced in the presence of five and eight weight equivalents of oxidant are set forth in the Experimental Examples hereinbelow.

In various embodiments, the weight-weight ratio of the at least one oxidant weight to the carbon nanotube weight ranges from about 0.01 to about 10. In other embodiments, the weight-weight ratio of the at least one oxidant weight to the carbon nanotube weight ranges from about 1 to about 7. In still other embodiments, the weight-weight ratio of the at least one oxidant weight to the carbon nanotube weight ranges from about 4 to about 5.

At low ionic strengths, oxidized graphene nanoribbons are soluble in neutral or weakly basic water up to several milligrams per milliliter (12 mg/ml), giving dark-brown solutions, which are transparent in thin layers. Admixture of ethanolamine and other organic bases increases the obtainable aqueous concentration by about an order of magnitude. The oxidized graphene nanoribbons are also easily dispersible in polar organic solvents such as, for example, methanol, ethanol, acetone, butanone, N,N-dimethylformamide and N-methylpyrrolidone (NMP).

In various embodiments, oxidized graphene nanoribbons may be produced from SWNTs, double-wall carbon nanotubes (DWNTs), MWNTs, and combinations thereof. The SWNTs, DWNTs and MWNTs may be produced by any process known in the art. In embodiments where single-wall carbon nanotubes are used, narrow oxidized graphene nanoribbons are produced. In embodiments where double-wall or multi-wall carbon nanotubes are used, wide oxidized graphene nanoribbons are primarily produced. In some embodiments, the wide oxidized graphene nanoribbons have widths greater than about 100 nm. In other embodiments, the wide oxidized graphene nanoribbons have widths greater than about 10 nm. In general, narrow oxidized graphene nanoribbons produced from single-wall carbon nanotubes are more entangled relative to the wide graphene nanoribbons produced from multi-wall carbon nanotubes.

In various embodiments, the carbon nanotubes are single-wall carbon nanotubes, and the oxidized graphene nanoribbons are narrow. In various embodiments, the carbon nanotubes are multi-wall carbon nanotubes, and a majority of the oxidized graphene nanoribbons have widths greater than about 100 nm. In other various embodiments, the carbon nanotubes are multi-wall carbon nanotubes, and a majority of the oxidized graphene nanoribbons have widths greater than about 10 nm. In some embodiments, the carbon nanotubes are substantially of a single type or chirality. Such single type of chirality carbon nanotubes may lead to a more homogenous graphene nanoribbon product. For example, graphene nanoribbons of a single chirality may be prepared using carbon nanotubes of a single type. In general, the graphene nanoribbons may have an "armchair" or "zigzag" edge configuration. In some embodiments, even when starting from a mixture of carbon nanotube chiralities, a zigzag edge configuration on the graphene nanoribbons may predominate.

In general, when longitudinally opening MWNTs, oxidized graphene nanoribbons having widths less than about 100 nm have been observed by Applicants to be relatively unstable toward the oxidation conditions described hereinabove, and comparatively few oxidized graphene nanoribbons having these widths are typically isolated. However, by addition of at least one protective reagent to the oxidation reaction mixture, oxidized graphene nanoribbons of less than about 100 nm in width may be stabilized, and their relative isolated abundance may be increased. Furthermore, oxidized graphene nanoribbons produced in the presence of at least one protective agent have different properties than those not produced in the presence of at least one protective agent. Disclosure regarding the at least one protective agent and the oxidized graphene nanoribbons so obtained is set forth hereinbelow. In some embodiments, a greater proportion of oxidized graphene nanoribbons having widths less than about 100 nm may be produced by lowering the reaction temperature. For example, longitudinal opening of SWNTs may be conducted at lower temperatures than are needed for MWNTs.

In other various embodiments of the present disclosure, methods for preparing oxidized graphene nanoribbons in the presence of at least one protective agent are also described herein. The methods include providing a plurality of carbon nanotubes and reacting the plurality of carbon nanotubes with at least one oxidant in the presence of at least one protective agent and at least one acid. The at least one oxidant is operable to longitudinally open the carbon nanotubes. In some embodiments, the methods for preparing oxidized graphene nanoribbons include providing a plurality of multi-wall carbon nanotubes and reacting the plurality of multi-wall carbon nanotubes with at least one oxidant in the presence of at least one protective agent and at least one acid. The at least one oxidant is operable to longitudinally open the multi-wall carbon nanotubes. The at least one oxidant, the at least one acid, the carbon nanotubes, and the reaction conditions and stoichiometry may be selected according to the criteria set forth hereinabove.

Figure 4:
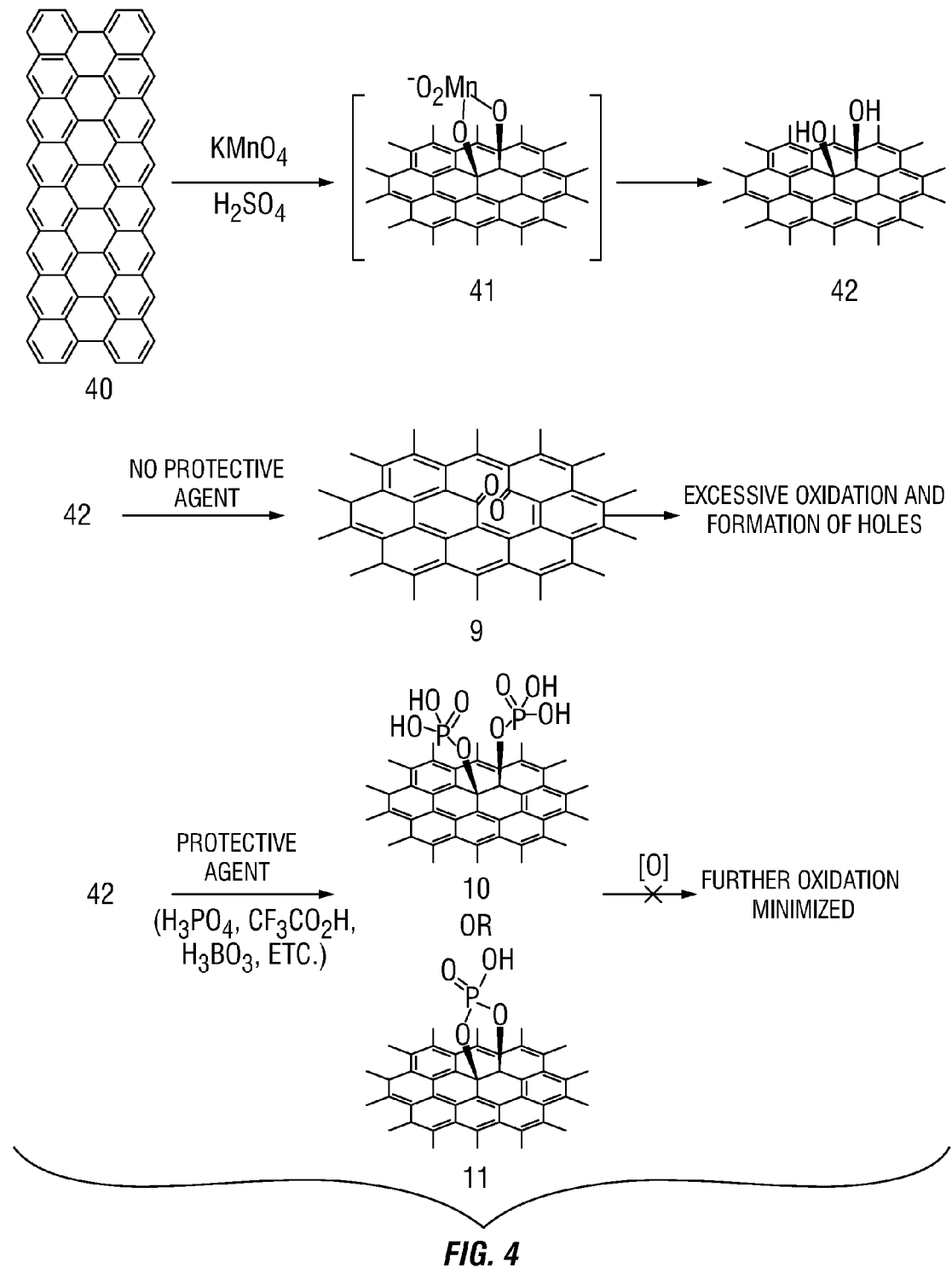
FIG. 4 shows a non-limiting proposed mechanism for the minimization of holes in oxidized graphene nanoribbons using $KMnO_4$ oxidant in the presence of $H_3PO_4$ protective agent, wherein opening of a dione-induced hole in the basal plane of the graphene nanoribbon is minimized in the presence of the protective agent.

FIG. 4 shows a non-limiting proposed mechanism for minimization of holes in oxidized graphene nanoribbons using $KMnO_4$ oxidant in the presence of $H_3PO_4$ protective agent, wherein opening of a dione-induced hole in the basal plane of the graphene nanoribbons is minimized in the presence of the protective agent. As shown in FIG. 4, graphene nanoribbon 40 may be attacked with an oxidant ($KMnO_4$) to form manganate ester 41, which can subsequently produce vicinal diol 42. A small amount of such vicinal diols may be produced non-specifically in the methods for longitudinally opening carbon nanotubes described hereinabove and impact the properties of the oxidized graphene nanoribbons so obtained. For example, vicinal diol 42 may react to form dione 9, which leads to formation of molecular defects or holes in the oxidized graphene nanoribbons. Note that dione 9 is not the same as dione 3 from FIG. 2, which leads to a self-propagating longitudinal opening of the carbon nanotubes. Instead dione 9 may form during or after the longitudinal opening of the carbon nanotubes has begun. After a longitudinal opening has begun, dione 9 is not operable for producing a second longitudinal opening, because the bond-angle strain of the carbon nanotube has already been relieved in forming a graphene nanoribbon. Dione 9 can, however, react further to form holes in the oxidized graphene nanoribbons. Hole formation can occur in the graphene nanoribbons either during the carbon nanotube to graphene nanoribbon longitudinal opening process or after the graphene nanoribbon has been fully formed but remains in the oxidative reaction mixture. Limiting such hole formation may be advantageous in some embodiments of the present disclosure.

Applicants have discovered that if vicinal diol 42 is protected in situ during the longitudinal opening process, the oxidized graphene nanoribbon product has a higher alcohol content and a lower carbonyl content, relative to the corresponding oxidized graphene nanoribbon product made in the absence of a protective agent. Furthermore, a higher proportion of oxidized graphene nanoribbons having widths of less than about 100 nm are produced in the presence of a protective agent, and there are fewer defects in their atomic structure. Non-limiting mechanistic rationale to explain these findings is presented in more detail hereinbelow. Additional characterization of the oxidized graphene nanoribbons obtained both in the presence and absence of a protective agent is contained in the Experimental Examples.

As shown in FIG. 4, phosphoric acid ($H_3PO_4$) may protect vicinal diol 42 formed on graphene nanoribbon 40 from manganate ester 41. Vicinal diol 42 may subsequently lead to undesired dione 9, which leads to excess oxidation and formation of holes in the oxidized graphene nanoribbons. Vicinal diol 42 may be formed in the graphene basal plane during the initial stages of the oxidation. In the presence of at least one protective agent (e.g., phosphoric acid or trifluoroacetic acid), protected diol 10 or 11 may be formed instead of undesired dione 9. For example, in FIG. 4, protected diol 10 or 11 is protected with a phosphate group. Protected diol 10 or 11 may be protected with either a monodentate (e.g., 10) or bidentate (e.g., 11) protecting group, which is resistant to further oxidation. Since protected diol 10 or 11 is resistant to further oxidation, oxidized graphene nanoribbons produced in the presence of at least one protective agent have fewer defects in their atomic structure. Upon aqueous workup, the protective group on 10 or 11 conveniently hydrolyses to form a now-stable vicinal diol. Although graphene nanoribbons produced both in the absence and in the presence of at least one protective agent are both oxidized, they have different properties as illustrated further in the Experimental Examples hereinbelow. For example, in the absence of a protective agent, more carbonyl species (i.e., carboxylic acid and ketone groups) are present, which are indicative of hole-formation. In the presence of a protective agent, a comparatively high number of alcohol species are present on the oxidized graphene nanoribbons and fewer holes are present in their basal plane.

In general, a wide range of protective agents may be chosen for use in the methods of the present disclosure for longitudinally opening carbon nanotubes in the presence of an oxidant. Such protective agents for vicinal diols may include, for example, trifluoroacetic acid, phosphoric acid, orthophosphoric acid, metaphosphoric acid, polyphosphoric acid, and boric acid. Suitable protective agents may also include anhydrides or mixed anhydrides capable of forming a protective agent for vicinal diols. Such anhydrides and mixed anhydrides include, for example, trifluoroacetic anhydride; phosphoric anhydride; orthophosphoric anhydride; metaphosphoric anhydride; polyphosphoric anhydride; boric anhydride; mixed anhydrides of trifluoroacetic acid, phosphoric acid, orthophosphoric acid, metaphosphoric acid, polyphosphoric acid, and boric acid; and combinations thereof. In various embodiments, the at least one protective agent reacts with vicinal diols that form during the step of reacting carbon nanotubes with at least one oxidant. The aforementioned protective agents offer rapid protective group introduction and oxidative stability under the reaction conditions of longitudinal carbon nanotube opening. Furthermore, they are incidentally removed during subsequent aqueous workup with no further synthetic steps needed to induce their removal. In various embodiments, the protective agent may protect the vicinal diol 42 by adding a protective group to each alcohol group, or a single protective group may bridge both alcohols of the vicinal diol 42 by forming a chelate structure (see FIG. 4).

Without being bound by theory or mechanism, Applicants believe that oxidized graphene nanoribbons having widths of less than about 100 nm are substantially destroyed by the oxidative reaction conditions unless at least one protective agent is present. However, as referenced hereinabove, longitudinal opening of carbon nanotubes in the presence of at least one protective agent is successful in producing a broader range of widths of oxidized graphene nanoribbons than is produced in the absence of a protective agent. For example, when multi-wall carbon nanotubes are longitudinally opened without a protective agent present, relatively few oxidized graphene nanoribbons of less than about 100 nm in width are produced. In contrast, when the longitudinal opening is conducted in the presence of at least one protective agent, graphene nanoribbons of less than about 100 nm in width are produced in relative abundance. Oxidized graphene nanoribbons of greater than about 100 nm in width are still produced in the presence of at least one protective agent. As an illustrative example, reaction of multi-wall carbon nanotubes having a mean outer diameter of about 60 nm and inner nanotube diameters uniformly distributed from about 0.6 nm to about 60 nm may be longitudinally opened in the presence of at least one acid and at least one protective agent to produce a distribution of oxidized graphene nanoribbons ranging in width from about 10 nm to about 200 nm. In various embodiments, the protective agent also enhances the isolation of narrow oxidized graphene nanoribbons from the longitudinal opening of single-walled carbon nanotubes.

Not only does the use of at least one protective agent enable the isolation of oxidized graphene nanoribbons having widths of less than about 100 nm, but the protective agent also provides better quality oxidized graphene nanoribbons having fewer holes in their basal plane with different physical properties than oxidized graphene nanoribbons produced in the absence of at least one protective agent. For example, oxidized graphene nanoribbons produced in the presence of at least one protective agent have a higher proportion of hydroxyl groups relative to comparable oxidized graphene nanoribbons produced in the absence of a protective agent. Furthermore, the edge linearity of oxidized graphene nanoribbons prepared in the presence of at least one protective agent is generally higher than comparable oxidized graphene nanoribbons prepared in the absence of a protective agent.

Figure 5:
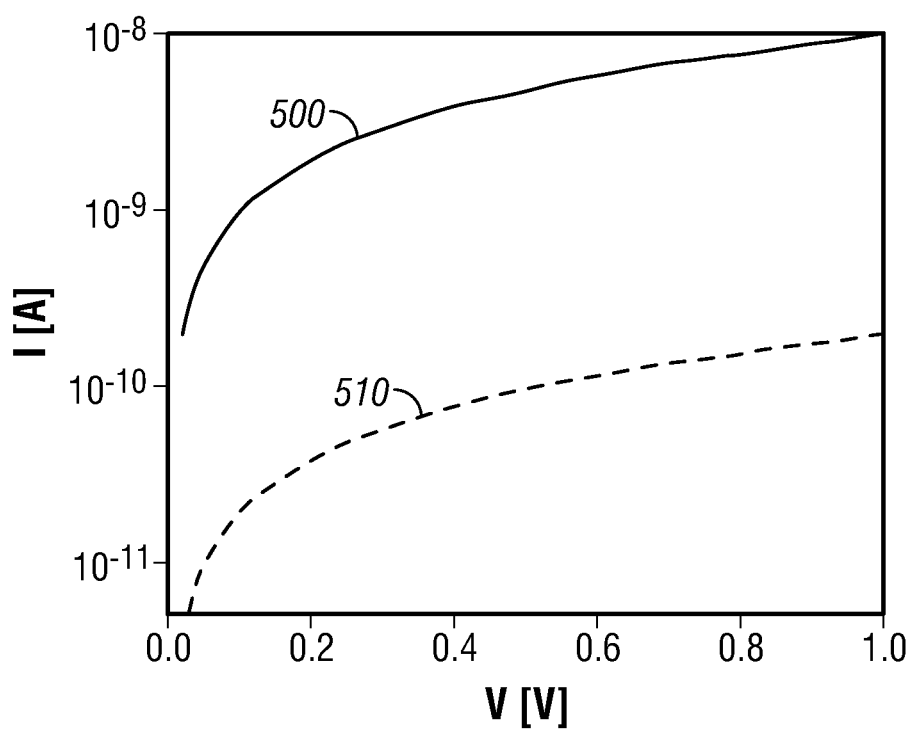
FIG. 5 shows an illustrative conductivity plot of reduced graphene nanoribbons prepared from oxidized graphene nanoribbons that were produced in both the presence and absence of a protective agent.

The presence of holes in graphene nanoribbons may be particularly detrimental in certain instances. For example, applications relying on the tensile strength or gas impermeability of graphene nanoribbons may be negatively impacted by the presence of such holes. Furthermore, the presence of holes also negatively impacts the electrical conductivity obtained after oxidized graphene nanoribbons are reduced to form reduced graphene nanoribbons. Such holes remain when the oxidized graphene nanoribbons are reduced to form reduced graphene nanoribbons and interrupt the π-conjugated network produced upon reduction. For example, FIG. 5 shows an illustrative conductivity plot of reduced graphene nanoribbons prepared from oxidized graphene nanoribbons that were produced in both the presence and absence of a protective agent. As shown in FIG. 5, reduced ($H_2$/Ar, 300° C.) graphene nanoribbons prepared from oxidized graphene nanoribbons that were made in the presence of a protective agent (curve 500) clearly have a higher conductivity (1-2 orders of magnitude greater) than do reduced graphene nanoribbons prepared from oxidized graphene nanoribbons that were made in the absence of a protective agent (curve 510). The conductivity plot shown in FIG. 5 is for single-layer reduced graphene nanoribbons. Reduced graphene nanoribbons and further disclosure concerning their electrical conductivity are considered in more detail hereinbelow.

In various embodiments, the present disclosure also provides methods for preparing reduced graphene nanoribbons. The methods include providing oxidized graphene nanoribbons and reacting the oxidized graphene nanoribbons with at least one reducing agent. In various embodiments, the step of reacting the oxidized graphene nanoribbons with at least one reducing agent is conducted in the presence of at least one surfactant. In some embodiments, the step of reacting the oxidized graphene nanoribbons with at least one reducing agent is conducted on a surface. In some embodiments, the oxidized graphene nanoribbons are oxidized graphene nanoribbons that were produced by longitudinal opening of carbon nanotubes in the absence of protective agent, as set forth hereinabove. In some other embodiments, the oxidized graphene nanoribbons are oxidized graphene nanoribbons that were produced by longitudinal opening of carbon nanotubes in the presence of at least one protective agent, as set forth hereinabove.

Various reducing agents may be used to reduce oxidized graphene nanoribbons into reduced graphene nanoribbons. In various embodiments, the at least one reducing agent may be, for example, hydrazines, iodides, phosphines, phosphites, sulfides, sulfites, hydrosulfites, borohydrides, cyanoborohydrides, aluminum hydrides (e.g., lithium aluminum hydride), boranes, hydroxylamine, diimine, dissolving metal reductions, hydrogen and combinations thereof. In some embodiments, the at least one reducing agent is hydrazine hydrate or anhydrous hydrazine. In some embodiments, the anhydrous hydrazine or hydrazine hydrate is added in the presence of aqueous ammonia.

The structure of reduced graphene nanoribbons is generally thought to exist as $sp^2$-hybridized patches of pristine graphene that are interconnected through tetrahedral $sp^3$-hybridized carbon atoms which remain after reduction. Although reduced graphene nanoribbons are partially re-aromatized following reduction, such re-aromatization is typically not complete. Hence, the electrical conductivity of the reduced graphene nanoribbons is typically not as high as that of graphene prepared from graphite exfoliation.

As the number of oxygen-containing functional groups decreases during the reduction process to form reduced graphene nanoribbons, the reduced graphene nanoribbons sometimes aggregate as a result of increased π-stacking during re-aromatization. Such aggregation may be substantially eliminated or minimized by using at least one surfactant during the step of reacting the oxidized graphene nanoribbons with at least one reducing agent. The at least one surfactant advantageously inhibits the tendency of the reduced graphene nanoribbons to aggregate, providing substantially single-layer reduced graphene nanoribbons. Surfactants suitable for practicing the methods of the present disclosure include, for example, cationic surfactants, anionic surfactants, zwitterionic surfactants and neutral surfactants. In some embodiments, the at least one surfactant is sodium dodecyl sulfate (SDS).

In other various embodiments, the aggregation of reduced graphene nanoribbons may be restricted by controlling the degree to which the reducing step is allowed to occur. Without being bound by theory or mechanism, it is believed that the large number of oxygen-containing functionalities in oxidized graphene nanoribbons results in strong interlayer hydrogen-bonding interactions in multilayer oxidized graphene nanoribbons that have not been otherwise exfoliated. Reaction of the oxidized graphene nanoribbons with at least one reducing agent decreases the number of such functional groups in the reduced graphene nanoribbons and aids in their exfoliation. However, if the reduction is allowed to proceed too far, aggregation of the reduced graphene nanoribbons may again occur. According to present understanding of the reduction process, a near-complete reduction results in an increased interaction between the reduced graphene nanoribbon layers due to π-stacking.

In some embodiments, the reduction process is conducted such that a small residual quantity of oxygen-containing functional groups is allowed to remain in the reduced graphene nanoribbons. The residual oxygen-containing functional groups minimize both π-stacking interactions and interlayer hydrogen bonding between individual reduced graphene nanoribbons, thereby providing mostly mono- and few-layer reduced graphene nanoribbons. For example, in some embodiments of the methods for preparing reduced graphene nanoribbons, the highest concentrations of mono- and bi-layer reduced graphene nanoribbons are formed after 40-50 min of hydrazine treatment at 95° C., followed by gentle bath ultrasonication. Such bath sonication may be conducted with minimal damage to the reduced graphene nanoribbons, although more energetic sonication conditions can cut the graphene nanoribbons, as discussed in more detail hereinbelow. In some embodiments, the reduction process is conducted such that substantially all of the oxygen-containing functional groups are removed. Although such reduced graphene nanoribbons may aggregate due to π-stacking, in certain applications it may be desirable to minimize the quantity of residual oxygen-containing functional groups. For example, applications involving electrical conductivity of the reduced graphene nanoribbons may utilize such heavily reduced graphene nanoribbons.

Hydrazine, for example, removes ketone and hydroxyl groups from graphene nanoribbons but leaves behind carboxy groups in the reduced graphene nanoribbons. The residual carboxyl groups may remain in the reduced graphene nanoribbons and disrupt the π-conjugated network. Hydrogen, in contrast to hydrazine, may be more efficient in removing oxygen-containing functional groups from the graphene nanoribbons, particularly when heating is used. Reduction with hydrogen may also be conducted when the graphene nanoribbons are deposited on a surface. Heating alone may also be used to remove oxygen-containing functional groups from graphene nanoribbons. For example, edge oxidation (i.e., carboxylic acid groups) in graphene nanoribbons may be at least partially removed by heating the graphene nanoribbons at a high temperature such as, for example, greater than about 2000° C. Reduced graphene nanoribbons that have their edge oxidation removed may have higher conductivities than reduced graphene nanoribbons that have their oxygen-containing functional groups removed by other means. In various embodiments, borane ($BH_3$) may be used to reduce the graphene nanoribbons. Borane is particularly effective at reducing carboxylic acids to alcohols, and the alcohols can be further removed with hydrogen and heat in a second reduction step. In various embodiments, two reductions may be performed sequentially (one after the other). For example, an oxidized graphene nanoribbon may first be reduced with borane and then further reduced with hydrazine or hydrogen.

Figure 6:
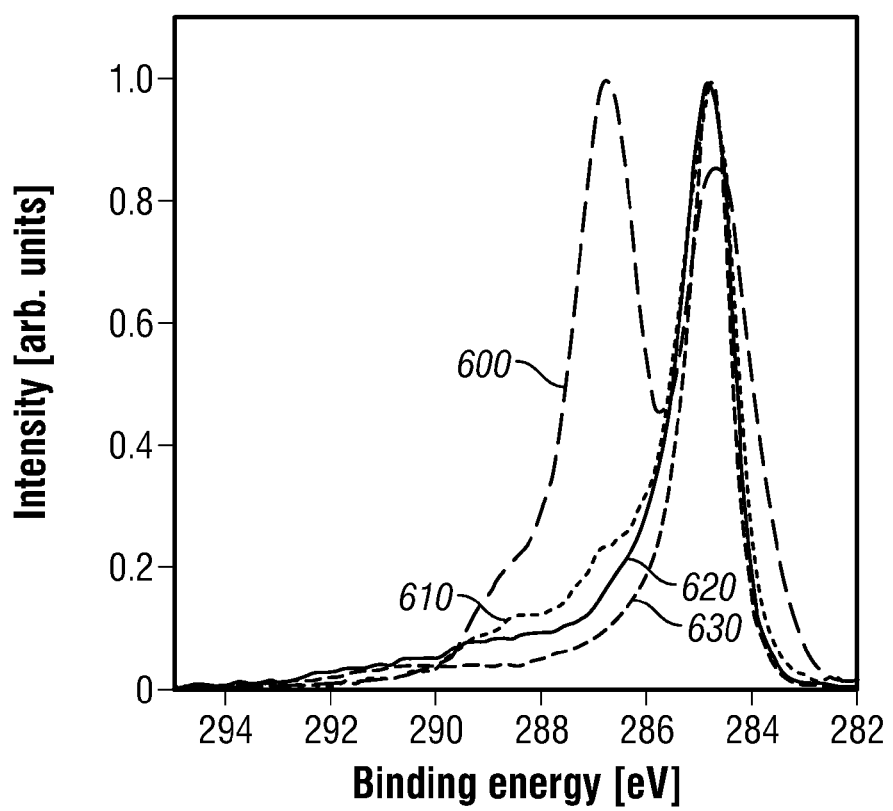
FIG. 6 shows illustrative C1s XPS data for oxidized graphene nanoribbons, hydrazine-reduced graphene nanoribbons, and hydrogen-reduced graphene nanoribbons prepared at 300° C. and 900° C.
Figure 7:
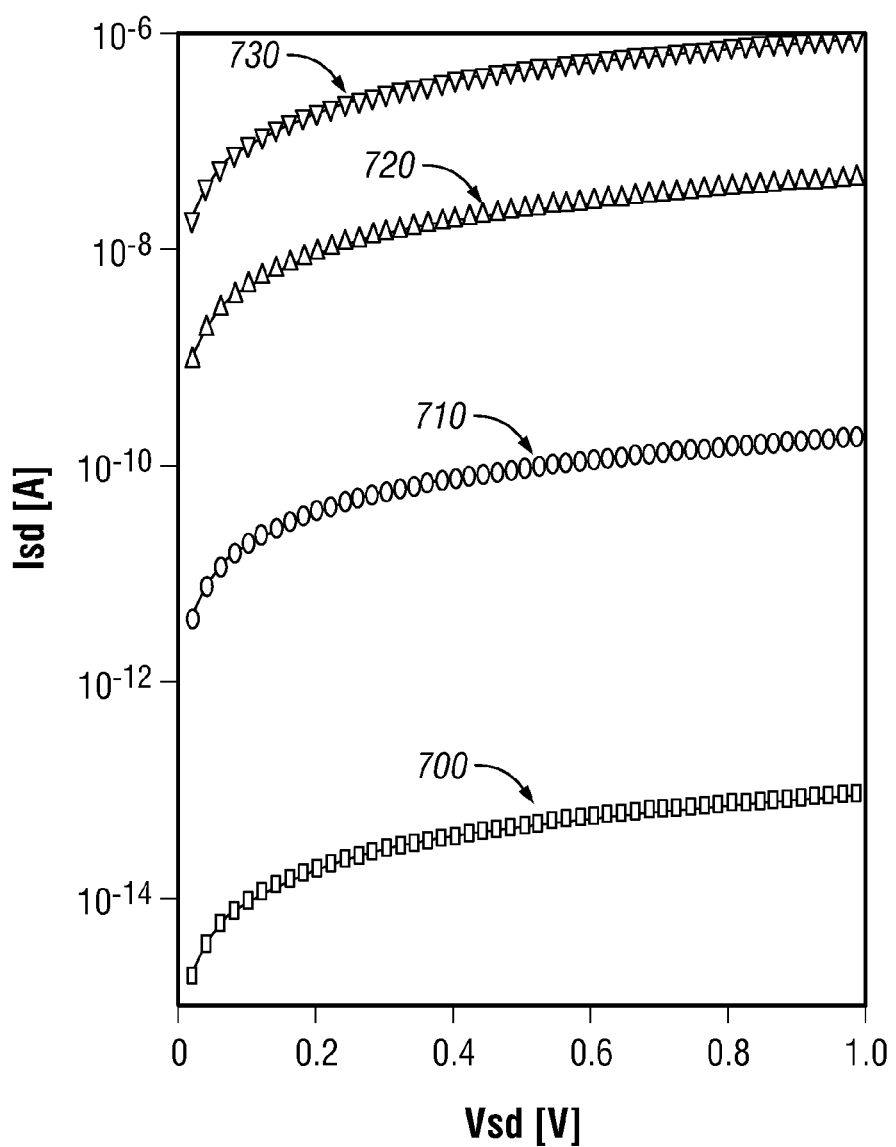
FIG. 7 shows illustrative conductivity plots for oxidized graphene nanoribbons, hydrazine-reduced graphene nanoribbons and hydrogen-reduced graphene nanoribbons prepared at 300° C. and 900° C.

As referenced hereinabove, not all reducing agents may remove oxygen-containing functional groups from graphene nanoribbons with equal efficacy or at the same rates. Hence, reduced graphene nanoribbons having different spectroscopic and physical properties may be obtained depending on how the reduction was performed. For example, FIG. 6 shows illustrative C1s XPS data for oxidized graphene nanoribbons (curve 600), hydrazine-reduced graphene nanoribbons (curve 610) and hydrogen-reduced graphene nanoribbons prepared at 300° C. and 900° C. (curves 620 and 630, respectively). The XPS data shown in FIG. 6 clearly demonstrates that different amounts of oxygen-functional groups remain in the reduced graphene nanoribbons. FIG. 7 shows illustrative conductivity plots for oxidized graphene nanoribbons (curve 700), hydrazine-reduced graphene nanoribbons (curve 710) and hydrogen-reduced graphene nanoribbons prepared at 300° C. and 900° C. (curves 720 and 730, respectively). The illustrative conductivity plots shown in FIG. 7 further illustrate that the reduced graphene nanoribbons may have different properties depending on how their reduction is performed. The XPS spectra and conductivity data of reduced graphene nanoribbons are discussed in more detail hereinbelow in the Experimental Examples.

As also referenced hereinabove, reduced graphene nanoribbons have different spectroscopic and physical properties depending on whether they were prepared from oxidized graphene nanoribbons that were prepared in the presence or absence of a protective agent. Experimental evidence showing that reduced graphene nanoribbons can have such different spectroscopic and physical properties is further set forth in the Experimental Examples hereinbelow.

In various embodiments, oxidized graphene nanoribbons may be further functionalized with at least one functional group. For example, oxygen-containing functional groups in oxidized graphene nanoribbons may be functionally transformed into new functional groups using reactions known to those of ordinary skill in the art of organic synthesis. As non-limiting examples, esters, amides, imines and ethers may be formed from residual carboxylic acids, epoxides, ketones and hydroxyl groups present in the oxidized graphene nanoribbons. In various embodiments, the oxygen-containing functional groups may be functionalized with a plurality of polymers. In some embodiments, the plurality of polymers include water-soluble polymers. For example, polymers and water-soluble polymers may be attached to graphene nanoribbons by forming esters or amides through residual carboxylic acid groups. Such water-soluble polymers and water-soluble graphene nanoribbon compositions so obtained are discussed in more detail hereinbelow.

In other various embodiments, reduced graphene nanoribbons may be further functionalized with at least one functional group. Such functionalization may be accomplished as set forth above for oxidized graphene nanoribbons. For example, residual carboxylic acids and ketones in reduced graphene nanoribbons may be further functionalized. In illustrative embodiments, carboxylic acids may be converted into esters or amides, and ketones may be converted into imines. Such imines can further be converted into amines by standard synthetic protocols used in reductive amination. Such further transformation of the residual functional groups in reduced graphene nanoribbons may be conducted in addition to another functionalization procedure, or the residual functional groups may be transformed without any additional functionalization procedures conducted.

In additional embodiments, reduced graphene nanoribbons may be further functionalized without using the residual oxygen-containing functional groups remaining after reduction. Hereinafter, such reduced graphene nanoribbons that are further functionalized with at least one functional group are referred to simply as functionalized graphene nanoribbons. In non-limiting examples, any of the various functionalization chemistries that are used for functionalization of carbon nanotube endcaps or sidewalls may be adapted to functionalize reduced graphene nanoribbons. In some embodiments, the functionalized graphene nanoribbons are functionalized on the edges of the nanoribbons. In other embodiments, the functionalized graphene nanoribbons are functionalized on the basal plane of the nanoribbons. In still other embodiments, the functionalized graphene nanoribbons are functionalized both on the basal plane and at the edges of the nanoribbons. In some embodiments, the at least one functional group is connected to the reduced graphene nanoribbon through a carbon-carbon bond.

In various embodiments, the functionalized graphene nanoribbons may be defunctionalized by heating. Such heating regenerates reduced graphene nanoribbons. For example, heating functionalized graphene nanoribbons to greater than about 200° C. may defunctionalize the functionalized graphene nanoribbons.

As a non-limiting example of the functionalization chemistries that may be conducted to prepare functionalized graphene nanoribbons, reduced graphene nanoribbons may be functionalized using a diazonium species. In some embodiments, the diazonium species may be a pre-formed diazonium salt. In other embodiments, the diazonium species may be a diazonium salt that is formed in situ. A diazonium species may be formed in situ by, for example, treating an amine with an organic nitrite such as, for example, isoamyl nitrite. In various embodiments, the diazonium species is an aryl diazonium salt. In various embodiments, an aryl diazonium salt may be formed in situ by treating an aniline with an organic nitrite. In some embodiments, a reaction between the reduced graphene nanoribbons and an aniline may be initiated through use of a radical initiator such as, for example, azobisisobutyronitrile (AIBN). Other types of functionalization reactions may be envisioned using carbene addition.

Reduced graphene nanoribbons that have been functionalized with a diazonium species maintain their same relative oxidation state after the functionalization is completed. For example, reduced graphene nanoribbons that are functionalized with a diazonium species remain in a reduced state after functionalization. Although functionalized graphene nanoribbons are, in general, less electrically conductive than are their reduced graphene nanoribbon counterparts, the electrical conductivity can be restored by defunctionalizing through heating as set forth hereinabove.

In various embodiments, methods for preparing reduced graphene nanoribbons further include functionalizing the reduced graphene nanoribbons with a plurality of functional groups. The functionalizing step is conducted after the reducing step. The reduced graphene nanoribbons include edges and a basal plane. The plurality of functional groups are bonded to the reduced graphene nanoribbons in a location including, for example, on the edges, on the basal plane and combinations thereof. In some embodiments, the plurality of functional groups are introduced by using a diazonium species. In some embodiments, the plurality of functional groups are bonded to the reduced graphene nanoribbons through carbon-carbon bonds.

Functionalized graphene nanoribbons possess increased solubility in organic solvents (e.g., N,N-dimethylformamide or N-methylpyrrolidinone) and are more processable as a result. Functionalized graphene nanoribbons may also be more soluble in water. For example, oxidized graphene nanoribbons and reduced graphene nanoribbons may be made water soluble by attaching water soluble polymers to the graphene nanoribbons through ester or amide bonds. Water-soluble polymers may include, for example, poly(ethyleneglycol), poly(vinyl alcohol), and poly(ethylene imine). Advantageously, functionalized graphene nanoribbons may have a reduced tendency to aggregate compared to unfunctionalized graphene nanoribbons of the same oxidation type. Improved solubility and decreased tendency to aggregate are particularly beneficial for processing of reduced graphene nanoribbons. For example, functionalized graphene nanoribbons may be dispersed in a solvent more readily than unfunctionalized, reduced graphene nanoribbons. In applications where a surfactant may not be employed, functionalized, reduced graphene nanoribbons may possess particular utility. Furthermore, when unfunctionalized, reduced graphene nanoribbons are needed in an application after being processed, the functionalized graphene nanoribbons may be defunctionalized by heating to greater than about 200° C., for example, as set forth hereinabove.

In various embodiments, graphene nanoribbons may be shortened by a cutting process. For example, the graphene nanoribbons may be mechanically cut, lithographically cut, chemically cut or sonochemically cut. Typically, the graphene nanoribbons produced by the methods described herein are handled carefully so as not to produce accidental cutting. For example, suspensions of the graphene nanoribbons are typically stirred gently or sonicated for short periods of time using a bath sonicator. When the graphene nanoribbons are sonicated more vigorously using, for example, probe or cup sonication techniques, cutting of the graphene nanoribbons results. In various embodiments, methods for preparation of graphene nanoribbons further includes sonicating the graphene nanoribbons with a probe or cup sonicator, wherein the sonicating step shortens the graphene nanoribbons. The graphene nanoribbons cut by sonication may be either oxidized graphene nanoribbons or reduced graphene nanoribbons. Cutting may also be accomplished chemically or through application of high shear forces.

Various uses of graphene nanoribbons and compositions derived therefrom are contemplated in the discussion that follows. In any of the various embodiments hereinbelow, either oxidized graphene nanoribbons or reduced graphene nanoribbons may be used, unless indicated to the contrary.

Figure 8:
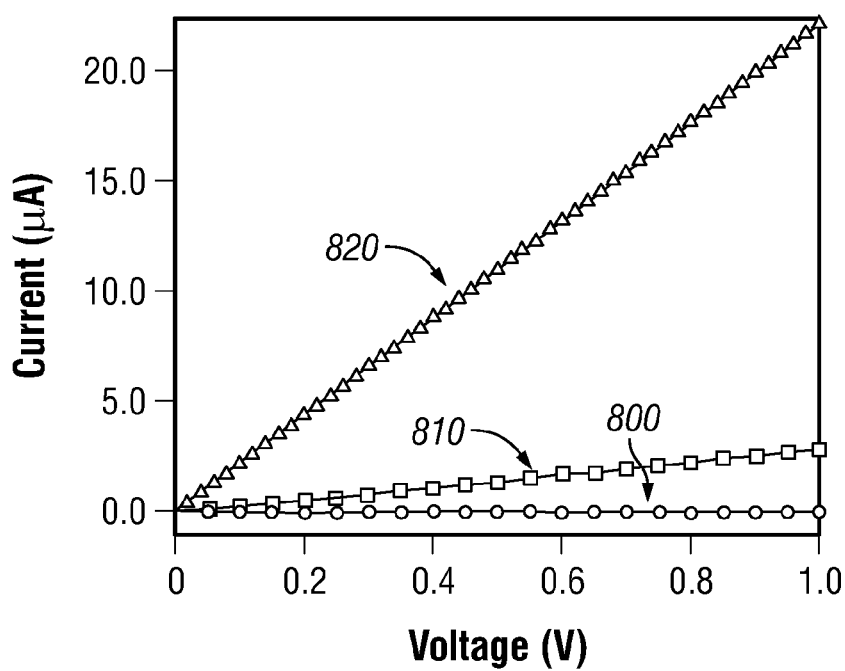
FIG. 8 shows an illustrative current vs. voltage plot for oxidized graphene nanoribbons, hydrazine-reduced graphene nanoribbons and hydrazine-reduced graphene nanoribbons that have been further annealed in $H_2$.

Electronics Applications. As referenced hereinabove, reduced graphene nanoribbons are electrically conductive. For example, FIG. 8 shows an illustrative current vs. voltage plot for oxidized graphene nanoribbons (curve 800), hydrazine-reduced graphene nanoribbons (curve 810) and hydrazine-reduced graphene nanoribbons that have been further annealed in $H_2$ (curve 820). As shown in FIG. 8, oxidized graphene nanoribbons are substantially non-conductive or semiconductive, whereas hydrazine-reduced graphene nanoribbons display some electrical conductivity. However, as shown hereinbelow, oxidized graphene nanoribbons may be in a semiconducting state and may be used to form semiconducting thin films. Hydrazine-reduced graphene nanoribbons that have been further annealed in $H_2$ display a still higher electrical conductivity (see curve 820). Without being bound by theory or mechanism, Applicants believe that the much higher electrical conductivity of the $H_2$-annealed reduced graphene nanoribbons is due to removal of carboxylic acid groups in hydrogen. The electrical conductivity makes the reduced graphene nanoribbons suitable for use in a variety of electronic devices and thin film electrical conductors. Such electronic devices include, without limitation, transistors, memories, two-terminal electronic devices, three-terminal electronic devices, gated electronic devices, non-gated electronic devices, sensors, field emission cathodes, ultracapacitors and supercapacitors.

In some embodiments, graphene nanoribbon electronic devices are disclosed herein. The graphene nanoribbon electronic devices include at least two electrodes connected by at least one graphene nanoribbon. In some embodiments, the at least one graphene nanoribbon is an oxidized graphene nanoribbon. In some embodiments, the at least one graphene nanoribbon is a reduced graphene nanoribbon. In some embodiments, the reduced graphene nanoribbons further include at least one selective complexing agent bound to the reduced graphene nanoribbons. Such selective complexing agents include, for example, folate, estrogens, biotin, proteins, polysaccharides, lipids, nucleic acids, chelating agents and combinations thereof. In various embodiments, interaction of molecules or cations with the selective complexing agents may alter the electrical properties of the reduced graphene nanoribbons. Methods for producing such graphene nanoribbon electronic devices include connecting at least two electrodes with at least one reduced graphene nanoribbon.

In some embodiments of the graphene nanoribbon electronic devices, the at least one graphene nanoribbon is deposited atop the at least two electrodes. In other embodiments, the at least one graphene nanoribbon is deposited under the at least two electrodes. For example, the at least one graphene nanoribbon may be deposited on a substrate, and the at least two electrodes may then be deposited atop the at least one graphene nanoribbon. In some embodiments, the substrate is non-conductive. In other embodiments, the substrate is a doped substrate. In some embodiments, the substrate is semiconductive. In some other embodiments, the substrate is conductive.

Figure 9:
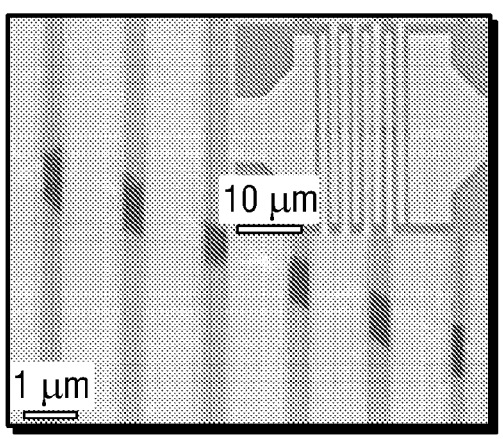
FIG. 9 shows an SEM image of an illustrative multi-terminal electronic device having a stack of reduced graphene nanoribbons interconnecting the terminals.

FIG. 9 shows an SEM image of an illustrative multi-terminal electronic device having a stack of reduced graphene nanoribbons interconnecting the terminals. The number of terminals in the multi-terminal electronic devices may vary without limitation, up to the length of the graphene nanoribbon used for construction of the electronic device. For example, two-terminal electronic devices, three-terminal electronic devices and electronic devices having more than three terminals reside within the spirit and scope of the present disclosure. In various embodiments, the reduced graphene nanoribbon electronic devices may be constructed in a crossbar architecture. In some embodiments, the electronic devices further include at least one gate electrode. In some embodiments, the reduced graphene nanoribbons are deposited on a non-conductive substrate surface.

Figure 10:
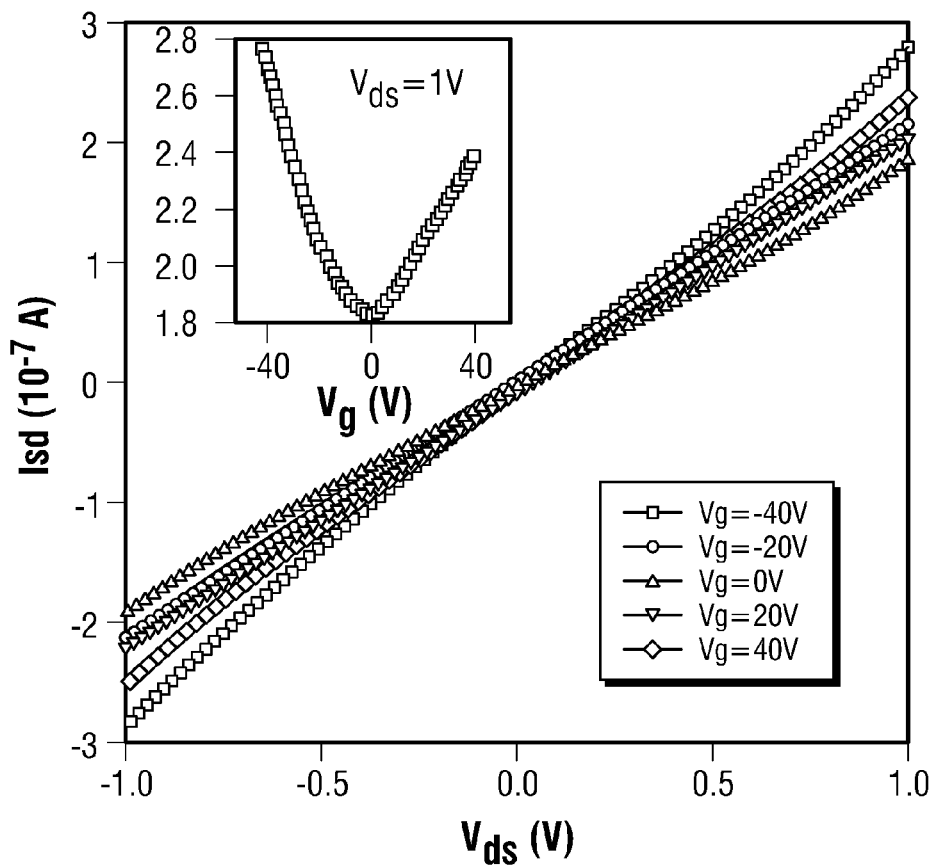
FIG. 10 shows an illustrative current versus voltage plot for a reduced graphene nanoribbon bilayer in the presence of various gate voltages.

FIG. 10 presents an illustrative current versus voltage plot for a reduced graphene nanoribbon bilayer in the presence of various gate voltages. As indicated in FIG. 10, a reduced graphene nanoribbon bilayer has field-effect properties with a minimum conductivity at zero gate voltage. In contrast, thicker reduced graphene nanoribbon layers showed less gate effect as the thickness of the reduced graphene nanoribbon layers increased (data not shown). Additional data concerning reduced graphene nanoribbon electronic devices and the effect of layer thickness is contained in the Experimental Examples.

In some embodiments, carbon nanotubes may be converted into oxidized graphene nanoribbons and subsequently transformed into reduced graphene nanoribbons, starting from an electronic device containing carbon nanotubes. For example, a carbon nanotube connecting two electrode terminals may be longitudinally opened using the methods disclosed herein to form oxidized graphene nanoribbons connected the two electrode terminals. The oxidized graphene nanoribbons may then be subsequently transformed into reduced graphene nanoribbons connecting the two electrode terminals to restore electrical conductivity. In some embodiments, a single reduced graphene nanoribbon layer may connect the two electrode terminals. In other embodiments, two or more layers of reduced graphene nanoribbons may connect the two electrode terminals.

Figure 11:
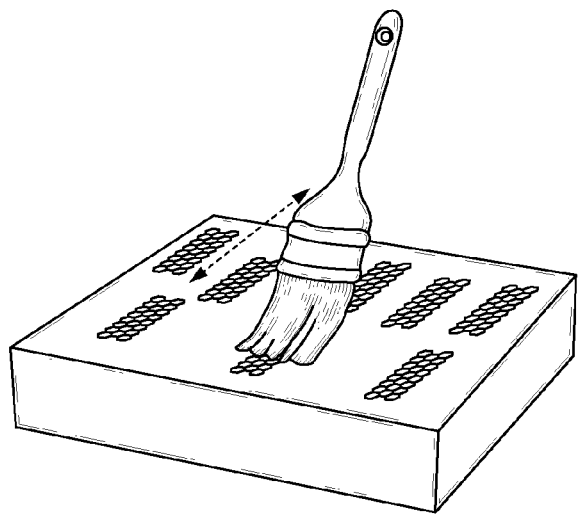
FIG. 11 shows an illustrative schematic demonstrating the application of reduced graphene nanoribbons to a surface using a paintbrush.

In some embodiments, reduced graphene nanoribbon electronic devices may be prepared by depositing a solution of reduced graphene nanoribbons on a substrate surface and then constructing the electronic devices. In some embodiments, depositing the reduced graphene nanoribbons involves spreading a dilute solution of reduced graphene nanoribbons placed on the substrate surface. In some embodiments, spreading is conducted with a brush. In some embodiments, the step of spreading aligns the reduced graphene nanoribbons on the substrate surface. For example, a droplet of a dilute solution of reduced graphene nanoribbons may be placed on a substrate surface and then spread with a soft-bristle paintbrush. In some embodiments, the paintbrush strokes are unidirectional. In some embodiments, the unidirectional strokes are away from the painter. The solvent evaporates as the reduced graphene nanoribbons are deposited on the substrate surface. FIG. 11 shows an illustrative schematic demonstrating the application of reduced graphene nanoribbons to a substrate surface using a paintbrush. The brushing process induces shear forces that are sufficient to substantially align the reduced graphene nanoribbons on the substrate surface (see FIG. 11). However, the shear forces are generally not sufficient to induce cutting or shortening of the reduced graphene nanoribbons. After drying, van der Waals interactions of the reduced graphene nanoribbons with the substrate surface are sufficiently strong that the reduced graphene nanoribbons are not removed from the surface by washing with deionized water. In some embodiments, the substrate surface containing substantially-aligned graphene nanoribbons may be rotated by 90 degrees, and an orthogonal application of graphene nanoribbons may be used to paint a cross-patched pattern of graphene nanoribbons. Such a cross-patched orthogonal pattern can maximize subsequent electrical percolation across the surface while minimizing the quantity of graphene nanoribbons used. Minimizing the quantity of graphene nanoribbons advantageously maximizes the optical transparency of the graphene nanoribbon film. One of ordinary skill in the art will recognize that a 90 degree turn should not be considered limiting, and any turning angle within 0 to 180 degrees lies within the spirit and scope of the present disclosure.

In various embodiments, reduced graphene nanoribbons may be used as conductors of low dimensionality for electronic and spintronic applications.

In some embodiments, graphene nanoribbon sensors are disclosed herein. Both gas sensors and sensors for small and large molecules, including biologically-derived molecules and cells, are contemplated herein. In some embodiments, the graphene nanoribbon sensors include at least one graphene nanoribbon connecting at least two electrodes. In some embodiments, the at least one graphene nanoribbon is a reduced graphene nanoribbon. In some embodiments, the reduced graphene nanoribbons further include at least one selective complexing agent bound to the reduced graphene nanoribbons. Such selective complexing agents have been set forth hereinabove. Bonding of a target molecule to the graphene nanoribbon sensors changes their electronic properties, resulting in their sensing capabilities. Methods for producing such graphene nanoribbon sensors include connecting at least two electrodes with at least one reduced graphene nanoribbon.

In various embodiments, thin films containing graphene nanoribbons are described herein. The graphene nanoribbons may be oxidized graphene nanoribbons, reduced graphene nanoribbons or combinations thereof. In some embodiments, the thin film is an electrically conductive thin film and the graphene nanoribbons are reduced graphene nanoribbons. In other embodiments, the thin film is a semiconductive thin film and the graphene nanoribbons are oxidized graphene nanoribbons that are in a semiconducting state. In various embodiments of the thin films, the graphene nanoribbons include shortened graphene nanoribbons. In other various embodiments of the thin films, the graphene nanoribbons are functionalized graphene nanoribbons.

In any of the various embodiments of graphene nanoribbon thin films, the films can be prepared at a thickness such that they are substantially transparent in the visible region of the electromagnetic spectrum, while retaining their conductivity or semiconductivity. In some embodiments, such substantially transparent thin films have a transmittance of greater than about 30 percent at about 550 nm. In other embodiments, such substantially transparent thin films have a transmittance of greater than about 70 percent at about 550 nm. In still other various embodiments, such substantially transparent thin films have a transmittance of greater than about 80 percent at about 550 nm. In various embodiments, such substantially transparent graphene nanoribbon films may serve as a wide area transparent electrode. For example, such wide area transparent electrodes may be used in imaging devices and touch screen displays.

In other various embodiments, methods for preparing graphene nanoribbon thin films are disclosed. In some embodiments, such methods include applying a dispersion of graphene nanoribbons in at least one solvent to a non-conductive substrate and then removing the at least one solvent. In some embodiments, the at least one solvent is water. In other embodiments, the at least one solvent is one or more organic solvents. In still other embodiments, the at least one organic solvent is a combination of an organic solvent and water. In some embodiments, the thin films of graphene nanoribbons are applied to a surface by spreading a solution of graphene nanoribbons on a surface. In other embodiments, the thin films of graphene nanoribbons are applied to a surface by applying a graphene nanoribbon ink. For example, ink jet, gravure, or any other type of ink printing technique may be used to form the graphene nanoribbon thin films. In various embodiments, the thin films are deposited by a method including, for example, spin-coating, dip-coating, doctor-blading, inkjet printing, gravure printing and brushing. In some embodiments of the methods, the graphene nanoribbons are oxidized graphene nanoribbons. In other embodiments of the methods, the graphene nanoribbons are reduced graphene nanoribbons. In some embodiments of the methods, the graphene nanoribbons have been shortened by cutting.

In some embodiments herein, methods for producing electrically conductive thin films containing graphene nanoribbons include applying a dispersion of oxidized graphene nanoribbons in at least one solvent to a non-conductive substrate; removing the at least one solvent; and reacting the oxidized graphene nanoribbons with at least one reducing agent. The reducing step converts the oxidized graphene nanoribbons from a low conductivity or semiconductive state into a conductive state by forming reduced graphene nanoribbons. The at least one solvent may be selected as set forth hereinabove. Selection of the at least one reducing agent may be conducted from the illustrative reducing agents set forth hereinabove. In various embodiments, the at least one reducing agent is hydrogen. In various embodiments, the reacting step involves heating.

Any of the various embodiments of electrically conductive graphene nanoribbon thin films may be utilized for forming field emission cathodes. However, instead of depositing the electrically conductive graphene nanoribbon thin film on a non-conductive substrate, the electrically conductive graphene nanoribbon thin film is deposited on a cathode surface (i.e., a conductor). In some embodiments of the field emission cathodes, the graphene nanoribbons are reduced graphene nanoribbons. In some embodiments, the reduced graphene nanoribbons are shortened by cutting.

In some embodiments, methods for preparing field emission cathodes include applying a dispersion of reduced graphene nanoribbons in at least one solvent to a cathode surface and then removing the at least one solvent. In other various embodiments, methods for preparing field emission cathodes include applying a dispersion of oxidized graphene nanoribbons in at least one solvent to a cathode surface; removing the at least one solvent; and reacting the oxidized graphene nanoribbons with at least one reducing agent to form reduced graphene nanoribbons. In some embodiments, the oxidized graphene nanoribbons are shortened by cutting. In some embodiments, the reacting step involves heating. In some embodiments, the reducing agent is hydrogen. In some embodiments, the reduced graphene nanoribbons are functionalized. In some embodiments, the reduced graphene nanoribbons are further modified with at least one selective complexing agent as set forth hereinabove.

In some embodiments, a vertically-aligned array of carbon nanotubes, in which one or both ends of the carbon nanotubes are bound to a substrate, may be longitudinally opened to form an array of graphene nanoribbons using the methods disclosed herein. For example, such a vertically-aligned array of carbon nanotubes may be longitudinally opened using an oxidant as set forth hereinabove to form an array of oxidized graphene nanoribbons. The oxidized graphene nanoribbons can subsequently be reduced to form an array of reduced graphene nanoribbons. Such arrays of graphene nanoribbons may be particularly beneficial for use in supercapacitors and ultracapacitor arrays.

Ion Exchange Filters. In various embodiments, graphene nanoribbons may be included in ion exchange filters. In various embodiments, the graphene nanoribbons are oxidized graphene nanoribbons. In other various embodiments, the graphene nanoribbons are reduced graphene nanoribbons containing carboxylic acid groups. As carboxylic acids, oxidized graphene nanoribbons and reduced graphene nanoribbons may form strong complexes with cationic species that aggregate into macroscopic clumps and precipitate from water. Ion exchange filters made from graphene nanoribbons may advantageously have higher specific exchange capacities than similar filters made from flake graphite oxide, owing to the higher ratio of edge carbon atoms to total carbon atoms in the graphene nanoribbons compared to graphite oxide. Accordingly, due to the higher ratio of edge carbons, a larger number of carboxylic acid groups per weight of carbon are available for complexing cationic species. Narrow graphene nanoribbons derived from single-wall carbon nanotubes are expected to be especially advantageous for use in ion exchange filters, since their ratio of edge carbon atoms to total carbon atoms is particularly high.

Filter Membranes. In various embodiments, graphene nanoribbons may be included in filter membranes. For example, in certain embodiments, a dispersion of graphene nanoribbons in at least one solvent may be filtered through a porous membrane to form a graphene nanoribbon mat having a porosity and a permeability. In various embodiments, graphene nanoribbon mats may be used to remove at least one dissolved cation from a solution by filtering the solution through the graphene nanoribbon mat. In some embodiments, the graphene nanoribbons of the filter membranes are further modified with at least one selective complex forming agent as set forth hereinabove. In such embodiments, a species may be removed from a liquid by filtering the liquid through a graphene nanoribbon mat that contains a selective complexing agent that binds the species in the liquid. For example, such graphene nanoribbon filter membranes may be useful in wastewater treatment.

In various embodiments, graphene nanoribbon filter membranes may adsorb hydrophobic organic molecules. In various embodiments, a graphene nanoribbon filter membrane may be used to remove hydrophobic organic molecules from a solution by filtering the solution through the graphene nanoribbon filter membranes. The solution can be in an organic solvent or an aqueous solution, for example. Hydrophobic organic molecules include, for example, aliphatic hydrocarbons, aromatic hydrocarbons, and halogenated organic compounds. In various embodiments, methods of the present disclosure include filtering a solution containing hydrophobic organic molecules through a graphene nanoribbon filter membrane to remove the hydrophobic organic molecules from the solution.

Graphene nanoribbon filter membranes are characterized by a porosity and permeability, which is inversely proportional to the thickness of the graphene nanoribbon mat. The graphene nanoribbon mat thickness and, hence, the porosity and permeability can be varied within a wide range of values. At sufficient thicknesses graphene nanoribbon filter membranes may be used to remove micrometer-, submicrometer- and nanometer-sized particles such as protozoa, bacteria, viruses, large proteins, metallic nanoparticles and carbon nanotubes. In various embodiments of the present disclosure, methods for removal of such particles from solution include filtering a solution containing such particles through a graphene nanoribbon filter membrane. As discussed hereinabove, graphene nanoribbon filter membranes of sufficient porosity and permeability prevent the passage of the particles sizes referenced above. In some embodiments, the graphene nanoribbons may be further modified with at least one selective complex forming agent.

Composite Materials. Graphene nanoribbons may be incorporated into organic and inorganic matrices such as, for example, polymer matrices. The polymer matrices can include, without limitation, thermoplastic and thermosetting polymer matrices. In various embodiments, polymer composite materials having incorporated graphene nanoribbons are described in the present disclosure. Incorporation of graphene nanoribbons may improve mechanical properties of the polymer composites. In some embodiments, polymer membranes including graphene nanoribbons may be prepared which are useful for fluid separations, antistatic applications, or electromagnetic shielding materials. In some embodiments, the graphene nanoribbons are oxidized graphene nanoribbons. In other embodiments, the graphene nanoribbons are reduced graphene nanoribbons. In some embodiments, the graphene nanoribbons are dispersed as individuals in the polymer matrices. In other embodiments, the graphene nanoribbons are aggregated together in two or more layers in the polymer matrices. In some embodiments, the graphene nanoribbons are covalently bonded to the polymer matrices. For example, carboxylic acid groups of graphene nanoribbons may be utilized for making cross-linked polymer composites in which the graphene nanoribbons are covalently bonded to the polymer matrix. Other functional groups in the graphene nanoribbons may be utilized as well for making cross-linked polymer composites. In other embodiments, the graphene nanoribbons are not covalently bonded to the polymer matrices. As a non-limiting example of composite materials, reinforced rubber composites including graphene nanoribbons may be used to manufacture gaskets and seals with improved tolerance to explosive decompression.

The high content of carboxyl groups in graphene nanoribbons may improve matrix compatibility compared to related carbon materials such as, for example, carbon nanotubes and flake graphite oxide due to the higher degree of edge and/or basal plane functionalities in the graphene nanoribbons. Matrix compatibility may be further adjusted by chemical means such as, for example, esterification of the carboxyls, amidation of the carboxyls, and nucleophilic opening of epoxides on the graphene nanoribbon surface. Furthermore, hydroxyl groups in the graphene nanoribbons may be functionalized through methods known to those of ordinary skill in the art.

In certain embodiments herein, the present disclosure provides methods for producing polymer composites. The methods include mixing graphene nanoribbons with at least one polymer or polymer precursor such as for example, epoxy resins and curing agents. In some embodiments, the at least one polymer is a rubber. If electric conductivity or antistatic properties of a composite material containing graphene nanoribbons is desired, oxidized graphene nanoribbons may be reduced either before or after their incorporation into the at least one polymer. For example, oxidized graphene nanoribbons may be mixed in a polymer and then reduced. Alternately, reduced graphene nanoribbons may be mixed directly in a polymer.

Drilling Fluids. Drilling fluids are often used in petroleum recovery processes. Drilling fluids including graphenes are described in commonly assigned PCT publication WO 2009/089391, which is incorporated by reference herein in its entirety. Likewise, graphene nanoribbons may be included in drilling fluids. Graphene nanoribbons may be desirable in drilling fluids, since the permeability of graphene nanoribbon mats falls dramatically as the thickness of the mats increases. Therefore, graphene nanoribbons may be used as additive in drilling fluids to provide advantageous properties such as, for example, low viscosity, high lubricity and high thermal stability as compared to traditional drilling fluid formulations. Likewise, in non-limiting examples, high shear milling or ultrasound treatment of the graphene nanoribbons may be used to produce shortened graphene nanoribbons of a few hundred nanometers in length. Such shortened graphene nanoribbons may also be used in the drilling fluids described herein. Graphene nanoribbons and shortened graphene nanoribbons may be particularly advantageous for reducing permeability in drilling fluid applications for rock formations of very fine porosity. Methods for producing such drilling fluids are described herein and include adding graphene nanoribbons or shortened graphene nanoribbons to a drilling fluid.

Gas Separation Membranes. In various embodiments herein, gas separation membranes including graphene nanoribbons are described. Disclosure regarding the gas adsorption properties of graphene nanoribbons is set forth hereinabove and in the Experimental Examples. Methods for preparation of gas separation membranes include adding graphene nanoribbons to a membrane.

Water Soluble Graphene Nanoribbon Compositions. Water soluble graphene nanoribbon compositions may be prepared by attaching a plurality of polymer chains or small molecules to the graphene nanoribbons. In various embodiments, the graphene nanoribbons are oxidized graphene nanoribbons. In other various embodiments, the graphene nanoribbons are reduced graphene nanoribbons. In still other various embodiments, the graphene nanoribbons are shortened by cutting. The polymer chains or small molecules may be attached to functional groups on the graphene nanoribbons. The functional groups may be inherently present on the graphene nanoribbons (e.g., carboxyl groups, epoxides, hydroxyls and ketones), or the functional groups may be attached independently in functionalized graphene nanoribbons. Suitable polymers for conferring water solubility may include, for example, polyethylene glycol (PEG), polypropylene glycol, polyethylene imine (PEI), PEG-PEI block copolymers, polyvinyl pyrrolidone (PVP), polyvinyl alcohol (PVA), polyacrylic acid, starch, pectin, agarose, and other polysaccharides. Suitable small molecules for conferring water solubility include, for example, 2-aminoethanesulfonic acid. Block copolymers of any of these polymers may also be used. Other molecules may be advantageously used to modify the solubility of the graphene nanoribbons, alter their ion affinity, and improve their biocompatibility, for example. By way of non-limiting example, targeting moieties such as, for example, folate, estrogens, epidermal growth factor (EGF) and aptamers may be attached through PEG spacers of a length sufficient to provide effective interactions of the targeted graphene nanoribbons with appropriate receptors.

Chemical modification of graphene nanoribbons can make them suitable for selective binding to cells expressing target receptors from diverse cellular dispersions or other biological fluids. Such modified graphene nanoribbons may be fabricated into selective cellular filters or active elements of cellular and chemical sensors. For example, graphene nanoribbons functionalized with antibodies to influenza virus (or any other pathogen) and connecting two conductive leads (i.e., electrode terminals) will change impedance upon antigen binding. The resulting change in electrical properties enables the use of these functionalized graphene nanoribbons in sensors for diagnostic testing of biological fluids.

Water soluble graphene nanoribbon compositions such as those described above may be exploited for sequestration of water-insoluble drugs for drug delivery applications. For example, paclitaxel may be incorporated in a water-based formulation using water soluble graphene nanoribbons. Such sequestration of paclitaxel and other drugs within the water soluble polymers of like carbon nanotube compositions have been described in PCT publications WO 2008/18960 and WO 2009/070380, each of which are incorporated herein by reference. The amount of the water soluble graphene nanoribbon sufficient to provide acceptable solubility of paclitaxel or other drugs may be dramatically lower than surfactants typically used for the same purpose. Therefore, advantageous toxicity improvement is possible using the water soluble graphene nanoribbons as a drug delivery vehicle. In some embodiments of the water soluble graphene nanoribbons, the graphene nanoribbons are oxidized graphene nanoribbons. In other embodiments of the water soluble graphene nanoribbons, the graphene nanoribbons are reduced graphene nanoribbons. In still other various embodiments of the water soluble graphene nanoribbons, the graphene nanoribbons are shortened by cutting. Observed toxicities of the water soluble compositions made from shortened graphene nanoribbons can be even lower than that observed for like carbon nanotube compositions. Hence, the low toxicities of water soluble graphene nanoribbon compositions are advantageous for in vivo dosing applications.

In some embodiments, functionalizing the graphene nanoribbons with at least one polymer chain, such as, for example, a water soluble polymer chain, may improve the biocompatibility of the graphene nanoribbons. In some embodiments, the graphene nanoribbons may be targeted to at least one tissue in an organism. Such targeted graphene nanoribbons may include at least one selective complexing agent bound to the graphene nanoribbons. In some embodiments, the at least one selective complex agent is bound to the polymer chain. Graphene nanoribbons, their derivatives and pharmaceutical compositions having sequestered drug compounds within the polymer chains of such functionalized graphene nanoribbon structures may be administered to a human or other mammal subject in a dose sufficient to produce a desired therapeutic response or diagnostic result.

Use of Graphene Nanoribbons in Concrete. In various embodiments, graphene nanoribbons may be added to concrete to improve the mechanical properties of the concrete after curing and to lower the gas permeability of the concrete. For example, water-soluble graphene nanoribbon compositions can be prepared that may be dispersed with water and used in concrete mixing. Suitable water-soluble graphene nanoribbons include such graphene nanoribbons as those described hereinabove, as well as other water-soluble graphene nanoribbons. In other embodiments, an aqueous solution of oxidized graphene nanoribbons may be used. The water-soluble graphene nanoribbon compositions may increase load transfer between the concrete and the graphene nanoribbons. In some embodiments, the load transfer involves cross-linking.

Wound Dressings. In various embodiments, wound dressings including graphene nanoribbons are contemplated by the present disclosure. The graphene nanoribbons may include oxidized graphene nanoribbons, reduced graphene nanoribbons or a combination thereof that have been grafted or bonded to at least one anti-microbial agent. Such wound dressings advantageously improve infection suppression, provide odor control and inhibit lipophilic toxins from entering the wound. In various embodiments, methods for making wound dressings include adding graphene nanoribbons that have been grafted or bonded to at least one anti-microbial agent to a standard wound dressing. For example, graphene nanoribbons that have been grafted or bonded to at least one anti-microbial agent may be added to ordinary gauze.

EXPERIMENTAL EXAMPLES

The following examples are provided to more fully illustrate some of the embodiments of disclosed hereinabove. It should be appreciated by those of skill in the art that the techniques disclosed in the examples which follow represent techniques that constitute exemplary modes for practice of the disclosure. Those of skill in the art should, in light of the present disclosure, appreciate that many changes can be made in the specific embodiments that are disclosed and still obtain a like or similar result without departing from the spirit and scope of the disclosure.

TEM imaging was performed on a JEOL 2010. Samples were prepared by dispersing the nanoribbons in a 1:1 mixture of ethanol:water and then dropped onto 300 mesh holey lacey carbon grids on a copper support (Ted Pella, Inc.). AFM images were obtained with a Nanoscope IIIa (Digital Instruments/Veeco Metrology, Inc.), operating in tapping mode, using 1-10 Ohm-cm phosphorus (n) doped Si tips (Veeco, MPP-11100-140) at a scan rate of 2 Hz and 512×512 resolution. Samples for AFM analysis were prepared by spin coating aqueous solutions of nanoribbons at 3000 RPM onto a freshly cleaved mica surface (Ted Pella, Inc.) and the surface was rinsed during spinning with DI water and 2-isopropanol. UV-vis spectra were obtained on a SHIMADZU® UV-3101 PC spectrophotometer with samples contained in 1-mL quartz cuvettes. FT-IR was acquired on a NICOLET® FTIR Infrared Microscope with an Attenuated Total Reflectance (ATR) attachment. XPS was performed on a PHI Quantera SXM Scanning X-ray Microprobe with a pass energy of 26.00 eV, 45° takeoff angle and a 100 µm beam size. TGA (Q50, TA Instruments) was performed from room temperature to 950° C. at 10° C./min under argon. Raman spectroscopy was performed on a Renishaw Raman scope using a 633 nm He—Ne laser.

Example 1

Synthesis of Oxidized Graphene Nanoribbons from MWNTs (No Protective Agent)

Caution: A 0.5% (wt/vol) solution of $KMnO_4$ in $H_2SO_4$ is used in the present example and other examples herein. Precautions should be taken if increasing far above this wt/vol % solution, as 7% wt/vol $KMnO_4$ in $H_2SO_4$ has been reported to explode, presumably due to the formation of manganese heptoxide ($Mn_2O_7$) salts. In an illustrative procedure, MWNTs (150 mg, 12.5 meq carbon) were suspended in 150 ml of concentrated $H_2SO_4$ for 1 h to 12 h. $KMnO_4$ (750 mg, 4.75 mmol) was then added, and the mixture was stirred for 1 h at room temperature. The reaction was then heated in an oil bath at 55° C. for 30 min. The progress of the reaction was monitored by preparing two test tubes, one containing 1 ml of deionized water and 2-3 drops of hydrogen peroxide (30%), and one containing 1 ml of water only. Four or five drops of the reaction mixture were added to the test tubes, and each was bath-sonicated for 3 min. The color and dispersibility of the solution in the test tube containing the hydrogen peroxide was noted. When the solution was yellow/brown and the solid formed broke up into very small pieces, the reaction was judged to be complete. The water test tube was used to test the level of permanganate consumption. Evidence of the dark purple color of $KMnO_4$ was judged to be indicative of an incomplete reaction. A water solution with a dark red hue was judged to be indicative of complete permanganate consumption. Regarding color of the reaction mixture itself, the color changed from black to dark brown, with the green color of permanganate in acid disappearing upon completion of the reaction. If the reaction was incomplete after 30 min. at 55° C., the temperature was increased to 65° C., and reaction progress was monitored again until the permanganate had been completely consumed or nearly consumed.

When the reaction appeared complete or nearly complete, the temperature was increased to 70° C. and the solution was allowed to stabilize. Upon stabilization at 70° C., the reaction mixture was removed from the heat source, cooled to room temperature and poured on to 400 ml of ice containing 5 ml of 30% $H_2O_2$ (to prevent precipitation of insoluble $MnO_2$). After vacuum filtration through a PTFE membrane (5.0-µm pore size), the solid was removed and stirred in 150 ml of water for 30 min, and then bath-sonicated (Cole Parmer ultrasonic cleaner, Model 08849-00) for 15 min. The material was then flocculated by addition of 20 vol % concentrated HCl (30 ml). The solid was then filtered again through a PTFE membrane (0.45-µm pore size). The oxidized graphene nanoribbons were removed and stirred in 150 ml of ethanol for 30 min, and then bath-sonicated as above for 15 min. The product was flocculated by addition of 100 vol % ether (150 ml), followed by filtration through a PTFE membrane (0.45-µm pore size). The final product was washed twice with ether (50 ml each time) and dried in vacuo to afford 321 mg of oxidized graphene nanoribbons.

Figure 12A:
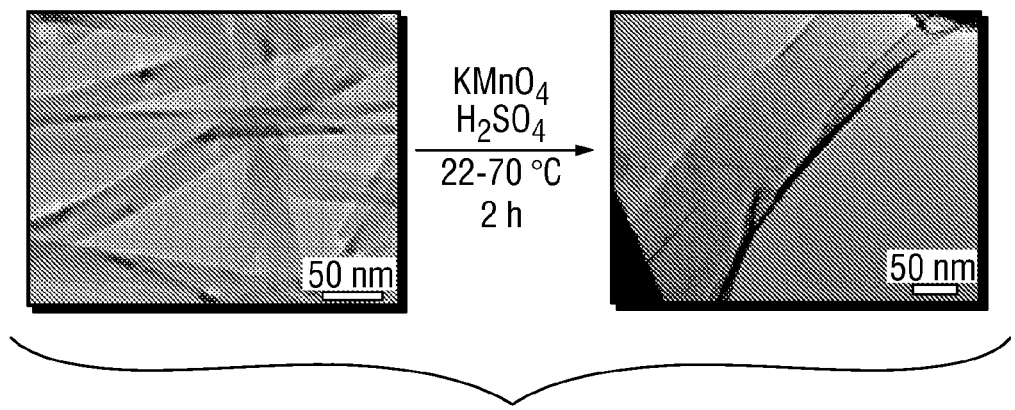
FIG. 12A shows illustrative TEM images of MWNTs compared to oxidized graphene nanoribbons produced from oxidation of the MWNTs.
Figure 12B:
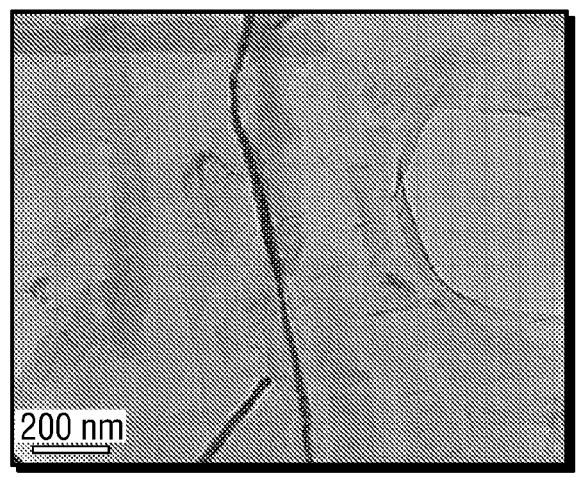
FIG. 12B shows an illustrative expanded TEM image of oxidized graphene nanoribbons.
Figure 13:
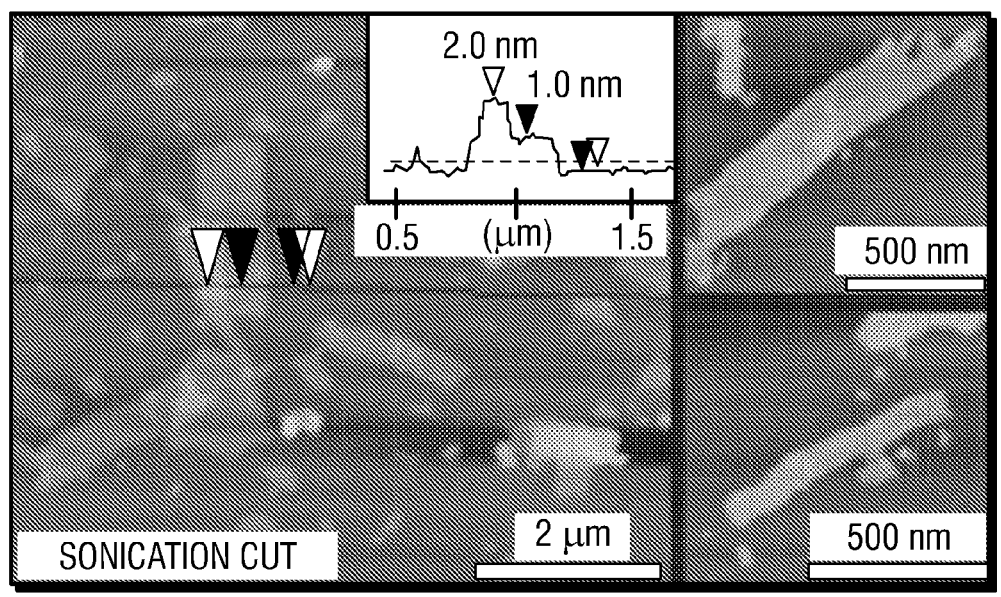
FIG. 13 shows illustrative AFM images of oxidized graphene nanoribbons which were shortened by sonication-induced cutting and were produced from oxidation of MWNTs.
Figure 14A:
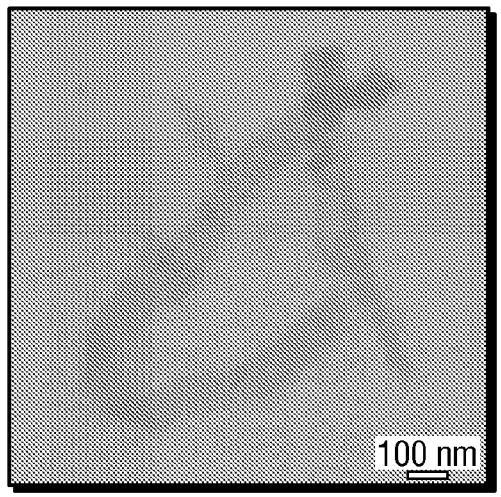
FIGS. 14A-14C show illustrative SEM images of oxidized graphene nanoribbons produced from oxidation of MWNTs.
Figure 14B:
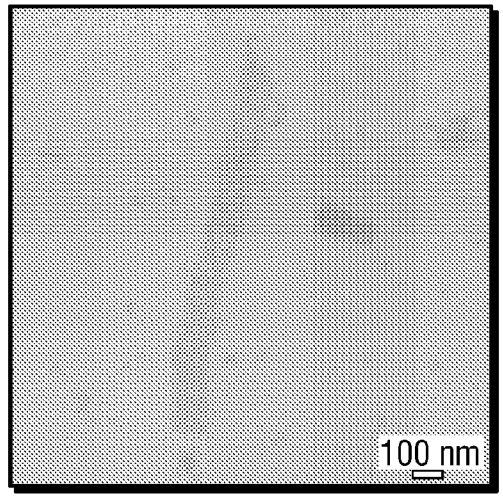
Figure 14C:
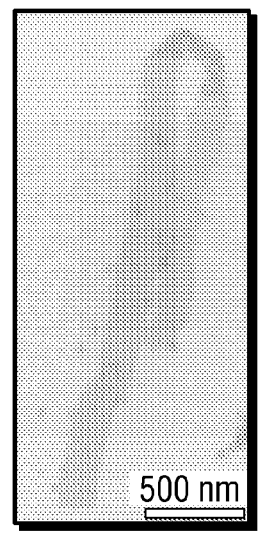
Figure 15:
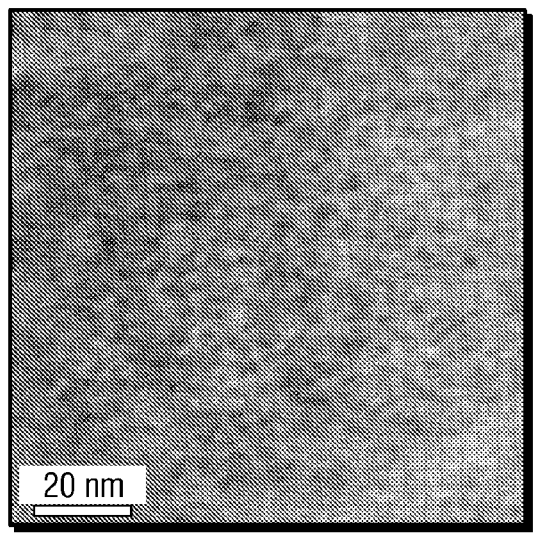
FIG. 15 shows an illustrative high-resolution TEM image of oxidized graphene nanoribbons produced from MWNTs in the absence of a protective agent.

Characterization of Oxidized Graphene Nanoribbons: Transmission electron microscopy (TEM), atomic force microscopy (AFM) and scanning electron microscopy (SEM) were used to image the oxidized graphene nanoribbons. FIG. 12A shows illustrative TEM images of MWNTs compared to oxidized graphene nanoribbons produced from oxidation of the MWNTs. FIG. 12B shows an illustrative expanded TEM image of oxidized graphene nanoribbons. TEM analyses showed that oxidized graphene nanoribbons having widths greater than about 100 nm were produced from oxidation of MWNTs having diameters between about 40 to 80 nm and about 15 to 20 nanotube layers. The oxidized graphene nanoribbons had substantially linear edges with little pristine MWNT structure remaining. FIG. 13 shows illustrative AFM images of oxidized graphene nanoribbons produced from oxidation of MWNTs. AFM imaging was conducted on oxidized graphene nanoribbons that had been shortened by cutting through tip sonication (see below). The shortened, oxidized graphene nanoribbons were well dispersed as single- or few-layer structures. FIGS. 14A-14C show illustrative SEM images of oxidized graphene nanoribbons produced from oxidation of MWNTs. SEM imaging of the oxidized graphene nanoribbons on a silicon surface showed oxidized graphene nanoribbons of about 4 µm in length. FIG. 3 shows an SEM image of a MWNT in the process of being longitudinally opened. FIG. 15 shows an illustrative high-resolution TEM image of oxidized graphene nanoribbons produced from MWNTs in the absence of a protective agent. The high-resolution TEM indicates irregularity in the molecular structure of the oxidized graphene nanoribbons.

Shortened oxidized graphene nanoribbons can be obtained by harsher sonication of the oxidized graphene nanoribbons. For example, shortened, oxidized graphene nanoribbons were formed from an aqueous solution of oxidized graphene nanoribbons that were tip-sonicated at 30 W power (Misonix Sonicator 3000) for a total of 30 min (2 min on and 1 min off, 10 cycles).

Example 2A

Synthesis of Oxidized Graphene Nanoribbons from MWNTs in the Presence of a Protective Agent (Trifluoroacetic Acid)

150 mg of MWNTs were suspended in 36 ml $H_2SO_4$ by stirring 1 h. TFA (4 ml) was then added, and the reaction mixture was allowed to stir another 15 min before addition of $KMnO_4$ (750 mg). The reaction mixture stirred at room temperature for 1 h at room temperature and then for 2 h at 65° C. Once the contents had cooled, workup was conducted in the following manner.

The dispersion was poured on to 120 ml of ice containing $H_2O_2$ (30%, 5 ml), filtered through a PTFE membrane (5.0 µm pore size), and washed 3 times with 10 vol % HCl (40 ml each). The isolated solid was then dispersed in ethanol (100%, 30 ml) by stirring (30 min) and bath sonication (15 min). Ether (20 ml) was added to coagulate the product, which was again filtered over the same PTFE membrane. The remaining solid was washed 2 times with ether (50 ml each) and dried in vacuo to give 248 mg of oxidized graphene nanoribbons.

Example 2B

Synthesis of Oxidized Graphene Nanoribbons from MWNTs in the Presence of a Protective Agent (Phosphoric Acid)

The procedure of Example 2A was followed, except that 4 ml of 85% $H_3PO_4$ was substituted for trifluoroacetic acid. Once the reaction mixture had cooled, workup was conducted in the following manner.

The reaction mixture was poured on to 100 ml ice containing $H_2O_2$ (30%, 5 ml). The product was allowed to coagulate for 14 h before filtering over a 200 nm PTFE membrane. The brown filter cake was washed 2 times with 20% HCl (6 ml each), resuspended in $H_2O$ (60 ml) by stirring for 2 h and recoagulated with HCl (30%, 40 ml). The product was filtered on the same PTFE membrane and then dispersed in ethanol (100%, 40 ml) for 2 h with stirring. Ether (60 ml) was then added to the suspension, and the mixture was allowed to coagulate for 1 h before filtering through a 200 nm PTFE membrane. The remaining solid was washed 2 times with ether (10 ml each) and vacuum dried to yield 267 mg of oxidized graphene nanoribbons.

Figure 16A:
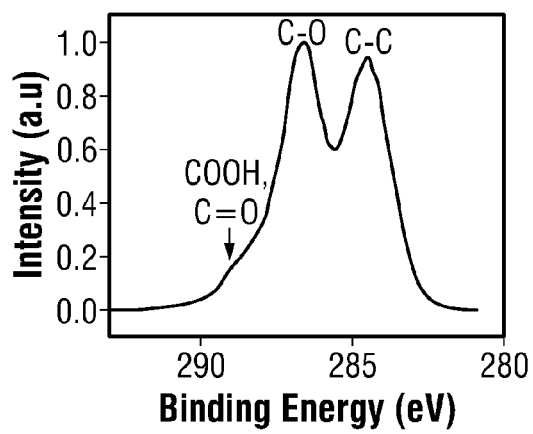
FIGS. 16A and 16B show illustrative C1s XPS spectra of oxidized graphene nanoribbons prepared in the presence of a protective agent.
Figure 16B:
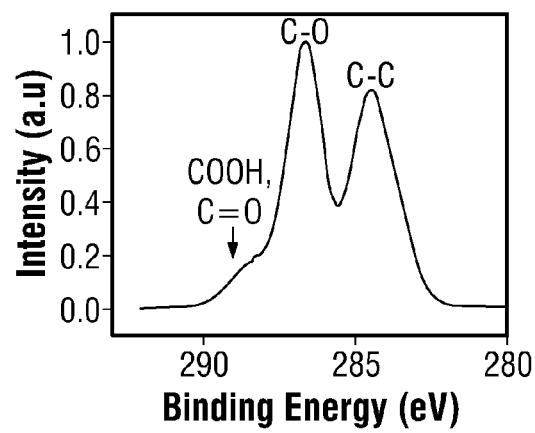
Figure 17:
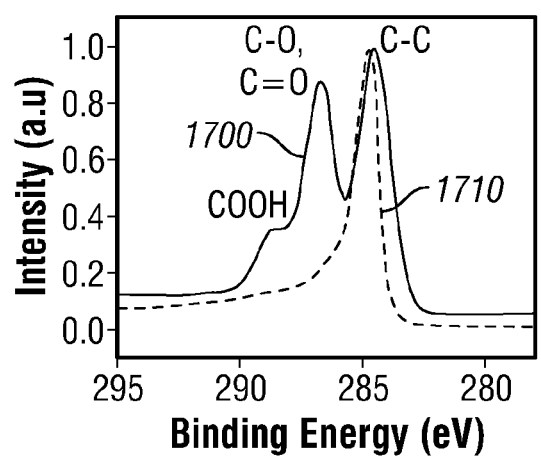
FIG. 17 shows illustrative comparative C1s XPS spectra of oxidized graphene nanoribbons prepared in the absence of a protective agent and reduced graphene nanoribbons prepared therefrom.

Characterization of Oxidized Graphene Nanoribbons Prepared in the Presence of a Protective Agent. In the presence of a protective agent (trifluoroacetic acid or phosphoric acid), oxidized graphene nanoribbons having a significantly larger portion of oxygen in the form of hydroxyl groups compared to oxidized graphene nanoribbons prepared in the absence of a protective agent can be obtained. For example, in the presence of a protective agent fewer C=O and carboxyl functionalities are produced in the oxidized graphene nanoribbons as shown in FIGS. 16A, 16B and 17. FIGS. 16A and 16B show illustrative C1s XPS spectra of oxidized graphene nanoribbons prepared in the presence of a protective agent. The oxidized graphene nanoribbons in FIG. 16A were prepared in the presence of trifluoroacetic acid, and those of FIG. 16B were prepared in the presence of phosphoric acid. FIGS. 16A and 16B are substantially similar to one another and show a relatively low proportion of carbonyl and carboxyl functionalities. However, the C1s XPS spectra of FIGS. 16A and 16B are significantly different from C1s XPS spectrum of oxidized graphene nanoribbons prepared in the absence of a protective agent. FIG. 17 shows illustrative comparative C1s XPS spectra of oxidized graphene nanoribbons (curve 1700) prepared in the absence of a protective agent and reduced graphene nanoribbons (curve 1710) prepared therefrom. The reduced graphene nanoribbons referenced in FIG. 17 are discussed in more detail hereinbelow. As shown in FIGS. 16A and 16B, the C—O peak at 286 eV is very pronounced, and the C=O/COOH shoulder peak at 289 eV is relatively small. In contrast, in FIG. 17 the C=O/COOH shoulder peak is rather distinct and indicates a higher relative percentage of C=O/COOH moieties. Hence, the presence of a protective agent in the oxidation process changes the properties of the oxidized graphene nanoribbons obtained.

Figure 18:
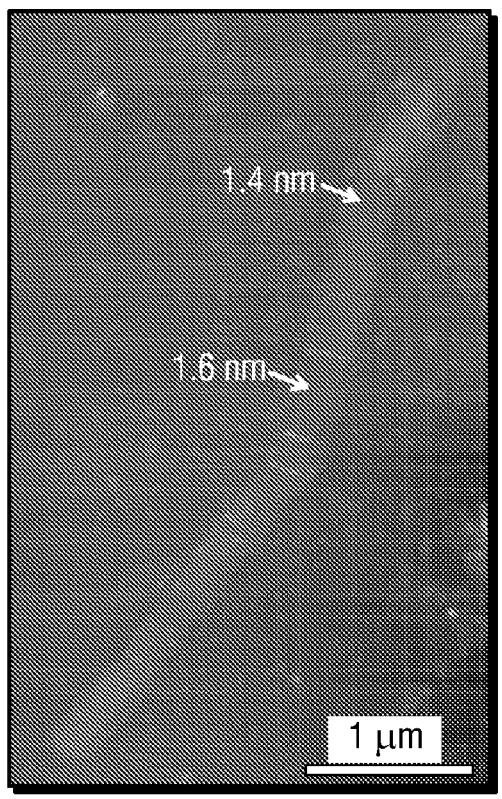
FIG. 18 shows an illustrative AFM image of a bilayer of oxidized graphene nanoribbons prepared in the presence of phosphoric acid protective agent.
Figure 19A:
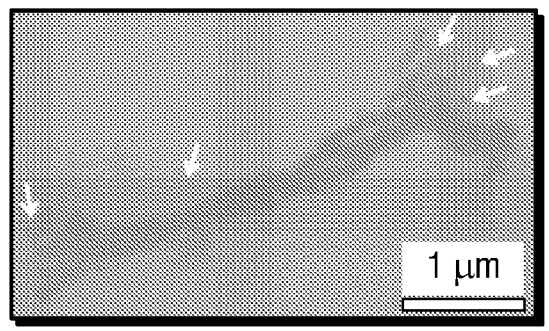
FIGS. 19A and 19B show illustrative SEM images of multi-layered (i.e., stacked) oxidized graphene nanoribbons (FIG. 19A) and single-layer oxidized graphene nanoribbons (FIG. 19B) prepared in the presence of a protective agent.
Figure 19B:
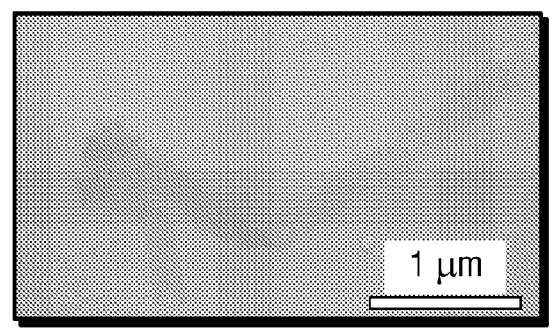

Analysis of oxidized graphene nanoribbons prepared in the presence of a protective agent was also conducted by SEM and AFM. These analyses indicated that the oxidized graphene nanoribbons synthesized in the presence of a protective agent were longer and had higher edge linearity than did oxidized graphene nanoribbons prepared in the absence of a protective agent. For example, FIG. 18 shows an illustrative AFM image of a bilayer of oxidized graphene nanoribbons prepared in the presence of phosphoric acid protective agent. In FIG. 18, the oxidized graphene nanoribbons have lengths >5 μm, widths ranging from 75-200 nm, and straight, even edges. The heights indicated in FIG. 18 are approximately double that of a single graphene layer and are indicative of a bilayer structure. FIGS. 19A and 19B show illustrative SEM images of multi-layered (i.e., stacked) oxidized graphene nanoribbons (FIG. 19A) and single-layer oxidized graphene nanoribbons (FIG. 19B) prepared in the presence of a protective agent. Arrows in FIG. 19A indicate the individual more narrow oxidized graphene nanoribbons in the multi-layer stack that arose from the opening of the inner, smaller-diameter nanotubes of the MWNTs. The edge linearity of the single-layer oxidized graphene nanoribbons in FIG. 19B is clearly discernible. Since there is imperfect overlap between layers, the edge linearity of the multi-layer oxidized graphene nanoribbons appears to be much more jagged. However, this apparent jaggedness is merely an artifact of the imperfect overlap between the oxidized graphene nanoribbon layers. As indicated by the scale bars in FIGS. 19A and 19B, the widths of the majority of the oxidized graphene nanoribbons prepared in the presence of a protective agent are indicated to be <100 nm.

Figure 20:
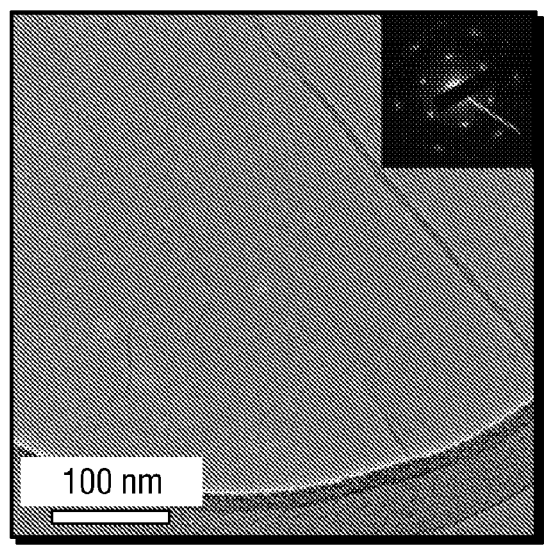
FIG. 20 shows an illustrative HR-TEM image of oxidized graphene nanoribbons prepared in the presence of phosphoric acid protective agent.
Figure 21A:
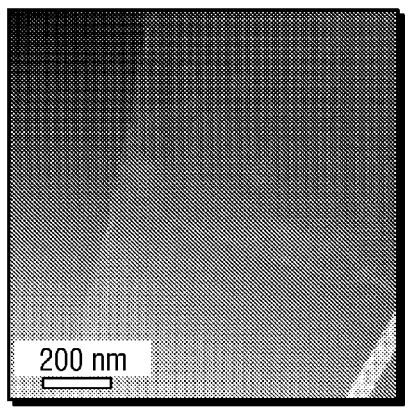
FIGS. 21A-21C show illustrative HAADF-TEM images at increasing magnification of oxidized graphene nanoribbons prepared in the presence of phosphoric acid protective agent.
Figure 21B:
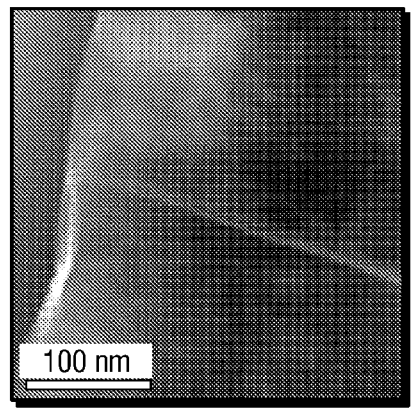
Figure 21C:
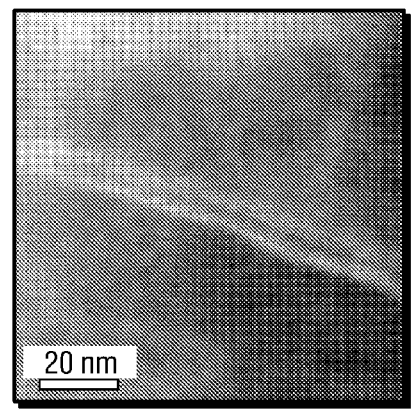

Quality and atomic scale integrity of the oxidized graphene nanoribbons produced both in the presence and absence of a protective agent were further analyzed by high resolution TEM (HR-TEM) and high angle annular dark-field TEM (HAADF-TEM) to probe the graphene basal plane for holes or other defects. HAADF-TEM images are very sensitive to changes in specimen composition, with the intensity varying monotonically with composition and specimen thickness. Thus, HAADF-TEM is very sensitive to variations in the atomic structure of the sample, regions of defects and interruptions in the graphene basal plane (i.e., holes). FIG. 20 shows an illustrative HR-TEM image of oxidized graphene nanoribbons prepared in the presence of phosphoric acid protective agent. FIGS. 21A-21C show illustrative HAADF-TEM images at increasing magnification of oxidized graphene nanoribbons prepared in the presence of phosphoric acid protective agent. The same region of the HR-TEM image in FIG. 20 is imaged at increasing magnification in FIGS. 21A-21C. As shown in FIGS. 20 and 21A-21C, the oxidized graphene nanoribbons prepared in the presence of a protective agent were uniform and substantially smooth over the entire image, and there was little disruption in contrast indicative of defects (i.e., holes).

To further illustrate that oxidized graphene nanoribbons produced in the presence of a protective agent have different properties from those produced in the absence of a protective agent, side-by-side comparison HR-TEM and HAADF-TEM images were obtained for these two oxidized graphene nanoribbons. FIGS. 22A-22F show illustrative side-by-side comparative HAADF-TEM and HR-TEM images of oxidized graphene nanoribbons prepared in the presence and in the absence of phosphoric acid protective agent. For example, FIGS. 22A and 22B show HAADF-TEM images that indicate that oxidized graphene nanoribbons synthesized in the presence of phosphoric acid were relatively free of defects as indicated by a relatively smooth image (FIG. 22B), whereas oxidized graphene nanoribbons synthesized without a protective agent produced a spotty image characteristic of non-uniformity (FIG. 22A). Likewise, HR-TEM images for oxidized graphene nanoribbons synthesized in the presence and absence of phosphoric acid (respectively, FIGS. 22D and 22C) demonstrated similar findings. FIGS. 22F and 22E present another set of comparative HR-TEM images for oxidized graphene nanoribbons synthesized in the presence and absence of phosphoric acid, respectively. Comparable findings are demonstrated in FIGS. 22F and 22E. As shown in FIGS. 22C and 22E, oxidized graphene nanoribbons synthesized in the absence of a protective agent show small holes and defects (white arrows) that make the surface appear roughened.

Example 3

Synthesis of Oxidized Graphene Nanoribbons from SWNTs in the Absence of a Protective Agent Longitudinal oxidation of SWNTs was conducted in a manner similar to that described for MWNTs as described in Example 1, with the exception that 25% fuming sulfuric acid was used to suspend the SWNTs. In addition, after the KMnO$_4$ (500 wt %) had stirred in the reaction mixture at room temperature for 1 h, the reaction was typically complete after heating at 55° C. for an additional 45 min. Compared to the starting SWNTs (1-2 nm heights as individuals and to 3-5 nm heights when bundled), the oxidized graphene nanoribbons were flatter, less bundled, and wider than the starting SWNTs.

Figure 23:
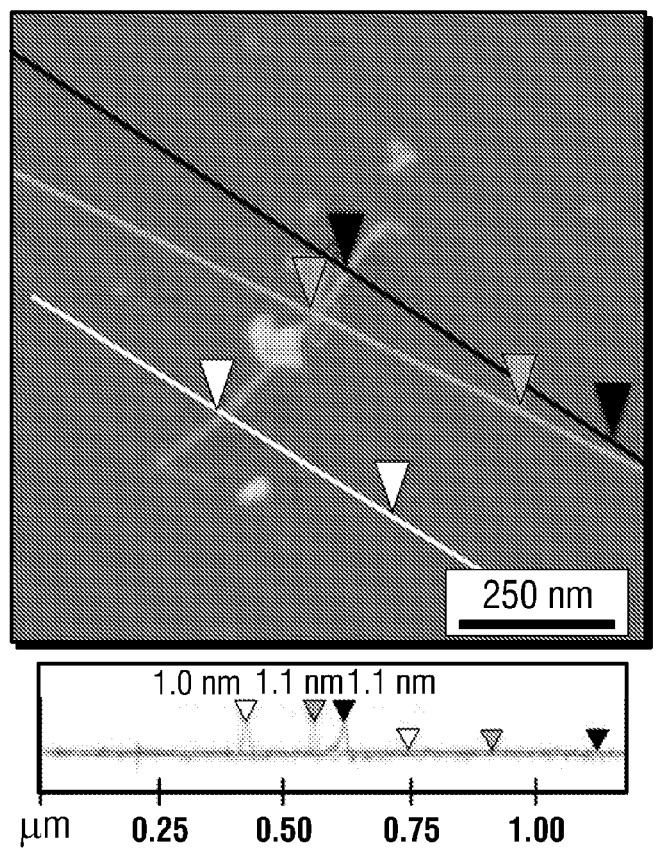
FIG. 23 shows an illustrative AFM image of oxidized graphene nanoribbons prepared from single-wall carbon nanotubes (SWNTs) in the absence of protective agent.
Figure 24:
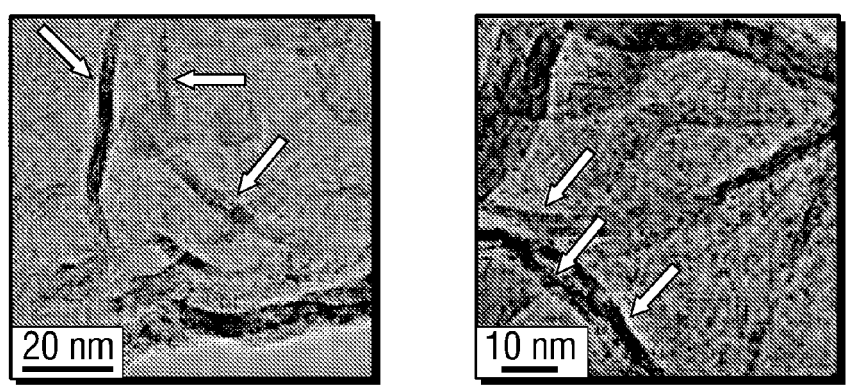
FIG. 24 shows illustrative TEM images of oxidized graphene nanoribbons prepared from SWNTs in the absence of a protective agent.
Figure 25A:
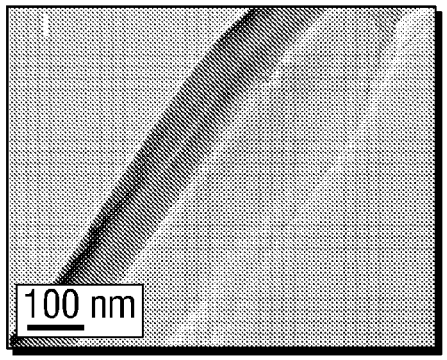
FIGS. 25A-25E show illustrative TEM images of oxidized graphene nanoribbons prepared by sequential oxidation.
Figure 25B:
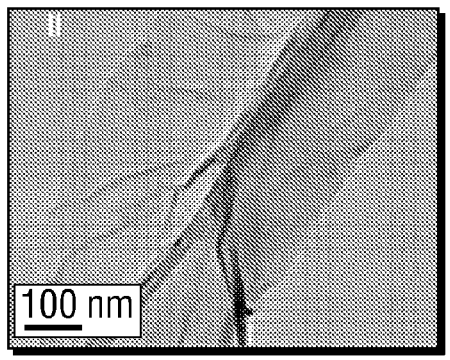
Figure 25C:
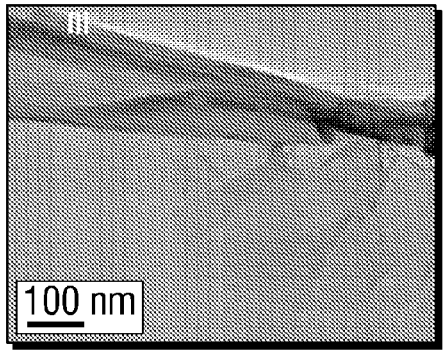
Figure 25D:
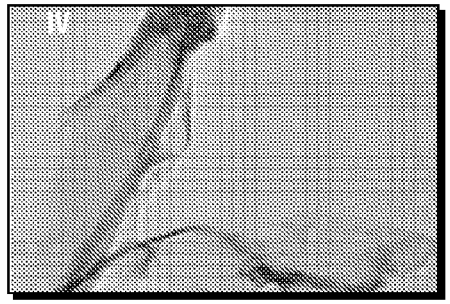
Figure 25E:
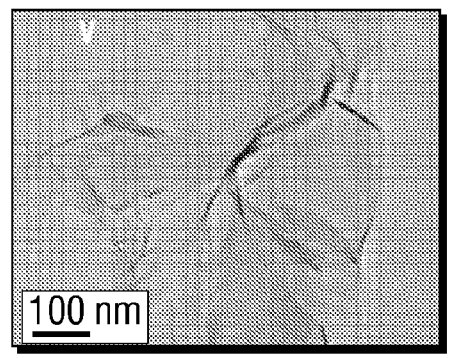

Characterization. FIG. 23 shows an illustrative AFM image of oxidized graphene nanoribbons produced from SWNTs in the absence of protective agent. The AFM image in FIG. 23 indicated an average height of about 1 nm for the oxidized graphene nanoribbons. FIG. 24 shows illustrative TEM images of oxidized graphene nanoribbons prepared from SWNTs in the absence of a protective agent. As demonstrated by the TEM images of FIG. 24, most of the oxidized graphene nanoribbons remained closely associated to one another, intertwined and stacked. For those oxidized graphene nanoribbons that were unstacked, graphene nanoribbon widths of about 3-5 nm (noted by white arrows) were identified.

Example 4

Synthesis of Oxidized Graphene Nanoribbons via Sequential Oxidation of MWNTs in the Absence of a Protective Agent In the Example that follows, sequential oxidation refers to stepwise or portionwise addition of the oxidant. Stepwise oxidation was performed following the reaction conditions outlined above, except the KMnO$_4$ was added in batches. The reaction was first run with a 1:1 mass ratio of KMnO$_4$:MWNT (denoted sample I, least oxidized). After 1 h at 55° C., approximately one-fifth of the volume of the reaction mixture was extracted and worked up as outlined above. The remaining portion was then treated with another 100 wt % KMnO$_4$ (relative to the portion of MWNTs remaining) and allowed to react for another 1 h at 55° C. After extracting and working up one-quarter of the volume of the remaining reaction mixture, the remaining reaction mixture was treated again with 100 wt % fresh KMnO$_4$. The iterative process was repeated until the final batch of graphene nanoribbons had been exposed to a total of 500 wt % KMnO$_4$ (denoted sample V, most oxidized).

Figure 26:
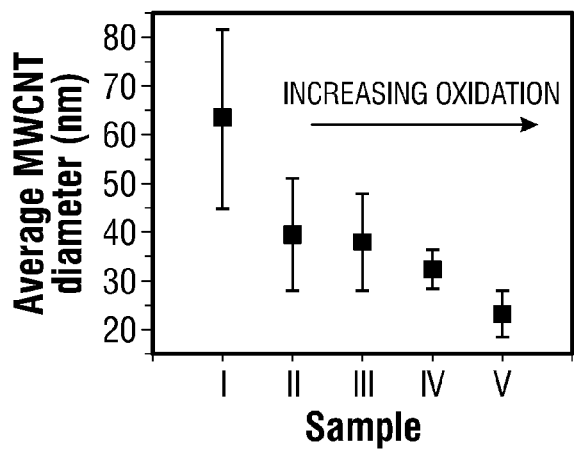
FIG. 26 shows an illustrative statistical plot of MWNT diameter observed during successive longitudinal opening of MWNTs.

MWNTs can be opened by sequential stepwise addition of KMnO$_4$ following, for example, the procedure outlined above. The sequential addition of KMnO$_4$ resulted in successive longitudinal opening of the MWNT layers. FIGS. 25A-25E show illustrative TEM images of oxidized graphene nanoribbons produced by stepwise oxidation. The TEM images show that the MWNTs opened to a higher degree as the amount of oxidant was increased, and fewer MWNTs remained as more oxidant was added. FIG. 26 shows an illustrative statistical plot of MWNT diameter observed during successive longitudinal opening of MWNTs. The statistical plot shows that the average MWNT diameter decreased from about 65 nm after the first iteration to about 20 nm after the fifth iteration. The smaller diameter carbon nanotubes that remained after treatment with 500 wt % KMnO$_4$ were exposed to the reaction conditions for less time than the larger-diameter tubes and therefore may not have had a chance to fully react. The behavior contained in the statistical plot of FIG. 26 is consistent with successive longitudinal opening of the outer nanotubes of the MWNTs by the oxidant.

Figure 27:
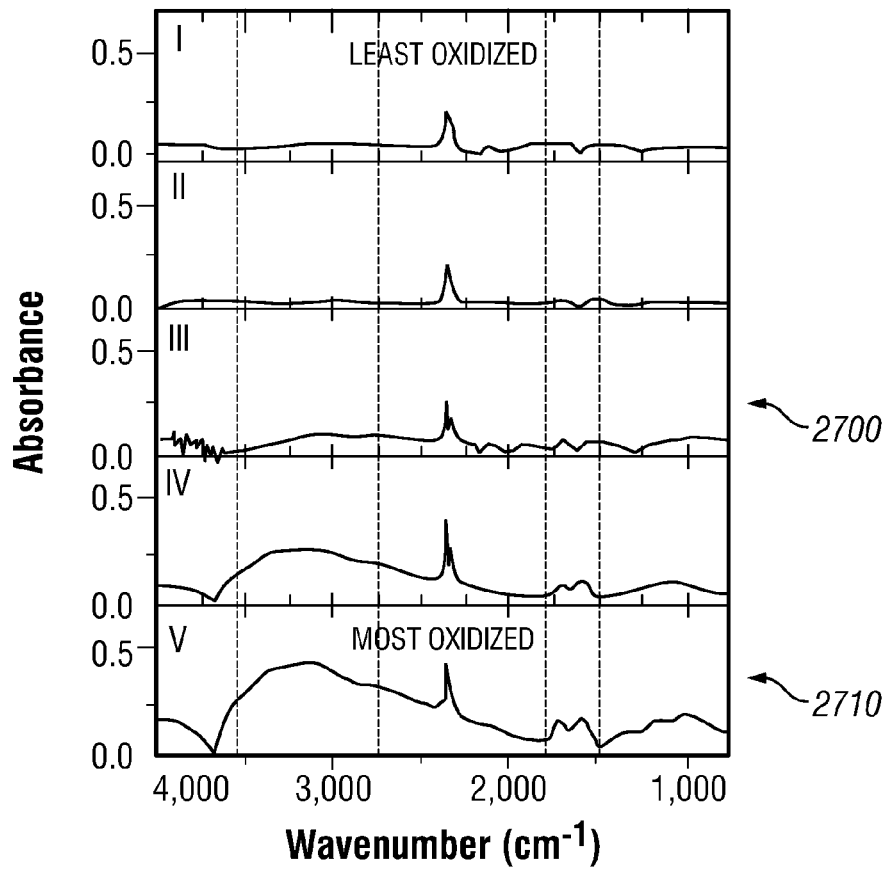
FIG. 27 shows illustrative ATR-IR spectra of oxidized graphene nanoribbons prepared by sequential oxidation.
Figure 28:
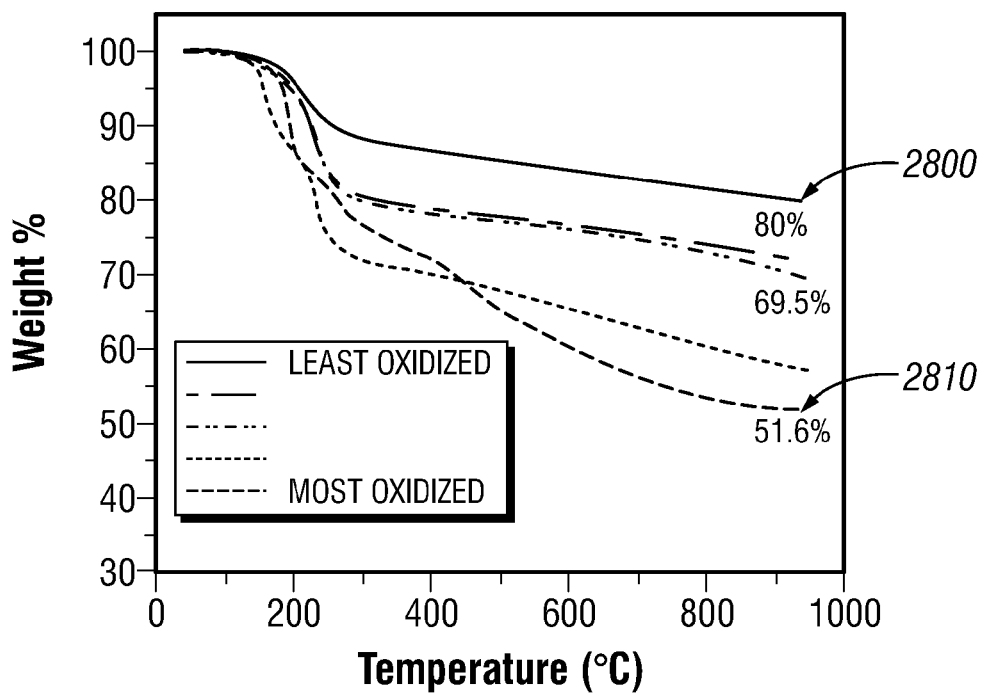
FIG. 28 shows illustrative TGA analyses for oxidized graphene nanoribbons prepared by sequential oxidation.
Figure 29:
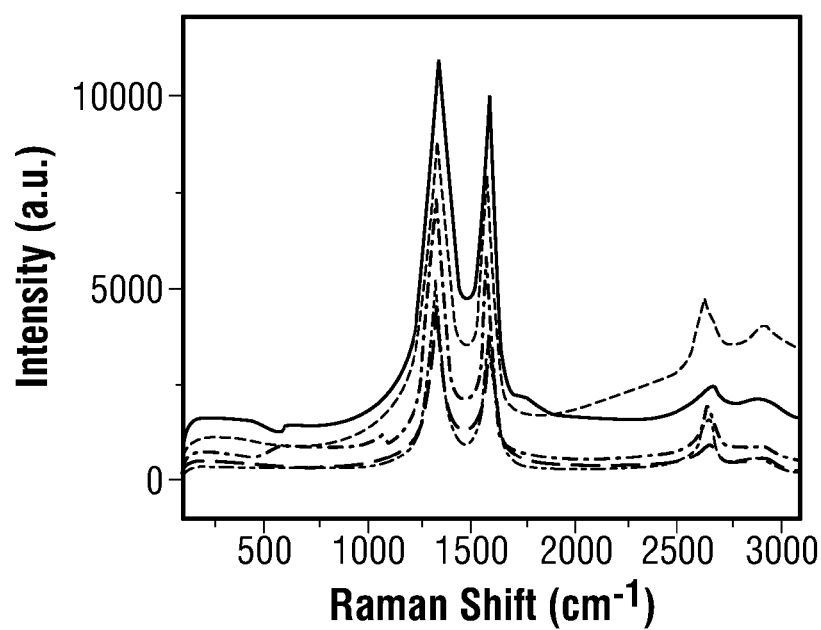
FIG. 29 shows illustrative Raman spectra for oxidized graphene nanoribbons prepared by sequential oxidation.

Characterization of Oxidized Graphene Nanoribbons Produced Via Successive Oxidation. The degree of oxidation of the sequentially oxidized graphene nanoribbons was characterized by using attenuated-total reflection infrared (ATR-IR) spectroscopy and thermogravimetric analysis (TGA). FIG. 27 presents illustrative ATR-IR spectra of oxidized graphene nanoribbons produced by sequential oxidation. The ATR-IR spectra shown in FIG. 27 revealed a C=O stretch that appeared at ~1,690 cm$^{-1}$ in sample III (spectrum 2700; 3 wt. equivalents KMnO$_4$) and at ~1,710 cm$^{-1}$ in sample V (spectrum 2710; 5 wt. equivalents KMnO$_4$). Shift of the C=O stretch in the oxidized graphene nanoribbons is consistent with decreasing conjugation as a result of oxidation. The COO—H/O—H stretch (~3,600-2,800 cm$^{-1}$) first appeared in sample III (spectrum 2700) and continued to increase in intensity as the amount of added KMnO$_4$ oxidant was increased. The increased intensity of this peak is consistent with an increased number of carboxyl and hydroxyl functionalities, as well as the possible presence of trapped water. FIG. 28 shows illustrative TGA analyses for oxidized graphene nanoribbons produced by sequential oxidation. As shown in FIG. 28, total weight loss increased as the amount of KMnO$_4$ was increased [20% and 49% in samples I (curve 2800) and V (curve 2810), respectively]. The behavior shown in FIG. 28 is again consistent with an increased number of volatile oxygen-containing functionalities, which is further indicative of a higher degree of oxidation as the amount of oxidant is increased. FIG. 29 shows illustrative Raman spectra for oxidized graphene nanoribbons prepared by sequential oxidation, which demonstrate an increasing level of disorder (appearance of a D band at ~1,321-1,328 cm$^{-1}$) with increasing oxidation.

Figure 30:
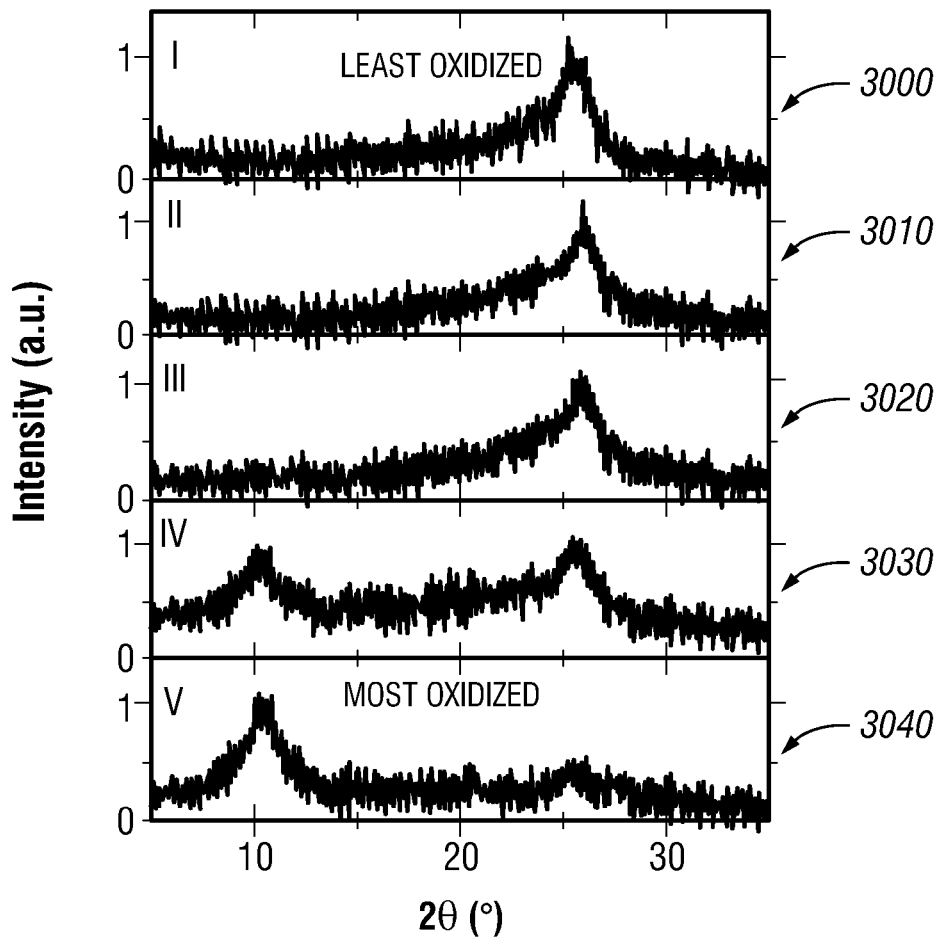
FIG. 30 shows illustrative X-ray diffraction analyses for oxidized graphene nanoribbons prepared by sequential oxidation.

FIG. 30 shows illustrative X-ray diffraction analyses for oxidized graphene nanoribbons produced by sequential oxidation. As shown in FIG. 30, the graphite (002) spacing increased with the level of oxidation. For example, samples I-III (diffraction patterns 3000, 3010, and 3020, respectively) all had 2θ values of about 25.8°, corresponding to a d spacing of about 3.4 Å. Sample IV (diffraction pattern 3030) showed two peaks, one at about 10.8° and one at about 25.4°, with d spacings of about 8.2 Å and about 3.5 Å, respectively. Sample V (diffraction pattern 3040) showed a predominant peak at about 10.6°, corresponding to a d spacing of about 8.3 Å. In Sample V (diffraction pattern 3040), there was minimal signal contribution from MWNTs (2θ=25.8°).

Example 5

Optimization Study for the Preparation of Oxidized Graphene Nanoribbons

Table 1 summarizes the physical properties of oxidized graphene nanoribbons produced both in the presence and absence of a protective agent, as synthesized under various reaction conditions. Listed in Table 1 are the yield of the isolated product (wt %, relative to the weight of the starting MWNTs), C:O atomic concentration ratio as determined by XPS, TGA wt % remaining at 250° C. and 950° C. under inert gas, $\lambda_{max}$ as determined by UV of a dilute aqueous solution, and general conclusions. General conclusions were further supported by inspection of representative SEM and TEM images (not shown). All reactions used KMnO$_4$ as the oxidizing agent.

TABLE 1

Optimization of Reaction Conditions for Preparing Oxidized Graphene Nanoribbons

| Entry | Conditions | Wt % | C:O Ratio (XPS) | TGA Wt % @ 250° C. | TGA Wt % @ 950° C. | UV $\lambda_{max}$ (nm) | Conclusions |
|---|---|---|---|---|---|---|---|
| A (Ex. 1) | 5X KMnO$_4$ in H$_2$SO$_4$ 22° C. → 70° C. 2 h | 240 | 1.5:1 | 84 | 52 | 234 | Exfoliated Nanoribbons Fully opened, high oxidation |
| B | 5X KMnO$_4$ in H$_2$SO$_4$ 22° C., 2 h | 126 | 2.6:1 | 66 | 44 | 262 | Stacked Nanoibbons Partially opened, light oxidation |
| C | 5X KMnO$_4$ in H$_2$SO$_4$ 60° C., 2 h | 205 | 1.4:1 | 67 | 40 | 237 | Exfoliated Nanoribbons Fully opened, high oxidation |

TABLE 1-continued

Optimization of Reaction Conditions for Preparing Oxidized Graphene Nanoribbons

| Entry | Conditions | Wt % | C:O Ratio (XPS) | TGA Wt % @ 250° C. | TGA Wt % @ 950° C. | UV $\lambda_{max}$ (nm) | Conclusions |
|---|---|---|---|---|---|---|---|
| D | 5X KMnO$_4$ in H$_2$SO$_4$ 85° C., 2 h | 195 | 1.5:1 | 63 | 31 | 233 | Exfoliated Nanoribbons Fully opened, high oxidation |
| E | 5X KMnO$_4$ in H$_2$SO$_4$ 100° C., 2 h | 136 | 1.7:1 | 72 | 42 | 235 | Exfoliated Nanoribbons Fully opened, high oxidation |
| F | 5X KMnO$_4$ in TFA/TFAA 22° C., 24 h | 100 | 7.6:1 | 100 | 94 | 270 | Stacked Nanoribbons & Nanotubes Minor opening, low oxidation |
| G | 5X KMnO$_4$ in 1:1 H$_2$SO$_4$:TFA 22° C., 24 h | 134 | 4.0:1 | 89 | 74 | 265 | Stacked Nanoribbons & Nanotubes Partial opening, low oxidation |
| H | 5X KMnO$_4$ in 9:1 H$_2$SO$_4$:TFA 22° C., 24 h | 160 | 1.5:1 | 71 | 49 | 236 | Stacked Nanoribbons Opened, high oxidation, not exfoliated |
| I | 5X KMnO$_4$ in 9:1 H$_2$SO$_4$:TFA 65° C., 2 h | 165 | 1.8:1 | 66 | 43 | 245 | Exfoliated Nanoribbons Fully opened, high oxidation with low defects |
| J | 5X KMnO$_4$ in 9:1 H$_2$SO$_4$:H$_3$PO$_4$ 65° C., 2 h | 178 | 1.6:1 | 63 | 42 | 235 | Exfoliated Nanoribbons Fully opened, high oxidation with low defects |
| K | 8X KMnO$_4$ in 9:1 H$_2$SO$_4$:H$_3$PO$_4$ 65° C., 2 h | 143 | 1.4:1 | 55 | 18 | 227 | Exfoliated Nanoribbons & Sheets Fully opened, high oxidation |

The weight gain of the product, C:O XPS ratio, and TGA wt % together give an indication of the degree of oxidation. For example, a highly oxidized sample has an increase in weight of 50-140%, a low C:O ratio, and less weight remaining upon heating in the TGA, all due to the presence of oxygen-containing functional groups on the edges and basal plane of the oxidized graphene nanoribbons. In Table 1, a Wt. % of 100 indicates that essentially no oxidation occurred (i.e., all the MWNTs were recovered). The UV $\lambda_{max}$ indicates the level of π-conjugation remaining in the system, and hence relative degree of oxidation. For example, highly conjugated oxidized graphene nanoribbons (i.e., more like an idealized graphene structure) have a higher $\lambda_{max}$ (~275 nm), indicating less oxidation. In contrast, oxidized graphene nanoribbons that are more highly oxidized have a disrupted π-network with a greater number of sp$^3$ carbons and will be blue-shifted $\lambda_{max}$ (~235 nm).

In summary, the results of Table 1 indicate that oxidized graphene nanoribbons were produced at elevated temperatures when oxidized with potassium permanganate in the presence or absence of a protective agent. The reaction was slow and incomplete at room temperature or lower, although a minor amount of longitudinal opening did occur. The reactivity was similar both in the presence and absence of a protective agent. Trifluoroacetic acid and phosphoric acids produced comparable results as protective agents. When the concentration of sulfuric acid was above about 90%, exfoliated oxidized graphene nanoribbons were produced.

Entry K deserves particular mention, since the oxidized graphene nanoribbons were of a different appearance than those produced under the other experimental conditions. In particular, oxidized graphene nanoribbons prepared using 5× of potassium permanganate were typically brown-black in color, whereas the oxidized graphene nanoribbons of entry K were a significantly lighter brown (similar to that of peanut butter). This result further indicates that the degree of oxidation of the oxidized graphene nanoribbons can be controlled by changing the amount of oxidizing agent used.

Example 6

Synthesis of Reduced Graphene Nanoribbons from Oxidized Graphene Nanoribbons by Hydrazine Reduction Reduction of oxidized graphene nanoribbons was conducted in aqueous N$_2$H$_4$, either with or without SDS surfactant. To introduce the SDS surfactant, 50 mg of the oxidized graphene nanoribbons were homogenized (IKA T-25 digital ULTRA-TURRAX disperser with 18 G dispersing element, 7,000 r.p.m.) in 1% aqueous SDS solution (250 ml) for 1 h. The suspension was then cup-sonicated (Cole Parmer ultrasonic processer, 75% power) for 10 min and filtered through a 5 cm plug of glass wool. In embodiments where SDS was not used, 50 mg of as-prepared oxidized graphene nanoribbons were dissolved in nanopure water (250 ml). In both cases, 150 ml of the oxidized graphene nanoribbon solution was covered by a 5 mm layer of silicon oil in an Erlenmeyer flask to eliminate an air-water interface. The presence of an air-water interface tended to cause agglomeration of the reduced graphene nanoribbons as the water evaporated.

To the oxidized graphene nanoribbon solution was added 150 ml of concentrated NH$_4$OH (2.22 mmol), followed by 150 ml of N$_2$H$_4$—H$_2$O (98%, 3.03 mmol). The reaction mixture was heated at 95° C. for 1 h in a gently boiling water bath (no stirring). Excess N$_2$H$_4$ was removed by dialysis (CelluSep H1 regenerated cellulose tubular membrane; nominal molecular weight, 5,000 (relative molecular mass); 400-mm width) for 24 h in 1% NH$_4$OH. Filtering and drying the product in vacuo afforded 23.2 mg of reduced graphene nanoribbons. The overall weight conversion efficiencies from MWNTs in the first step to reduced graphene nanoribbons in the second step were 215% and 46% for the two steps, respectively, yielding 99% for the two steps collectively. Oxidized graphene nanoribbons prepared either in the presence or absence of a protective agent could be equivalently utilized in the reduction process.

Characterization of Reduced Graphene Nanoribbons. In the characterizations that follow, the reduced graphene nanoribbons were prepared from oxidized graphene nanoribbons that were prepared in the absence of a protective agent. However, like characterizations can be conducted on reduced graphene nanoribbons prepared from oxidized graphene nanoribbons that were prepared in the presence of a protective agent. As established elsewhere in the present disclosure, reduced graphene nanoribbons may have different properties both depending on how the reduction was performed and the source of the oxidized graphene nanoribbons from which the reduced graphene nanoribbons are derived.

Figure 31:
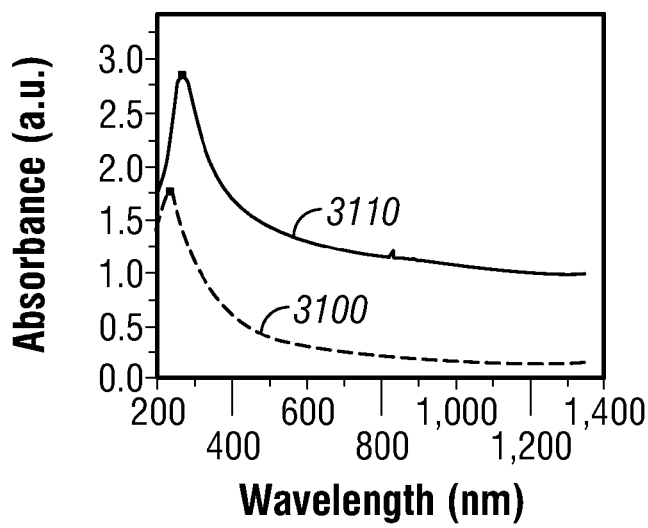
FIG. 31 shows illustrative UV-VIS absorption spectra for oxidized graphene nanoribbons and reduced graphene nanoribbons.
Figure 32:
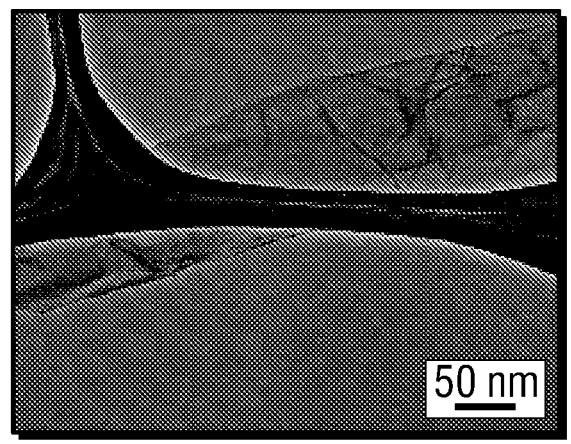
FIG. 32 shows an illustrative TEM image of reduced graphene nanoribbons.

FIG. 31 shows illustrative UV-VIS absorption spectra for oxidized graphene nanoribbons (spectrum 3100) and reduced graphene nanoribbons (spectrum 3110). Progress of the reduction reaction was monitored by UV-VIS spectroscopy. The UV-VIS absorption spectra of FIG. 31 showed a shift in $\lambda_{max}$ from 234 nm in the oxidized graphene nanoribbons (spectrum 3100) to 267 nm in the reduced graphene nanoribbons (spectrum 3110). The bathchromic shift of $\lambda_{max}$ and the hyperchromicity over the entire wavelength range is indicative of restoration of electronic conjugation in the reduced graphene nanoribbons. FIG. 32 shows an illustrative TEM image of reduced graphene nanoribbons, which demonstrates that reduced graphene nanoribbons retain their straight edge structure.

Figure 33:
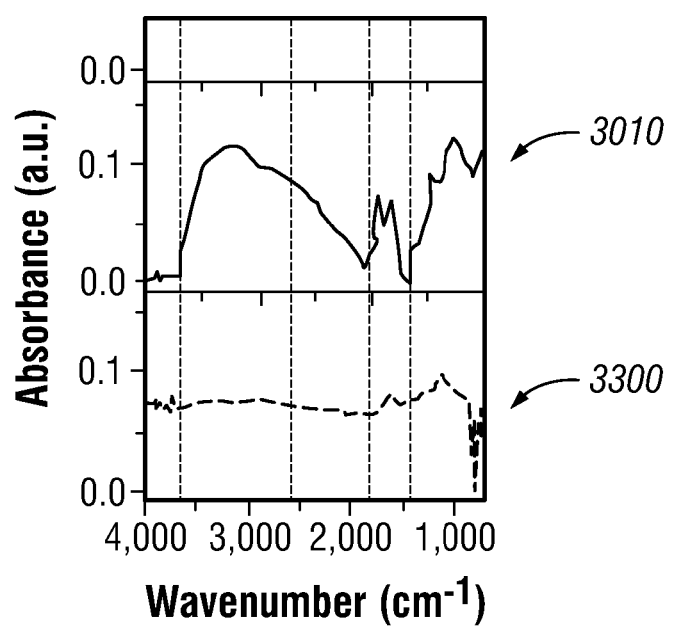
FIG. 33 shows illustrative ATR-IR spectra of reduced graphene nanoribbons compared to oxidized graphene nanoribbons.

To provide further evidence that the reduction procedure decreased the number of oxygen-containing functionalities in the reduced graphene nanoribbons, ATR-IR, XPS and TGA analyses were performed. FIG. 33 shows illustrative ATR-IR spectra of reduced graphene nanoribbons (spectrum 3300) compared to oxidized graphene nanoribbons (spectrum 3310). As shown in FIG. 33, reduced graphene nanoribbons (spectrum 3300) showed almost complete elimination of the COO—H/O—H stretching region (~3,600-2,800 cm$^{-1}$) and a significant decrease in the C=O stretching region (~1,710 cm$^{-1}$) in comparison to the intense COO—H/O—H and C=O stretches observed for the oxidized graphene nanoribbons (spectrum 3310). Remaining edge carboxylic acids account for the small residual spectral intensity for reduced graphene nanoribbons (spectrum 3300).

Referring again to FIG. 17, comparative XPS C1s spectra of oxidized graphene nanoribbons (curve 1700) and reduced graphene nanoribbons (curve 1710) are shown. The XPS C1s spectra of oxidized graphene nanoribbons (curve 1700) showed signals at 286 eV and 287 eV, corresponding to C—O and C=O, respectively. The shoulder at 289 eV was assigned to carboxyl groups. Upon reduction to reduced graphene nanoribbons, the 286 eV and 287 eV peaks diminished to a shoulder of the C—C peak (284.4 eV). This behavior indicates significant deoxygenation of the oxidized graphene nanoribbons by N$_2$H$_4$ in forming reduced graphene nanoribbons. The most dominant peak after hydrazine reduction was the C—C peak at 284.8 eV. In addition, the XPS-determined atomic concentration of oxygen decreased from 42% to 16% upon reduction. The residual oxygen content is largely attributed to edge carboxylic acid moieties, which are not removed by hydrazine reduction.

Figure 34:
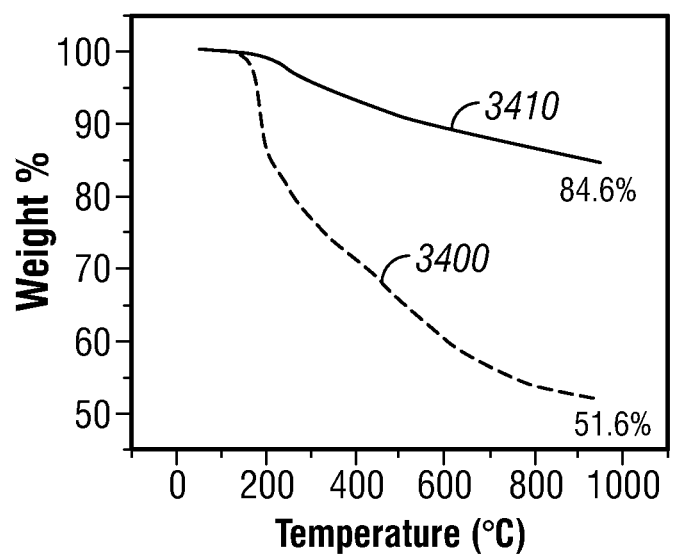
FIG. 34 shows illustrative TGA weight loss curves for oxidized graphene nanoribbons and reduced graphene nanoribbons.

FIG. 34 shows illustrative TGA weight loss curves for oxidized graphene nanoribbons (curve 3400) and reduced graphene nanoribbons (curve 3410). The TGA weight loss of the reduced nanoribbons (curve 3410) was about 33% less than that of the oxidized graphene nanoribbon starting material (curve 3400). The lower TGA weight loss of the reduced graphene nanoribbons (curve 3410) indicates that fewer oxygen-containing functionalities were present on the reduced graphene nanoribbon surface.

Nitrogen adsorption measurements of the oxidized graphene nanoribbons and reduced graphene nanoribbons gave calculated surface areas, determined using Brunauer-Emmett-Teller theory, of 445 and 436 m$^2$/g, respectively, after pre-outgassing at 400° C. for 12 h. The density of the oxidized graphene nanoribbons was found to be 2.0 g/cm$^{-3}$ using solution density matching (bromotrichloromethane).

Example 7

Functionalization of Reduced Graphene Nanoribbons with a Diazonium Species

Route I: Oxidized graphene nanoribbons were wrapped in SDS surfactant by gently stirring 30 mg of the oxidized graphene nanoribbons in 30-mL 1 wt % aqueous sodium dodecylsulfate (SDS) for 1 h, followed by bath sonication of the solution for 10 min (Cole Parmer ultrasonic cleaner, Model 08849-00). The suspension was then filtered through a 5-cm plug of glass wool and transferred to an Erylenmeyer flask. Chemical reduction was carried out by adding 30 µL of concentrated NH$_4$OH (0.444 mmol) followed by 30 µL of N$_2$H$_4$.H$_2$O (98%, 0.606 mmol). The reaction mixture was heated at 95° C. for 1 h (no stirring). The heating bath was then removed, and the reaction mixture was allowed to cool to room temperature. Functionalization was carried out by pre-dissolving the solid diazonium salt (10 mmol, 4 equivalent per nanoribbon carbon) in a minimum amount of water. The diazonium salt solution was then added dropwise with stirring to the reduced graphene nanoribbon solution. The reaction contents were allowed to stir for 1 h at room temperature. The mixture was then poured into 100 ml acetone to coagulate the functionalized graphene nanoribbons. This mixture was then filtered through a 0.45 µm PTFE membrane, followed by washing with water and acetone (3×). The resulting solid was resuspended in DMF to remove SDS and excess diazonium salt. The suspension was then filtered (0.45 µm PTFE), and the solid was copiously washed with acetone. The resulting solid was dried at 70° C. in a vacuum oven overnight, typically yielding 36-38 mg of functionalized graphene nanoribbons. Scheme 1 illustrates an illustrative synthesis of functionalized graphene nanoribbons prepared via Route I. Oxygen-containing functionalities are not shown in the oxidized graphene nanoribbons for purposes of clarity.

Scheme 1

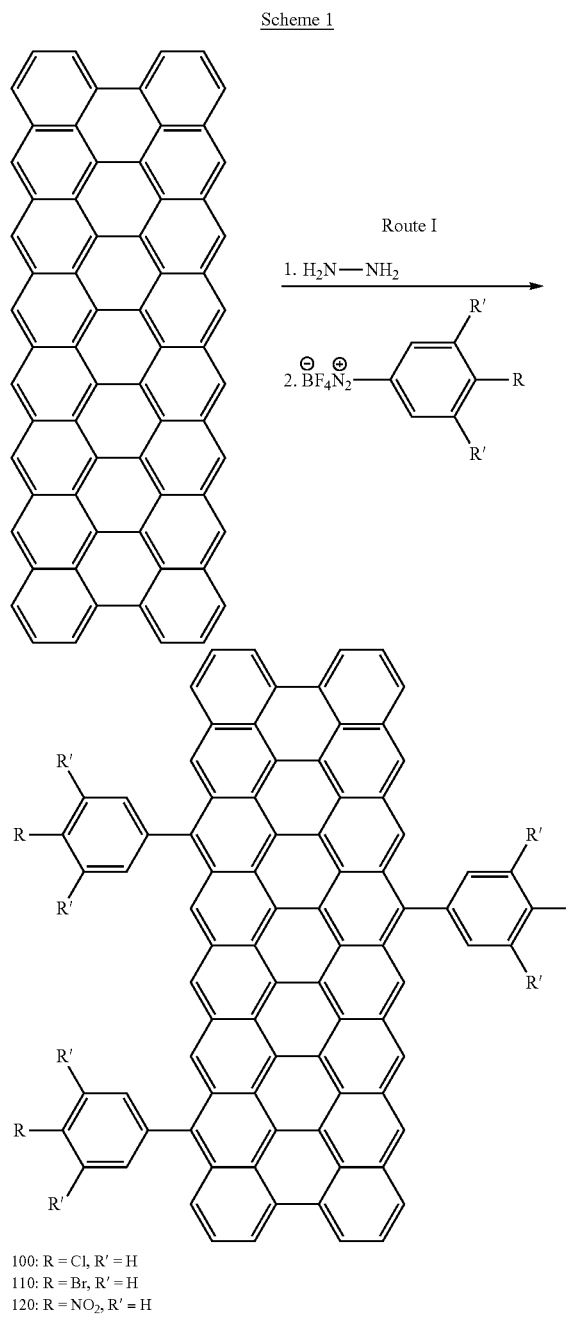

100: R = Cl, R' = H
110: R = Br, R' = H
120: R = NO$_2$, R' = H
130: R = H, R' = OMe

Route II: The surfactant wrapping and hydrazine reduction steps (starting from 30 mg of oxidized graphene nanoribbons) were performed as described above for Route I. Functionalization was carried out in a 250 mL three-neck flask, to which the aniline (10 mmol, 4 equivalent per nanoribbon carbon, predissolved in 30 mL acetonitrile) and 30-mL of the reduced graphene nanoribbon solution (1 mg/mL) were added. To this mixture, isoamyl nitrite (10 mmol) was slowly added dropwise under nitrogen atmosphere. The reaction mixture was heated with stirring to 70° C. for 12 h. The reaction was then cooled, and the suspension was filtered through a 5-cm plug of glass wool. The filtrate was then filtered through a 0.45 µm PTFE membrane. The filter cake was washed with acetone and re-suspended in DMF. The resulting suspension was filtered again, and the filter cake was washed with copious amounts of DMF, deionized water and acetone. Though soluble in DMF, the functionalized graphene nanoribbons did not penetrate the filter membrane. The product was collected and dried in vacuo at 70° C. for 24 h before being characterized. Typical yields were 25-35 mg of functionalized graphene nanoribbons. Scheme 2 illustrates an illustrative synthesis of functionalized, reduced graphene nanoribbons prepared via Route II. Oxygen-containing functionalities are not shown in the oxidized graphene nanoribbons for purposes of clarity.

Scheme 2

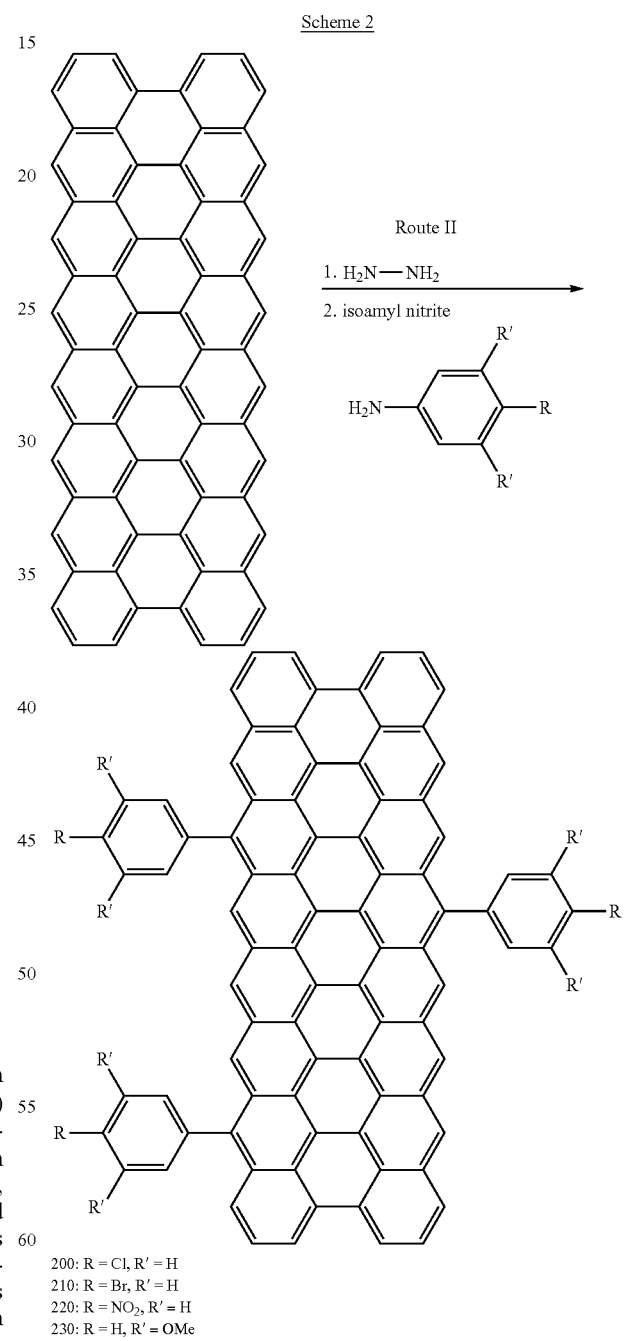

200: R = Cl, R' = H
210: R = Br, R' = H
220: R = NO$_2$, R' = H
230: R = H, R' = OMe

Figure 35:
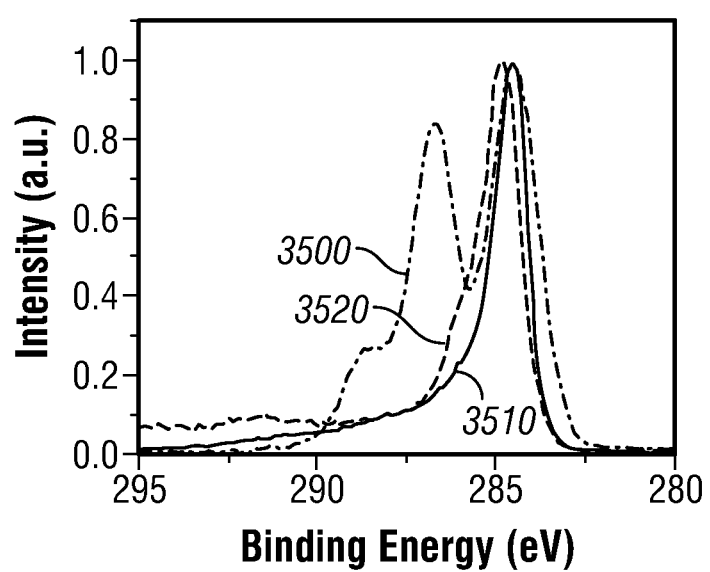
FIG. 35 shows illustrative C1s XPS spectra of oxidized graphene nanoribbons, reduced graphene nanoribbons and functionalized graphene nanoribbons (graphene nanoribbon 110)
Figure 36A:
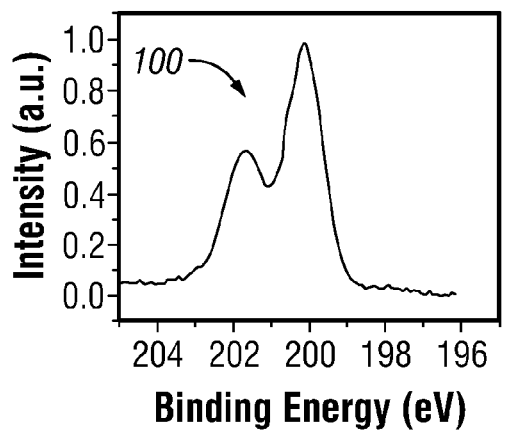
FIGS. 36A-36D show illustrative Cl2p and Br3d XPS spectra of functionalized graphene nanoribbons [graphene nanoribbons 100 (FIG. 36A), 110 (FIG. 36B), 200 (FIG. 36C) and 210 (FIG. 36D)]
Figure 36C:
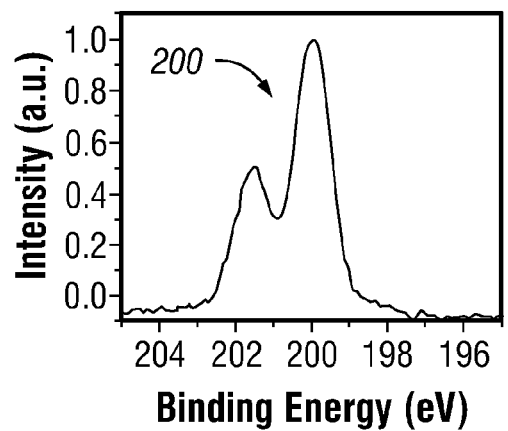
Figure 36B:
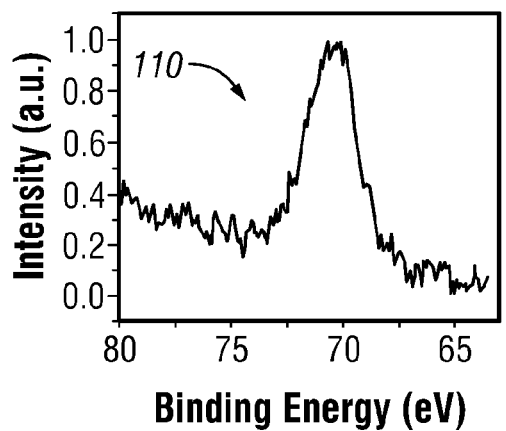
Figure 36D:
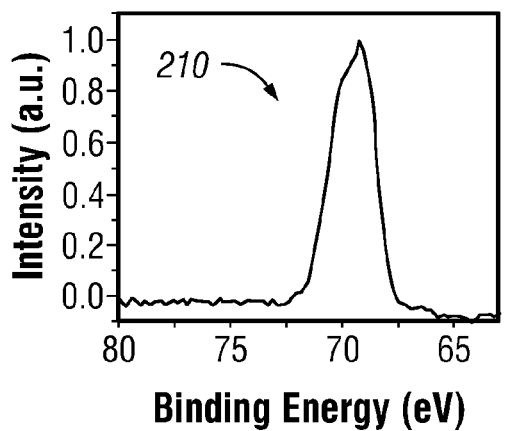

Characterization of Functionalized Graphene Nanoribbons. XPS spectroscopy was used to confirm that the graphene nanoribbons had indeed been functionalized to form functionalized graphene nanoribbons. FIG. 35 shows illustrative C1s XPS spectra of oxidized graphene nanoribbons (curve 3500), reduced graphene nanoribbons (curve 3510) and functionalized graphene nanoribbons (curve 3520—graphene nanoribbon 110). As shown in FIG. 35, the functionalized graphene nanoribbons showed a significant decrease of signals at 286-288 eV, indicating the loss of C—O and C=O functionalities, much like that of the reduced graphene nanoribbons from which they are derived. Depending on the functional groups added to the functionalized graphene nanoribbons, the surface oxygen ranged from 11% to 32% (see Table 2). A small nitrogen content was detected in all of the functionalized graphene nanoribbons, which can be attributed to hydrazone formation (except the N1s XPS spectra of graphene nanoribbons 120 and 220, which demonstrated a significant contribution from the nitro group as well). Graphene nanoribbons 100, 110, 200 and 210 showed a significant percentage of halogen markers (Cl or Br) and very little accompanying nitrogen, implying that the surface was successfully functionalized. FIGS. 36A-36D show illustrative Cl2p and Br3d XPS spectra of functionalized graphene nanoribbons 100 (FIG. 36A), 110 (FIG. 36B) 200 (FIG. 36C) and 210 (FIG. 36D) which are again indicative that functionalization occurred.

TABLE 2

Summarized XPS Data for Functionalized Graphene Nanoribbons

| Sample | Atomic concentration (%) | | | | |
|---|---|---|---|---|---|
| | C | N | O | Cl | Br |
| 100 | 80.2 | 2.8 | 10.9 | 5.0 | — |
| 110 | 77.5 | 5.5 | 11.4 | — | 5.6 |
| 120 | 70.8 | 9.5 | 19.5 | — | — |
| 130 | 73.6 | 3.9 | 22.5 | — | — |
| 200 | 74.1 | 3.1 | 16.4 | 6.4 | — |
| 210 | 79.6 | 3.5 | 14.3 | — | 2.6 |
| 220 | 66.9 | 5.6 | 27.5 | — | — |
| 230 | 65.4 | 3.0 | 31.6 | — | — |
| oxidized NRs | 52.0 | 1.3 | 35.8 | — | — |
| reduced NRs | 79.1 | 3.5 | 17.3 | — | — |

Control experiments for both functionalization routes were conducted by adding chlorobenzene, instead of the analogous diazonium salt or aniline derivative, to the reduced graphene nanoribbon surfactant suspension. The typical workup procedure was then followed and XPS analysis was performed to ensure that the Cl detected from the functionalization reactions was due to covalent attachment as opposed to physisorption and intercalation of chlorinated material between reduced graphene nanoribbon layers. XPS analysis of the control sample detected <0.1% atomic concentration of Cl present at 200 eV. This behavior confirmed that the functionalization was not a physisorption process.

Figure 37A:
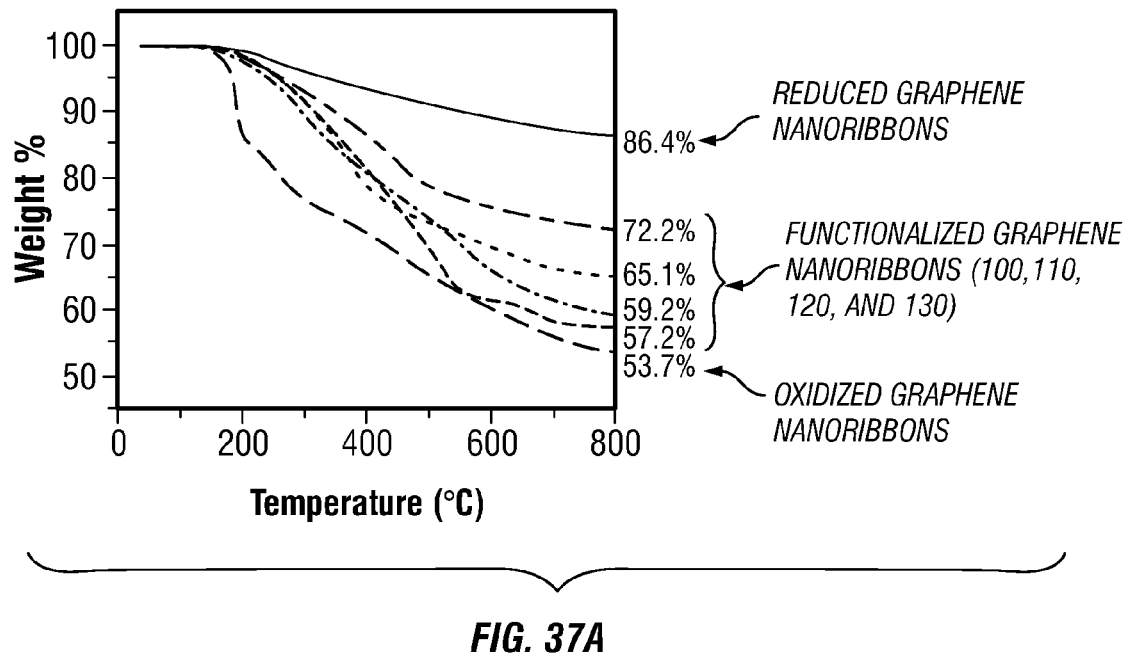
FIGS. 37A and 37B show illustrative TGA weight loss curves for various functionalized graphene nanoribbons.
Figure 37B:
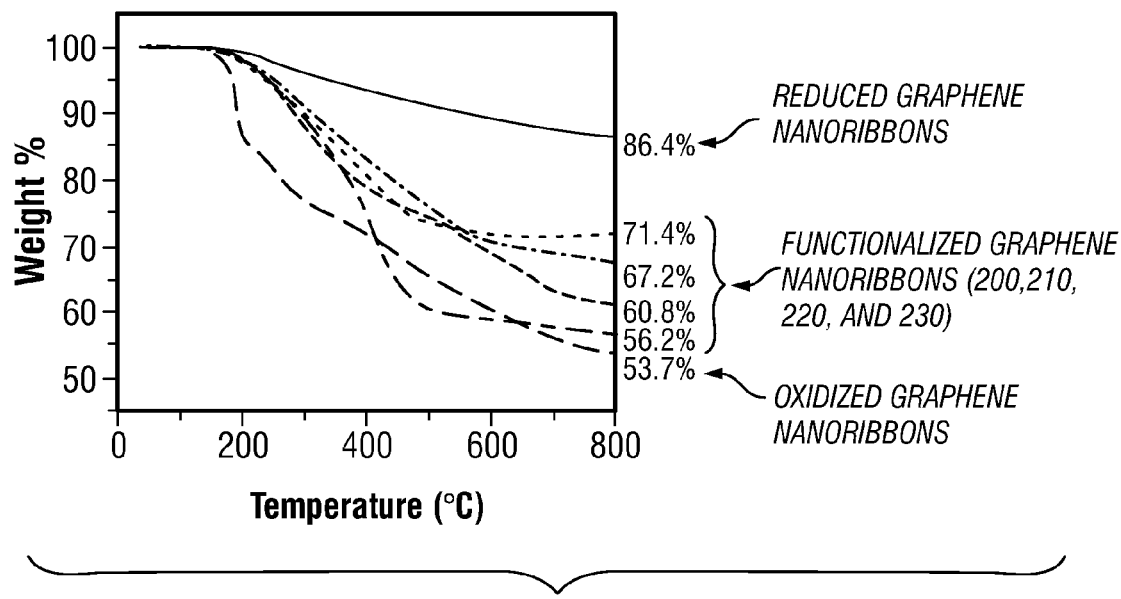

FIGS. 37A and 37B show illustrative TGA weight loss curves for various functionalized graphene nanoribbons (graphene nanoribbons 100, 110, 120, 130, 200, 210, 220, and 230). TGA was used to determine the degree of functionalization of the functionalized graphene nanoribbons by comparing the weight loss of the functionalized graphene nanoribbons to the weight loss of the oxidized graphene nanoribbons and reduced graphene nanoribbons. The TGA weight loss typically varied between 28-44%, which falls in between that of oxidized graphene nanoribbons (46%) and reduced graphene nanoribbons (15%). This behavior indicates that fewer volatile sidewall functionalities were present on the functionalized graphene nanoribbons compared to the oxidized graphene nanoribbon starting materials. Defunctionalization of functionalized graphene nanoribbons was estimated to occur between about 200 and about 700° C. Based on the TGA weight loss data, it is estimated that there is approximately 1 functional group for about every 20 to about every 50 graphene nanoribbon carbons atoms. Furthermore, based on the TGA weight loss data presented in FIG. 37, the two routes for producing functionalized graphene nanoribbons functionalization provided comparable functionalized graphene nanoribbon products.

The $\lambda_{max}$ and relative intensities of the UV-VIS absorption of functionalized graphene nanoribbons indicated that a high degree of π-conjugation was still present in the functionalized graphene nanoribbons. A bathochromic shift of $\lambda_{max}$ and hyperchromicity over the entire spectral range was observed after hydrazine reduction, indicating that electronic conjugation of the oxidized starting ribbons was restored compared to the oxidized graphene nanoribbon starting materials. After functionalization, $\lambda_{max}$ was hypsochromically shifted while the hypochromicity was maintained over the entire range (>230 nm). This behavior indicates that the conjugated system was shortened slightly by covalent attachment of aryl groups introduced by a diazonium moiety. Although the functionalization decreased the aromaticity of the functionalized graphene nanoribbons somewhat relative to reduced graphene nanoribbons, the functionalized graphene nanoribbons were still more conjugated than were the oxidized graphene nanoribbon starting materials.

Figure 38:
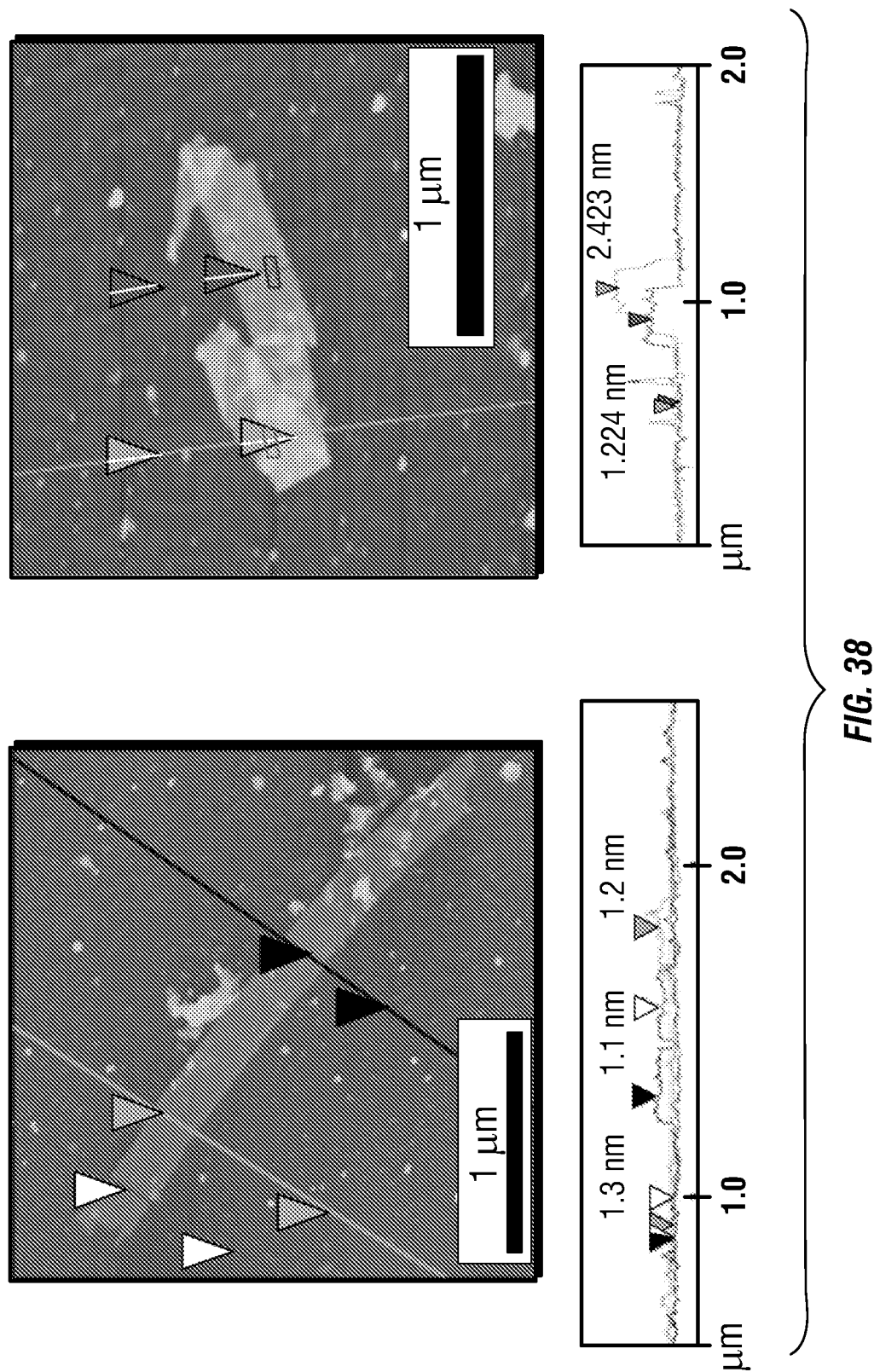
FIG. 38 shows illustrative AFM images of a single-layer functionalized graphene nanoribbon.

FIG. 38 shows illustrative AFM images of functionalized graphene nanoribbons. As shown in FIG. 38, the functionalized graphene nanoribbons were greater than 3 μm in length and formed from a single graphene layer having an average height of about 1.2 nm. In general, the AFM-determined thickness of single layer functionalized graphene nanoribbons was measured to be 1.1-1.5 nm, which is slightly higher than that of reduced graphene nanoribbons (0.75-1.6 nm). It is predicted that single-layer functionalized graphene nanoribbons have increased thicknesses due to a perpendicular orientation of their covalently attached aryl functional groups.

Figure 39:
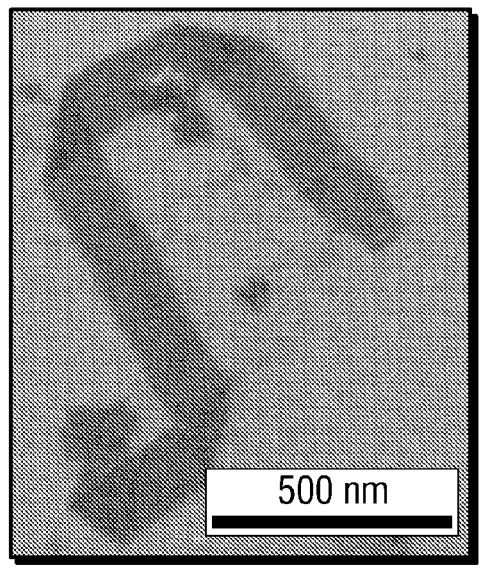
FIG. 39 shows an illustrative SEM image of a single-layer functionalized graphene nanoribbon.
Figure 40:
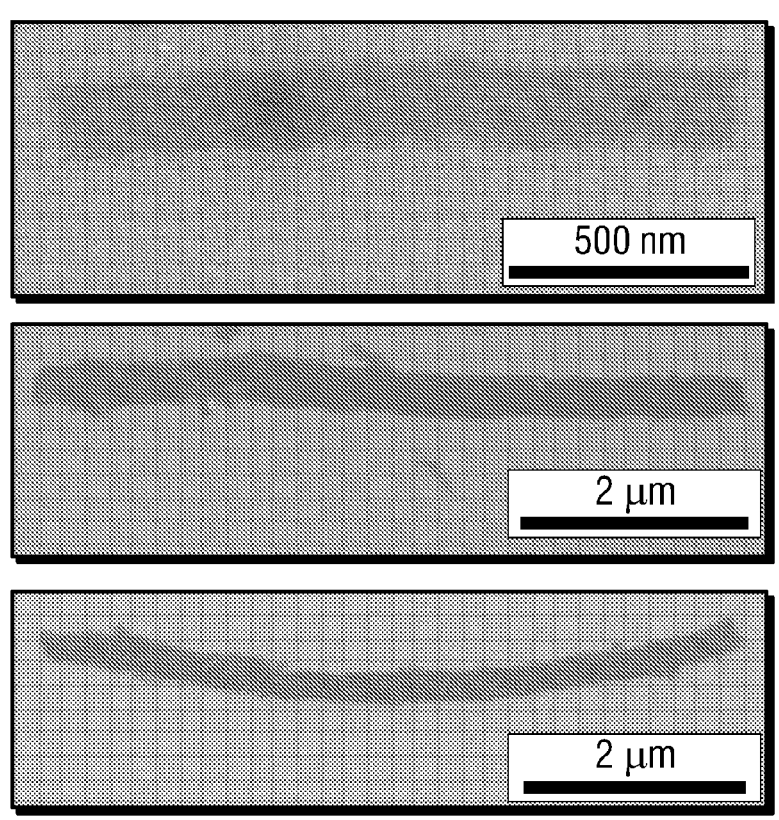
FIG. 40 shows illustrative SEM images of few-layer functionalized graphene nanoribbons.

FIG. 39 shows an illustrative SEM image of a single-layer functionalized graphene nanoribbon. As measured by SEM, the lengths of functionalized graphene nanoribbons typically varied from 1-5 μm with widths ranging from 80-320 nm. These lengths were comparable to those of the parent reduced graphene nanoribbons. For the functionalized single-layer graphene nanoribbon shown in FIG. 39, the length was >2 μm and the width was <200 nm. FIG. 40 shows illustrative SEM images of few-layer functionalized graphene nanoribbons. As shown in FIG. 40, the few-layer functionalized graphene nanoribbons have a roughened appearance due to uneven overlapping of the various graphene layers. For the few-layer functionalized graphene nanoribbons shown in FIG. 40, the lengths were >6 μm and the widths were ~300 nm.

Figure 41:
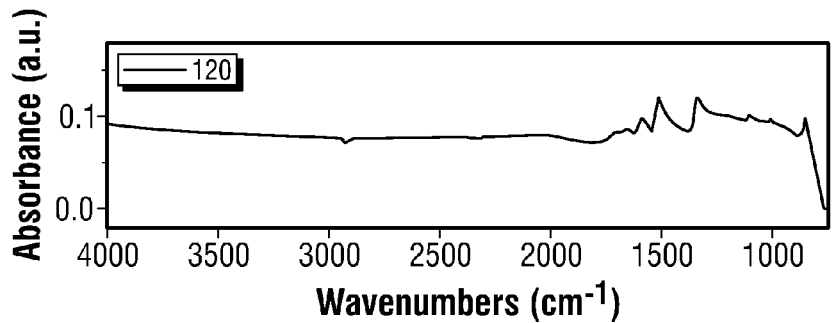
FIG. 41 shows an illustrative ATR-IR spectrum of functionalized graphene nanoribbons (graphene nanoribbon 120)

FIG. 41 shows an illustrative ATR-IR spectrum of functionalized graphene nanoribbons (graphene nanoribbon 120). The IR spectrum showed asymmetric and symmetric stretches at 1520 cm$^{-1}$ and 1340 cm$^{-1}$, respectively, that are attributed to an $NO_2$ group. The peak at 852 cm$^{-1}$ is assigned to the C—N bond stretch. In addition, the aromatic stretch at 1586 cm$^{-1}$ indicates the presence of nitrobenzene moieties on the functionalized graphene nanoribbons.

Figure 42A:
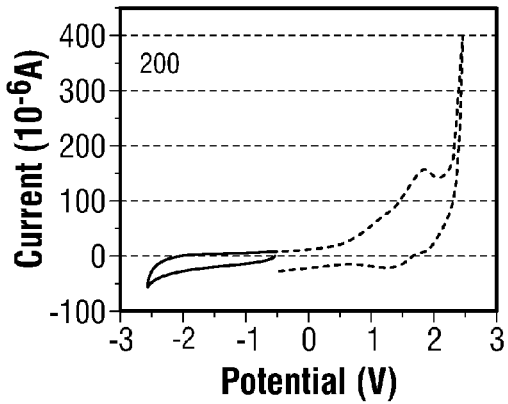
FIGS. 42A-42D show illustrative cyclic voltamograms for functionalized graphene nanoribbons (graphene nanoribbons 200, 210, 220 and 230)
Figure 42B:
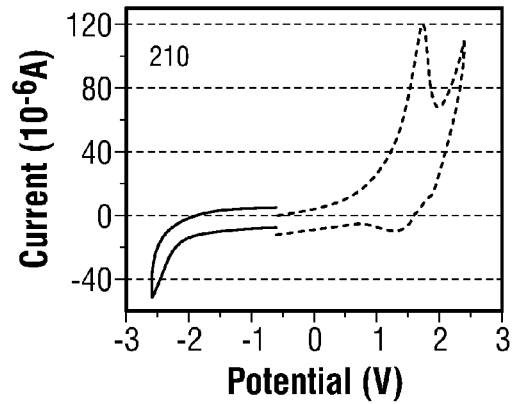
Figure 42C:
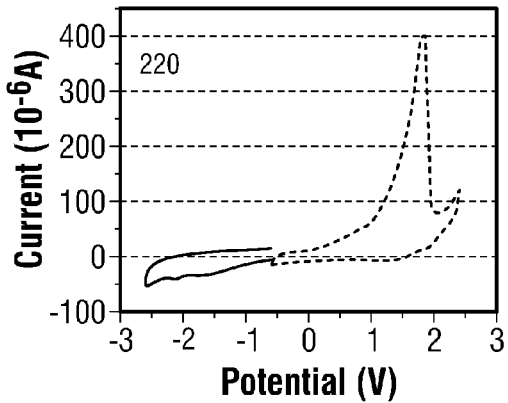
Figure 42D:
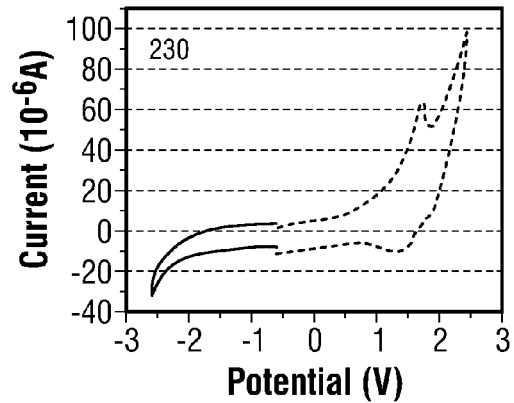

FIGS. 42A-42D show illustrative cyclic voltamograms (CV) for functionalized graphene nanoribbons 200 (FIG. 42A), 210 (FIG. 42B), 220 (FIG. 42C) and 230 (FIG. 42D). The onset potential can be determined from the intersection of two tangents drawn at the rising and background current of the CV. All of the functionalized graphene nanoribbons exhibited oxidative response between 0.84 V and 1.35 V (vs. ferrocenium/ferrocene, Fc+/Fc), while the reductive response could not be observed even under an air-free environment. This behavior is consistent with the functionalized graphene nanoribbons being in a reduced state.

The functionalized graphene nanoribbons were readily dispersable in DMF and NMP with solubilities up to 1 mg/mL. The measured solubilities of the functionalized graphene nanoribbons in DMF are shown in Table 3.

TABLE 3

Solubility of Functionalized Graphene Nanoribbons in DMF

| Graphene Nanoribbon | Solubility in DMF (mg/mL) |
| --- | --- |
| 100 | 0.20 |
| 110 | 0.25 |
| 120 | 0.35 |
| 130 | 0.15 |
| 200 | 0.15 |
| 210 | 0.20 |
| 220 | 0.15 |
| 230 | 0.10 |

Example 8

Fabrication of an Illustrative Reduced Graphene Nanoribbon Electronic Device Via SEM Tracking and Electron Beam Lithography Fabrication of an illustrative reduced graphene nanoribbon electronic device was performed by tracking individual reduced graphene nanoribbons on the surface of a highly doped Si substrate (covered with a 200-nm-thick $SiO_2$ dielectric) by SEM (JEOL-6500 microscope). Thereafter, patterning of 20-nm-thick Pt contacts by standard electron beam lithography was conducted. The device was further annealed in $H_2$/Ar (1:1, <1 atm) at 300° C. for 10 min. Electrical properties were tested using a probe station (Desert Cryogenics TT-probe 6 system) under vacuum with a chamber base pressure below $10^{-5}$ mm Hg. Current-voltage data were collected using an Agilent 4155C semiconductor parameter analyzer.

Example 9

Fabrication of an Illustrative Reduced Graphene Nanoribbon Electronic Device Starting from a Carbon Nanotube Electronic Device MWNTs were first ultrasonically dispersed into chloroform, and then the dispersion was spin-coated on to 200-nm oxide/silicon substrates as individual nanotubes. Electronic devices were then fabricated by e-beam lithography atop the isolated MWNTs using platinum (Pt) films as electrodes.

The electrode-bound MWNTs were then prepared for longitudinal opening. In a typical protocol, concentrated $H_2SO_4$ (10 mL) in a bottle was placed in an oil bath at 55° C., and then $KMnO_4$ (100 mg, 0.63 mmol) was added. After the mixture was stirred to produce a solution, the fabricated MWNT electronic devices were then immersed in the hot solution. Following a 90 min reaction time, the electronic devices were removed, rinsed with deionized water and dried in a gentle nitrogen gas flow. In order to reduce the resultant oxidized graphene nanoribbon devices, the samples were then heated at 350° C. for 6 h under $H_2$ and Ar.

Figure 43:
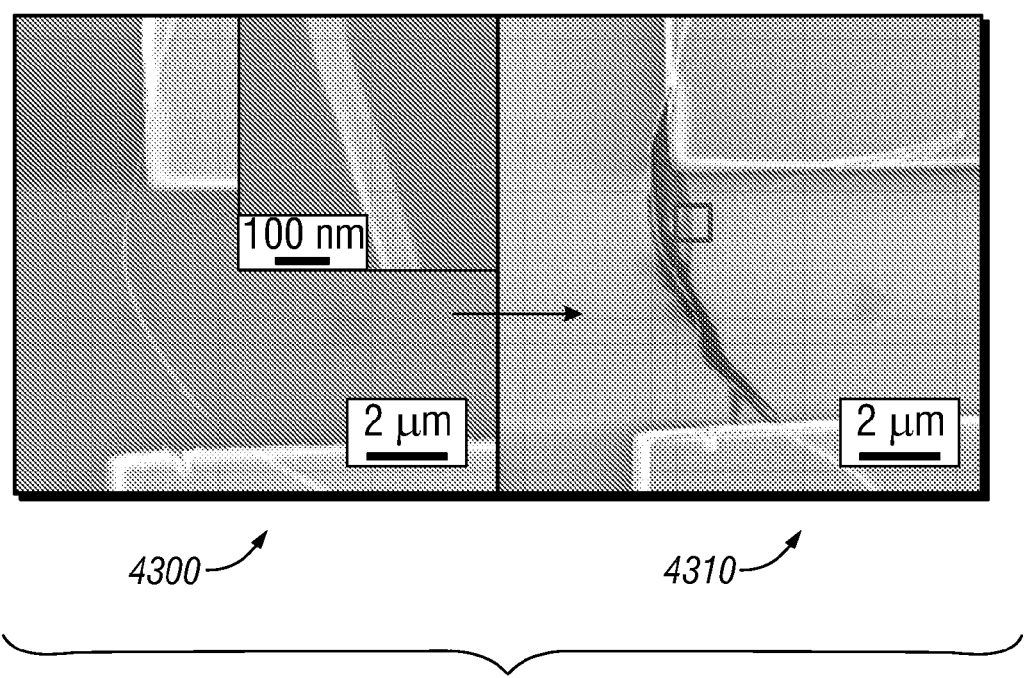
FIG. 43 shows illustrative SEM images demonstrating the transformation of a MWNT electronic device into an oxidized graphene nanoribbon electronic device.

FIG. 43 shows illustrative SEM images demonstrating the transformation of a MWNT electronic device 4300 into an oxidized graphene nanoribbon electronic device 4310. Oxidized graphene nanoribbon electronic device 4310 can be further transformed into reduced graphene nanoribbon electronic device as set forth above. The SEM image of FIG. 43 shows that the MWNT of the MWNT electronic device 4300 was tens of nm in width between the two electrodes before longitudinal opening. After treatment with $KMnO_4$ in $H_2SO_4$, the oxidized graphene nanoribbons between the two electrodes were hundreds of nm in width. At either end nearest the electrodes in oxidized graphene nanoribbon electronic device 4310, the MWNTs partially or wholly retained their structure. The structure is similar to a graphene nanoribbon with both ends closed into cylinders. The portions of the MWNTs under the Pt electrodes were protected from the conditions of longitudinal opening, thereby preserving the electrical contact between the electrodes and the MWNTs. Tapping mode AFM showed that the thickness of the oxidized graphene nanoribbons produced on the surface was 0.9 nm, which is close to the thickness of a single graphene layer.

Figure 44:
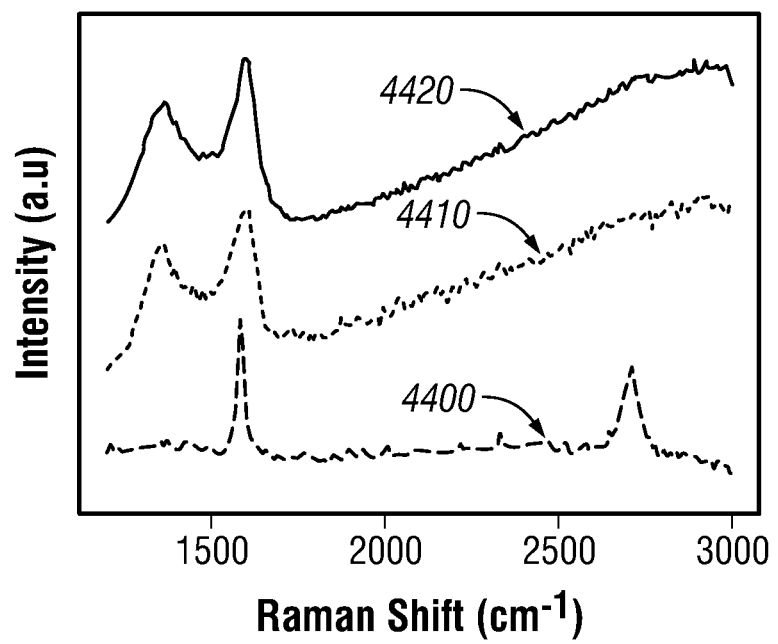
FIG. 44 shows illustrative Raman spectra of electronic devices containing carbon nanotubes, oxidized graphene nanoribbons and reduced graphene nanoribbons.

FIG. 44 shows illustrative Raman spectra of electronic devices containing carbon nanotubes (spectrum 4400), oxidized graphene nanoribbons 4410 (spectrum 4410) and reduced graphene nanoribbons (spectrum 4420). The 2D (~2715 $cm^{-1}$) band in the Raman spectrum of the MWNT electronic device disappeared after longitudinal opening, and a large D band appeared at ~1363 $cm^{-1}$. This phenomenon is the inverse of the process that graphitizes MWNTs, indicating that the MWNT structure was destroyed in the longitudinal opening. The high D band in the Raman spectrum of the reduced graphene nanoribbon electronic device (spectrum 4420) indicates that the carbon material still includes significant $sp^3$-hybridized sites. Comparing the Raman spectrum of the oxidized graphene nanoribbon electronic device (spectrum 4410) and the thermally reduced graphene nanoribbon electronic device (spectrum 4420), produced no apparent difference between the two Raman spectra. Although the Raman spectra are not distinguishable, thermal reduction of the oxidized graphene nanoribbon electronic devices led to significant improvements in the electrical conductivity.

Figure 45:
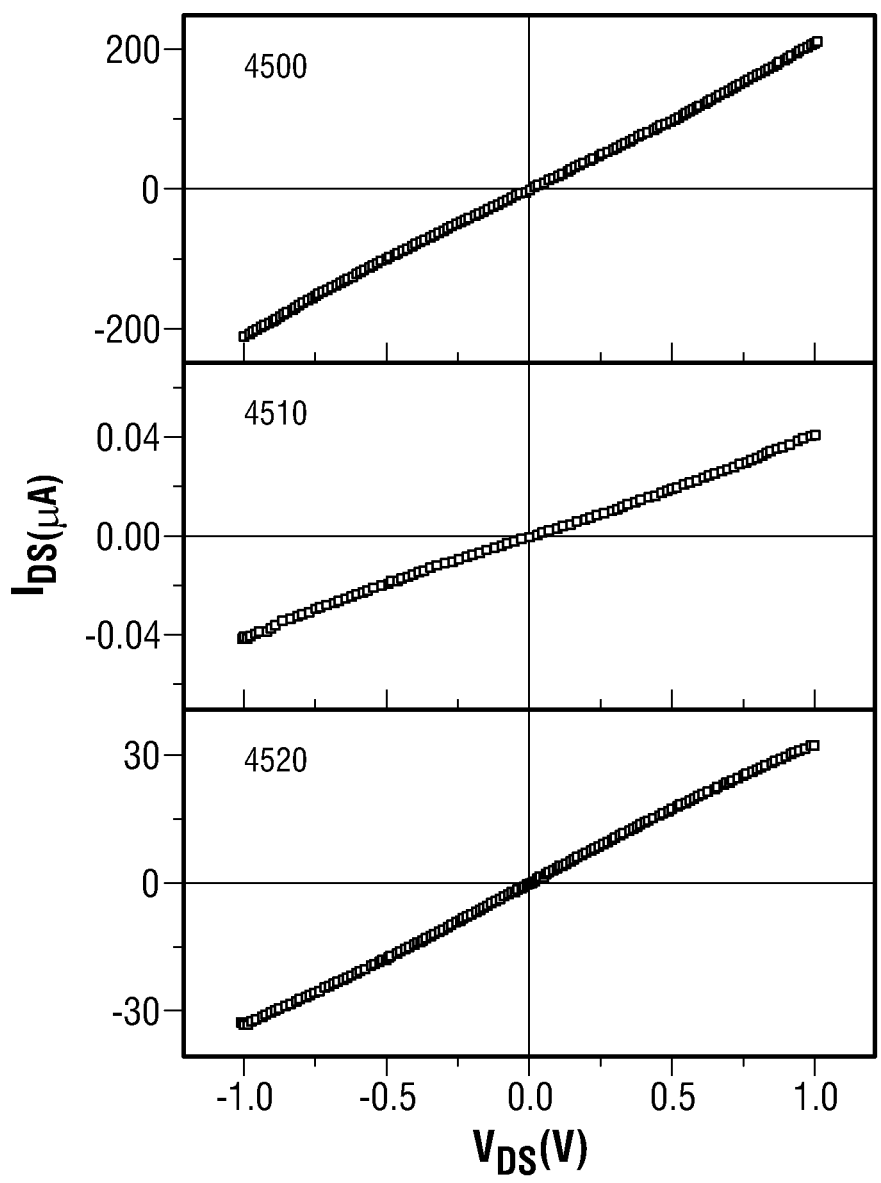
FIG. 45 shows illustrative current versus voltage plots for MWNT electronic devices, oxidized graphene nanoribbon electronic devices and reduced graphene nanoribbon electronic devices.

The electrical properties of the electronic devices were changed by the longitudinal opening process. FIG. 45 shows illustrative current versus voltage plots for MWNT electronic devices (curve 4500), oxidized graphene nanoribbon electronic devices (curve 4510) and reduced graphene nanoribbon electronic devices (curve 4520). Changes in the electrical properties are due to changes in the MWNT structure to form a graphene nanoribbon, since the contacts between the electrodes are not apparently altered (see FIG. 43). The MWNT electronic device (curve 4500) showed excellent metal conductivity before the MWNT was longitudinally opened. In contrast, the oxidized graphene nanoribbon electronic device (curve 4510) exhibited relatively poor conductivity, as expected. The decrease in conductivity was almost 4 orders of magnitude. Thermal treatment of the oxidized graphene nanoribbon electronic device improved the conductivity of the reduced graphene nanoribbon device (curve 4520) to about 1 order of magnitude less than that of the MWNT electronic device (curve 4500).

Figure 46:
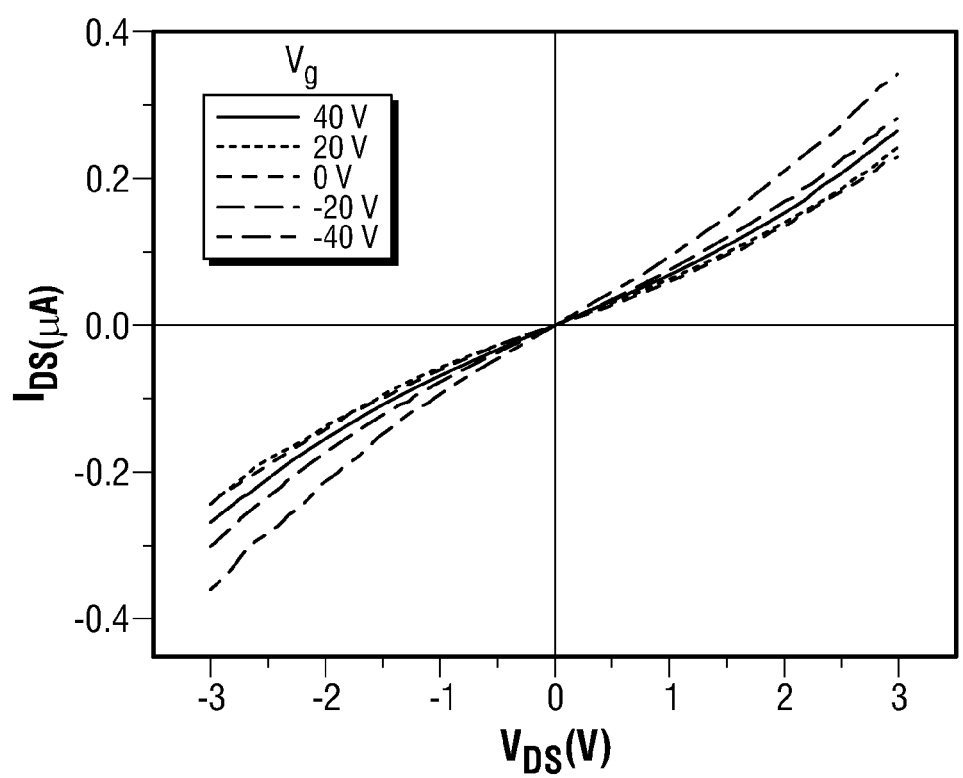
FIG. 46 shows illustrative current versus voltage curves for oxidized graphene nanoribbon electronic devices in the presence of various gate voltages from −40 to +40 V.
Figure 47:
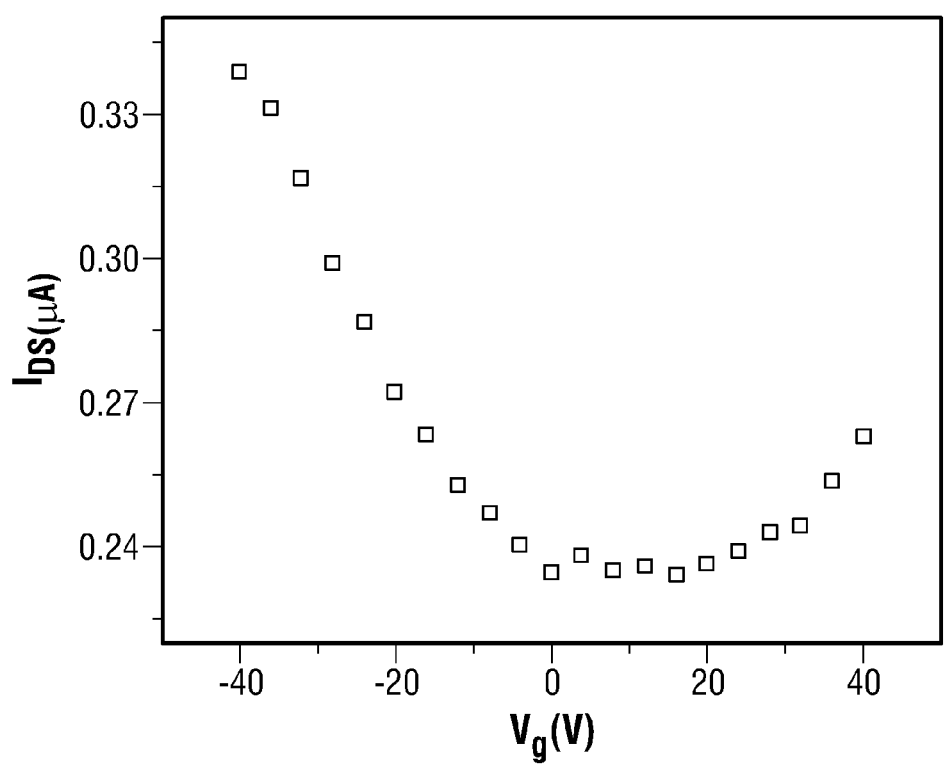
FIG. 47 shows an illustrative current versus voltage curve for oxidized graphene nanoribbons at a bias voltage of 3V.

FIG. 46 shows illustrative current versus voltage curves for oxidized graphene nanoribbon electronic devices in the presence of various gate voltages from −40 to +40 V. FIG. 47 shows an illustrative current versus voltage curve for oxidized graphene nanoribbons at a bias voltage of 3V. Based on FIG. 46, the oxidized graphene nanoribbon electronic devices appear to behave as semiconductors. For example, the current versus voltage behavior of FIG. 46 showed slight non-linearity, which is a characteristic of a semiconductor. Furthermore, a gradual increase of the negative gate voltage led to a decrease in conductivity, which is a typical characteristic of a p-type FET. At the gate voltage of about 0 V, the conductivity declined dramatically, and at high positive gate voltages the FET was converted from a p-type to n-type.

Example 10

Fabrication of an Illustrative Reduced Graphene Nanoribbon Electronic Device Starting from Reduced Graphene Nanoribbons in Solution A droplet of a dilute solution of reduced graphene nanoribbons was placed on to a Si/SiO$_2$ substrate and was spread by repeating unidirectional strokes of a soft paintbrush while the sample was drying on the surface. The brush stroke direction was away from the painter. After drying, the substrate was washed with a strong stream of deionized water in the same direction as the brushing was conducted. Fabrication of reduced graphene nanoribbon electronic devices was performed by tracking individual reduced graphene nanoribbons on the surface of the Si/SiO$_2$ substrates, followed by patterning of 20-nm-thick Pt contacts by standard electron beam lithography. In some instances, the reduced graphene nanoribbons were further reduced with hydrogen at 300° C. or 900° C. after being deposited on the substrate surface. FIG. 11 show an illustrative schematic of the painting technique used to deposit the reduced graphene nanoribbons on the substrate.

Figure 48:
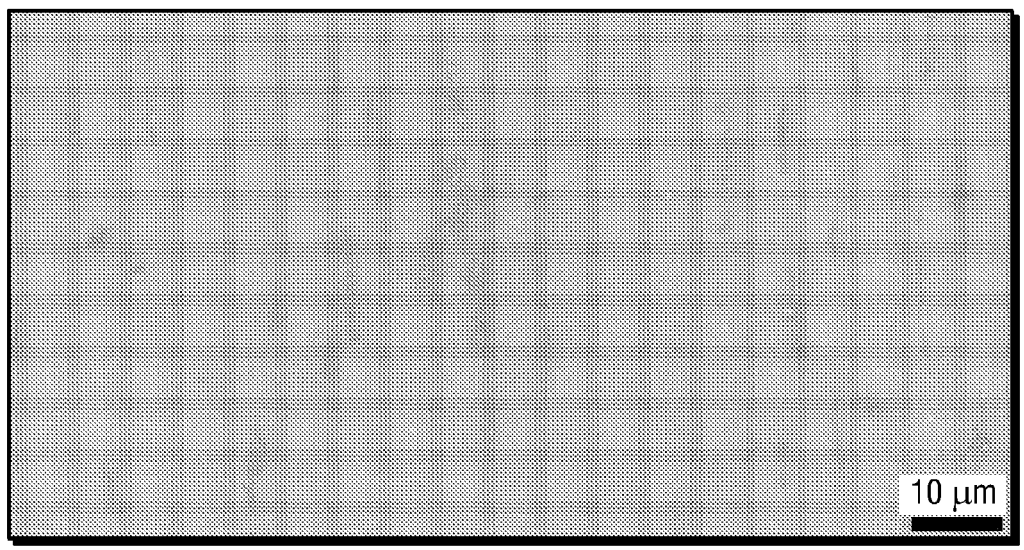
FIG. 48 shows an SEM image of an illustrative reduced graphene nanoribbon electronic device produced by brushing a solution of reduced graphene nanoribbons on to a Si/SiO$_2$ substrate.

Characterization. FIG. 48 shows an SEM image of an illustrative reduced graphene nanoribbon electronic device produced by brushing a solution of reduced graphene nanoribbons on to a Si/SiO$_2$ substrate to form the device. As shown in FIG. 48, the brushing technique produced substantial alignment of the reduced graphene nanoribbons on the substrate.

Figure 49A:
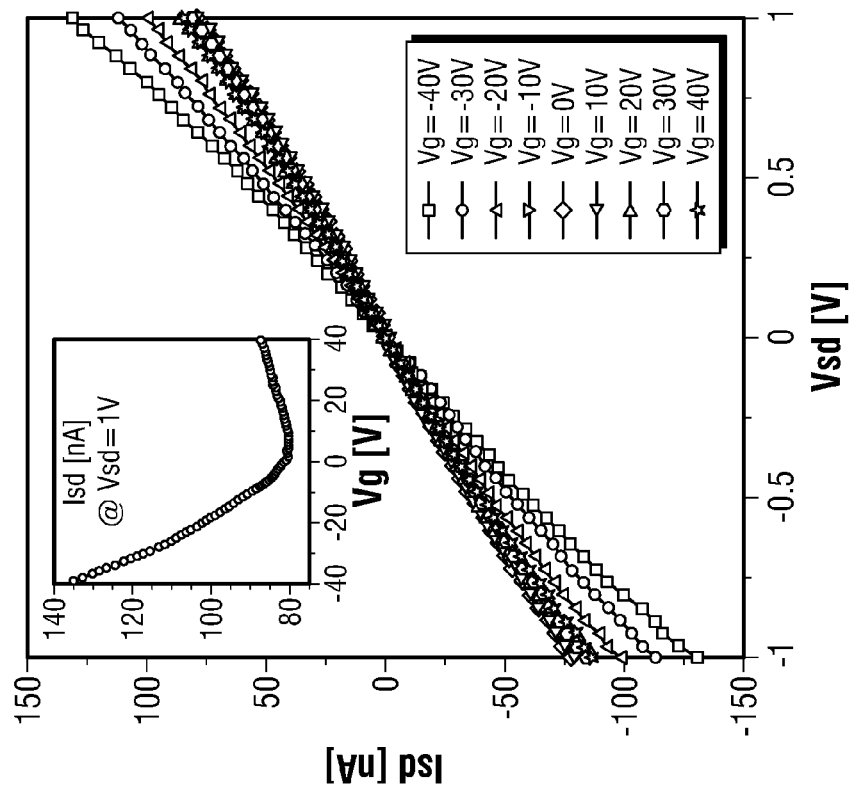
FIGS. 49A and 49B show illustrative current versus voltage plots for hydrazine-reduced graphene nanoribbon electronic devices (FIG. 49A) and hydrogen-reduced graphene nanoribbon electronic devices (FIG. 49B) in the presence of various gate voltages from −40 to +40 V.
Figure 49B:
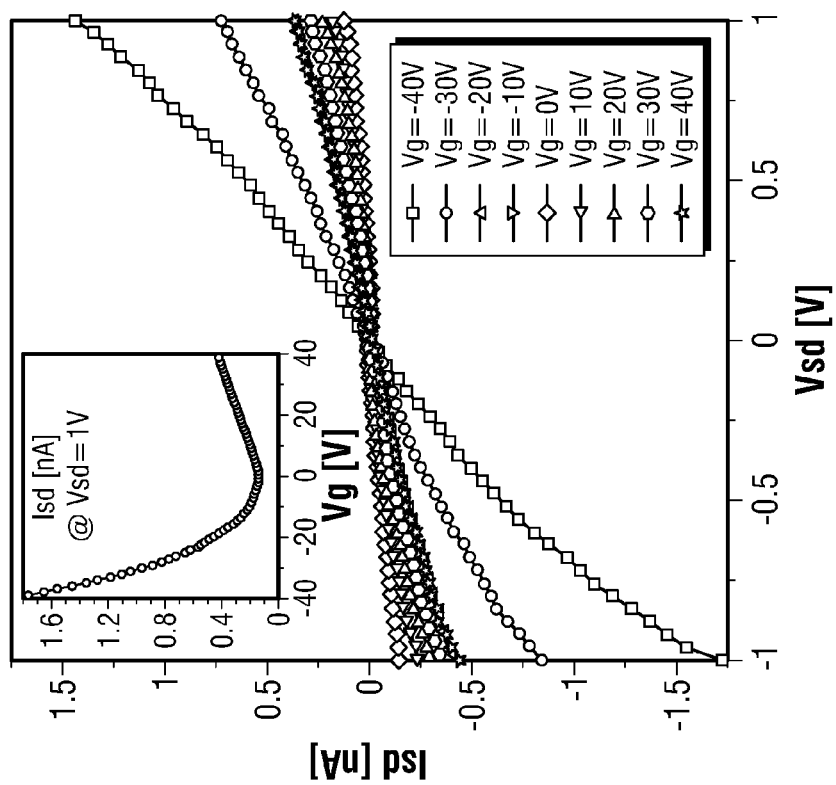
Figure 50:
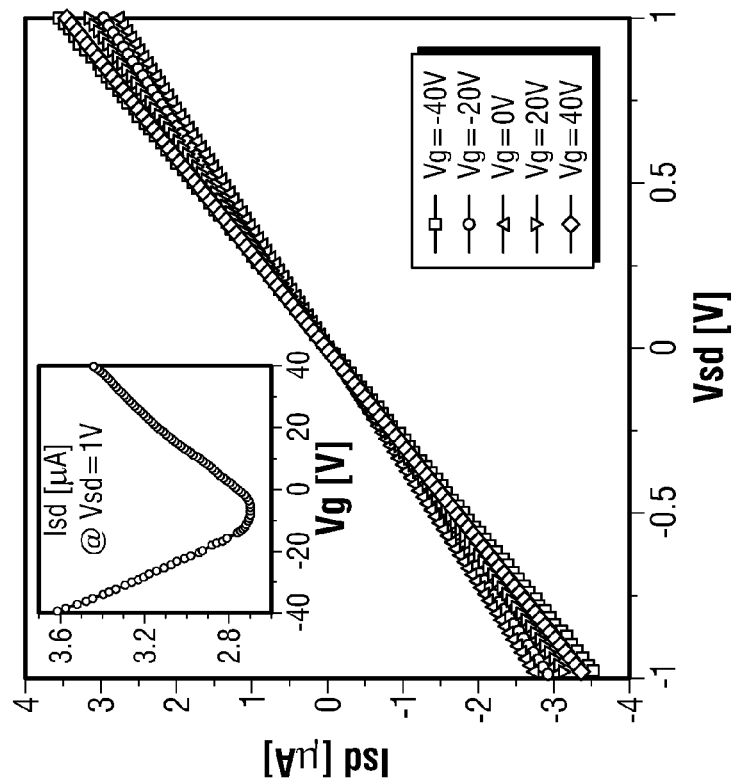
FIG. 50 shows illustrative current versus voltage plots for hydrogen-reduced graphene nanoribbon electronic devices at various gate voltages (−40 to +40 V) in which the reduction was conducted at 900° C.

FIGS. 49A and 49B present illustrative current versus voltage plots for hydrazine-reduced graphene nanoribbon electronic devices (FIG. 49A) and hydrogen-reduced graphene nanoribbon electronic devices (FIG. 49B) in the presence of various gate voltages. The hydrogen reduction was conducted at 300° C. Each curve represents the average of >20 reduced graphene nanoribbon electronic devices. As shown in FIGS. 49A and 49B, the electrical properties were qualitatively the same before and after hydrogen treatment, although the conductivity increased 10- through 100-fold by reduction in hydrogen. FIG. 50 shows illustrative current versus voltage plots for hydrogen-reduced graphene nanoribbon electronic devices at various gate voltages in which the reduction was conducted at 900° C. As shown in FIG. 50, the conductivity of the reduced graphene nanoribbons in the electronic devices was even higher than when the hydrogen reduction was carried out at 300° C. In the reduced graphene nanoribbon electronic device shown in FIG. 50, the source-drain distance is ~500 nm, and the reduced graphene nanoribbon width is ~250 nm.

Figure 51:
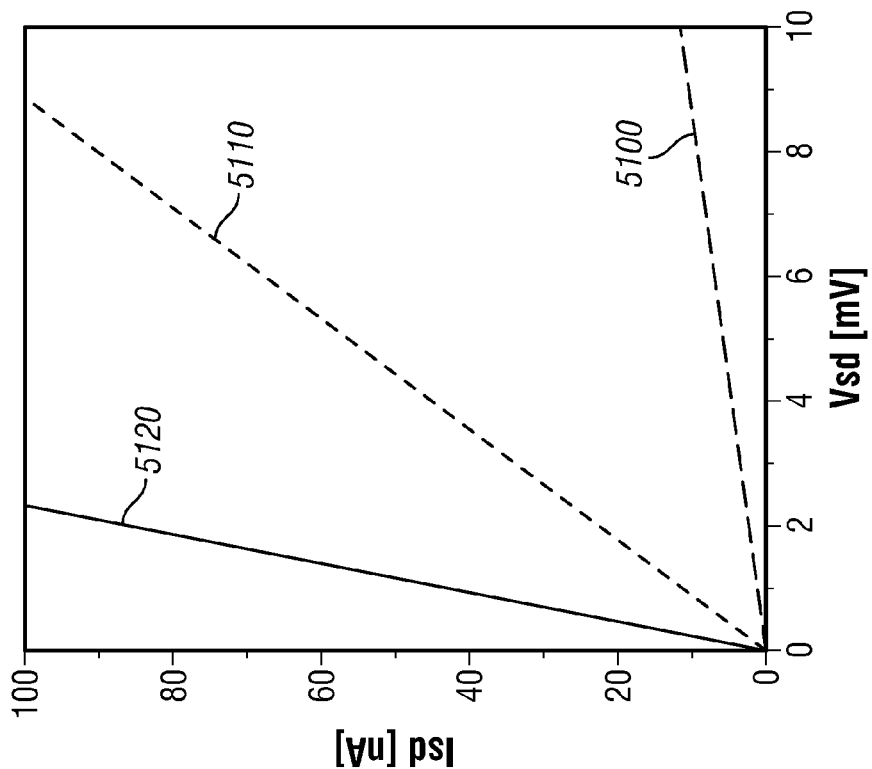
FIG. 51 shows an illustrative current versus voltage plot for hydrogen-reduced graphene nanoribbon electronic devices constructed from reduced graphene nanoribbons having variable numbers of graphene layers.

FIG. 51 shows an illustrative current versus voltage plot for hydrogen-reduced graphene nanoribbon electronic devices constructed from reduced graphene nanoribbons having variable numbers of graphene layers. For example, current versus voltage plots are shown for reduced graphene nanoribbon electronic devices having one graphene layer (curve 5100), two graphene layers (curve 5110) and three graphene layers (curve 5120). The conductivity results shown in FIG. 51 are the average of measurement from >10 similarly constructed devices. As shown in FIG. 51, the conductivity of bilayer reduced graphene nanoribbons was significantly higher than monolayer reduced graphene nanoribbons (~300 S/cm; about 10 times higher). Without being bound by theory, it is believed that the conductivity in curve 5110 is not simply double that in curve 5100 due to strong interaction of the bottom graphene nanoribbon layer with the substrate which reduces the conductivity. Referring still to FIG. 51, three-layer reduced graphene nanoribbons exhibited an average conductivity of about 1000 S/cm as shown in curve 5120. This continued increase in conductivity in curve 5120 suggests that conduction in the upper layer of bilayer reduced graphene nanoribbons also has its conductivity somewhat suppressed by interaction with the substrate. Again not being bound by theory, this behavior can be rationalized, in part, by the fact that the top and bottom layers of bilayer reduced graphene nanoribbons may not exactly coincide since they originate from different shells of MWNTs. Therefore, a portion of the top layer of a bilayer reduced graphene nanoribbon structure may also be in contact with the substrate.

Figure 52:
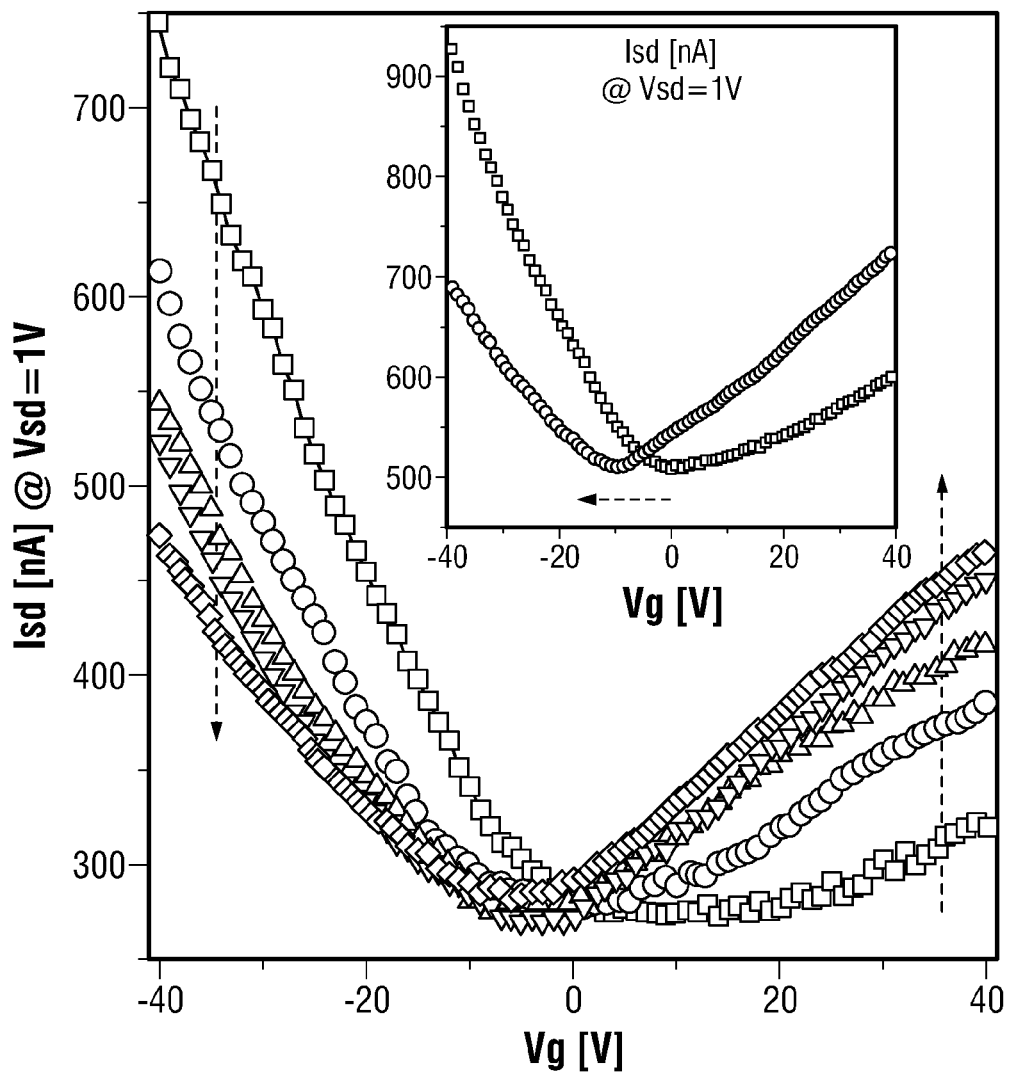
FIG. 52 shows illustrative current versus voltage plots for a monolayer hydrogen-reduced graphene nanoribbon electronic device in the presence of various gate voltages showing the effect of gas doping on the electrical properties.

Gas-Sensing Properties. FIG. 52 shows illustrative current versus voltage plots for a monolayer hydrogen-reduced graphene nanoribbon electronic device in the presence of various gate voltages demonstrating the effect of gas doping on the electrical properties. The current versus voltage plots of FIG. 52 were obtained a few minutes after pumping down the probe station and then repeated several times thereafter (12 h, 24 h, 48 h, 72 h). The arrows in FIG. 52 indicate the direction of increased evacuation times. The first measurement obtained after a few minutes of evacuation showed that the reduced graphene nanoribbons in the electronic device were p-type semiconductors. However, at longer evacuation periods, the reduced graphene nanoribbons in the electronic device started exhibiting an ambipolar field effect, as hole conductivity decreased and electron conductivity increased. After 12 h of evacuation, the hole conductivity was still higher than the electron conductivity, but as the trend continued for 2 d, the transfer characteristic curve became more symmetrical. This effect was completely reversible, since the reduced graphene nanoribbon electronic device again showed p-type semiconductor behavior after exposure to ambient conditions.

Without being bound by theory, the variable electrical properties after extended evacuation can be explained by adsorption of acceptor molecules from the air (for example, water, oxygen, nitrogen or carbon dioxide), on to the reduced graphene nanoribbons and their gradual desorption in vacuum. This adsorbate-induced p-doping did not significantly alter the conductance at the neutrality point (minimum conductance point), although the neutrality point shifted to more negative gate voltages with the desorption of the acceptor molecules from the reduced graphene nanoribbons (see FIG. 52, inset). Such reversibility of the field effect in the presence of acceptor molecules enables the use of reduced graphene nanoribbon electronic devices for making ultra-compact gas sensors.

Non-Volatile Memory Properties. Two-terminal electronic devices containing a discontinuous graphene layer bridging two electrodes have been reported to exhibit non-volatile memory behavior. For example, such two-terminal electronic devices are described in commonly assigned PCT publications WO 2009/043023 and WO 2009/064842, each of which are incorporated by reference herein in their entirety. At a relatively high voltage, a small crack (a few nm wide) forms along the discontinuous graphene layer. The conduction through this junction can be further modulated by applying certain electrical pulses to provide the non-volatile memory behavior.

Figure 53:
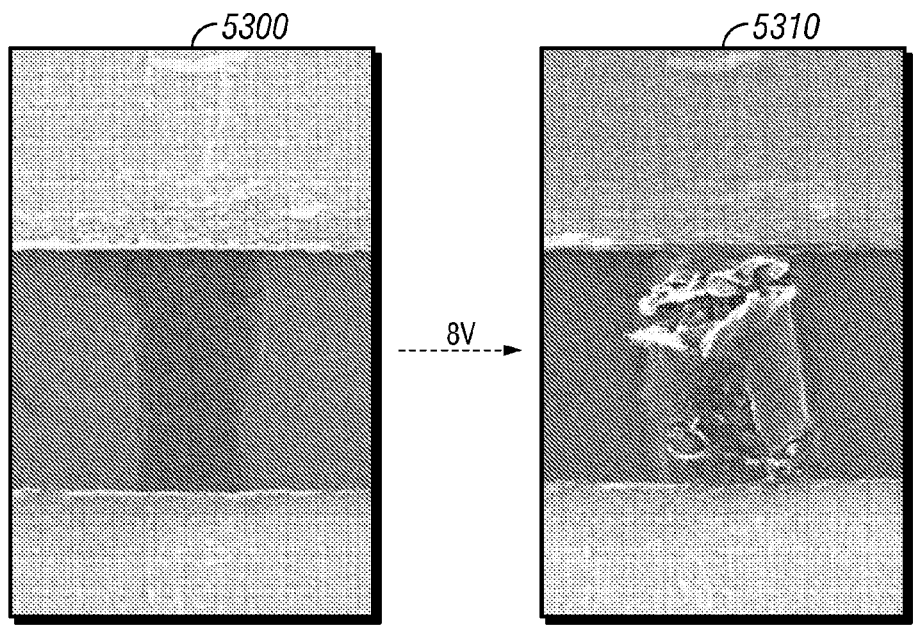
FIG. 53 shows an illustrative TEM image of a two-terminal reduced graphene nanoribbon electronic device in which cracking has occurred in the continuous reduced graphene nanoribbon layer between the electrode terminals.
Figure 54:
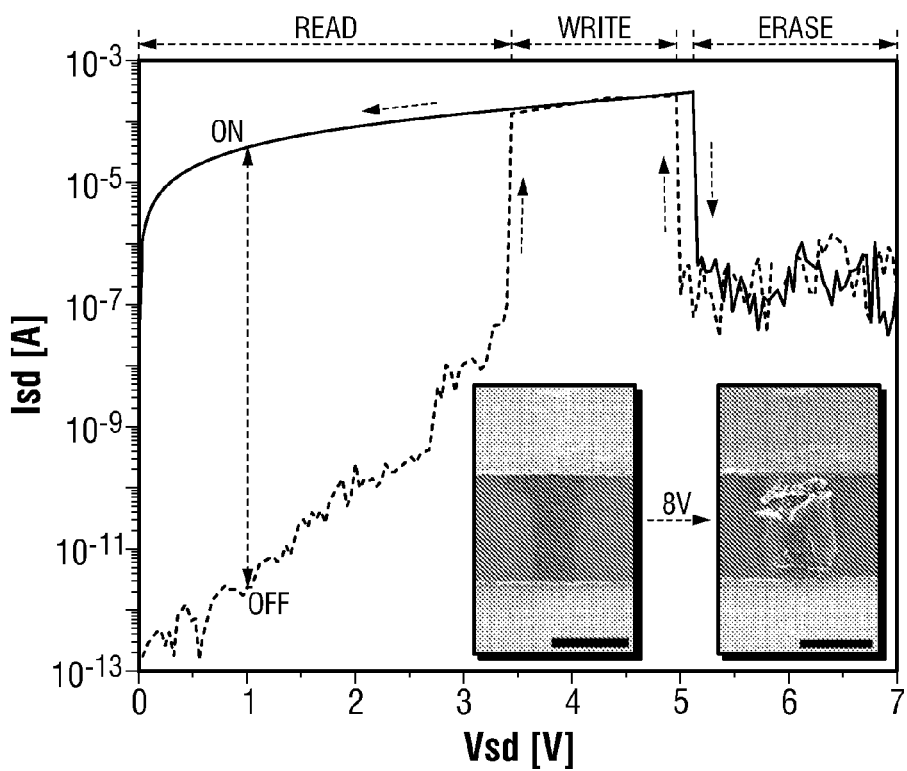
FIG. 54 shows an illustrative current versus voltage plot for a two-terminal reduced graphene nanoribbon electronic device, following a pulse of 8 V.
Figure 55:
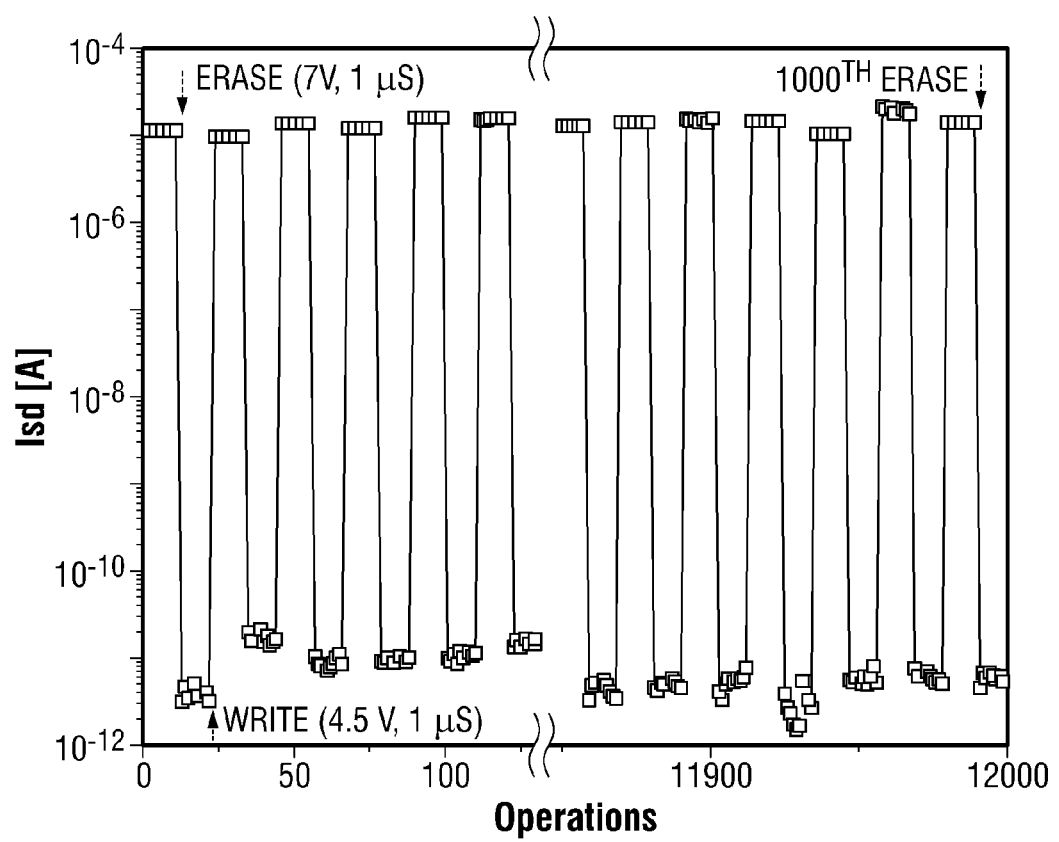
FIG. 55 shows an illustrative plot demonstrating the memory behavior of a reduced graphene nanoribbon electronic device over 1000 write/read/erase cycles.

Similar cracking behavior was observed in two-terminal reduced graphene nanoribbon electronic devices, and similar memory behavior was observed. Unlike the two-terminal electronic devices referenced above, however, the reduced graphene nanoribbon electronic devices are constructed from a continuous graphene nanoribbon layer. FIG. 53 shows illustrative TEM images of a two-terminal reduced graphene nanoribbon electronic device before (image 5300) and after (image 5310) cracking has occurred in the continuous reduced graphene nanoribbon layer between the electrode terminals. Expansion of the graphene layers was observed after cracking. FIG. 54 shows an illustrative current versus voltage plot for a two-terminal reduced graphene nanoribbon electronic device, following a pulse of 8 V. As shown in FIG. 54, cracking of the reduced graphene nanoribbon layer resulted in reduced conductivity. After an 8 V pulse to crack the graphene layer, the reduced graphene nanoribbon electronic device was in a low conduction state. Upon raising the voltage, the conduction increased sharply at 3.5 V before dropping again at 5 V. Forward and backwards scans did not retrace each other. The reduced graphene nanoribbon electronic device had an ON/OFF ratio of >$10^6$. The high- and low-conduction states of device were achieved through the voltage pulses in the "Write" and "Erase" regions, respectively. FIG. 55 shows an illustrative plot demonstrating the memory behavior of reduced graphene nanoribbon electronic devices over 1000 write/read/erase cycles. The write/read/erase cycles were conducted with 10 reads, 1 erase, followed by 10 more reads. No observable change in performance was observed in the memory properties.

From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure, which is defined in the following claims.

What is claimed is the following:

1. A method for preparing oxidized graphene nanoribbons, said method comprising:
   providing a plurality of carbon nanotubes; and
   reacting the plurality of carbon nanotubes with at least one oxidant;
   wherein the reacting occurs under conditions where the at least one oxidant longitudinally opens the carbon nanotubes by breaking carbon-carbon double bonds along the longitudinal axes of the carbon nanotubes to form oxidized graphene nanoribbons that are structurally intact, and
   wherein each carbon nanotube produces individual oxidized graphene nanoribbon.

2. The method of claim 1, wherein the at least one oxidant comprises a transition metal that mediates a cis oxidation of double bonds of the carbon nanotubes during the reacting step.

3. The method of claim 1, wherein the at least one oxidant is selected from the group consisting of permanganate, ferrate, osmate, ruthenate, chlorate, chlorite, nitrate, osmium tetroxide, ruthenium tetroxide, lead dioxide, and combinations thereof.

4. The method of claim 1, wherein the at least one oxidant comprises potassium permanganate.

5. The method of claim 1, wherein the at least one oxidant is present in at least a stoichiometric amount relative to an amount of carbon in the plurality of carbon nanotubes.

6. The method of claim 1, wherein the at least one oxidant is present in a sub-stoichiometric amount relative to an amount of carbon in the plurality of carbon nanotubes.

7. The method of claim 1, wherein the reacting step occurs in the presence of at least one acid.

8. The method of claim 7, wherein the at least one oxidant comprises potassium permanganate.

9. The method of claim 7, wherein the at least one acid is selected from the group consisting of oleum, sulfuric acid, chlorosulfonic acid, fluorosulfonic acid, trifluoromethanesulfonic acid, and combinations thereof.

10. The method of claim 7, wherein the reacting step occurs in the presence of at least one protective agent.

11. The method of claim 10, wherein the at least one oxidant comprises potassium permanganate.

12. The method of claim 10, wherein the at least one protective agent is selected from the group consisting of trifluoroacetic acid; phosphoric acid; orthophosphoric acid; metaphosphoric acid; polyphosphoric acid; boric acid; trifluoroacetic anhydride; phosphoric anhydride; orthophosphoric anhydride; metaphosphoric anhydride; polyphosphoric anhydride; boric anhydride; mixed anhydrides of trifluoroacetic acid, phosphoric acid, orthophosphoric acid, metaphosphoric acid, polyphosphoric acid, and boric acid; and combinations thereof.

13. The method of claim 10, further comprising: reacting the oxidized graphene nanoribbons with at least one reducing agent to form reduced graphene nanoribbons.

14. The method of claim 13, wherein the step of reacting the oxidized graphene nanoribbons with at least one reducing agent is conducted in the presence of at least one surfactant.

15. The method of claim 13, wherein the step of reacting the oxidized graphene nanoribbons with at least one reducing agent is conducted on a surface.

16. The method of claim 13, wherein the at least one reducing agent is selected from the group consisting of hydrazines, iodides, phosphines, phosphites, sulfides, sulfites, hydrosulfites, borohydrides, cyanoborohydrides, aluminum hydrides, boranes, hydroxylamine, diimine, lithium aluminum hydride, hydrogen, and combinations thereof.

17. The method of claim 13, wherein the at least one reducing agent comprises hydrazine.

18. The method of claim 7, further comprising: reacting the oxidized graphene nanoribbons with at least one reducing agent to form reduced graphene nanoribbons.

19. The method of claim 18, wherein the step of reacting the oxidized graphene nanoribbons with at least one reducing agent is conducted in the presence of at least one surfactant.

20. The method of claim 18, wherein the step of reacting the oxidized graphene nanoribbons with at least one reducing agent is conducted on a surface.

21. The method of claim 18, wherein the at least one reducing agent is selected from the group consisting of hydrazines, iodides, phosphines, phosphites, sulfides, sulfites, hydrosulfites, borohydrides, cyanoborohydrides, aluminum hydrides, boranes, hydroxylamine, diimine, lithium aluminum hydride, hydrogen, and combinations thereof.

22. The method of claim 18, wherein the at least one reducing agent comprises hydrazine.

23. The method of claim 1, wherein the carbon nanotubes comprise single-wall carbon nanotubes; and
   wherein the oxidized graphene nanoribbons comprise widths less than about 10 nm.

24. The method of claim 10, wherein the carbon nanotubes comprise single-wall carbon nanotubes; and
   wherein the oxidized graphene nanoribbons comprise widths less than about 10 nm.

25. The method of claim 1, wherein the carbon nanotubes comprise multi-wall carbon nanotubes; and
wherein a majority of the oxidized graphene nanoribbons have widths greater than about 100 nm.

26. The method of claim 10, wherein the carbon nanotubes comprise multi-wall carbon nanotubes; and
wherein a majority of the oxidized graphene nanoribbons have widths greater than about 10 nm.

27. The method of claim 1, further comprising: functionalizing the oxidized graphene nanoribbons with a plurality of polymers.

28. The method of claim 1, wherein the plurality of carbon nanotubes comprise an array of vertically-aligned carbon nanotubes.

29. A method for preparing oxidized graphene nanoribbons, said method comprising:
providing a plurality of multi-wall carbon nanotubes; and
reacting the plurality of multi-wall carbon nanotubes with at least one oxidant in the presence of at least one acid;
wherein the reacting occurs under conditions where the at least one oxidant longitudinally opens the multi-wall carbon nanotubes by breaking carbon-carbon double bonds along the longitudinal axes of the multi-wall carbon nanotubes to form oxidized graphene nanoribbons that are structurally intact, and
wherein each multi-wall carbon nanotube produces individual oxidized graphene nanoribbon.

30. The method of claim 29, wherein the at least one oxidant comprises potassium permanganate and the at least one acid is selected from the group consisting of oleum, sulfuric acid, chlorosulfonic acid, fluorosulfonic acid, trifluoromethanesulfonic acid, and combinations thereof.

31. A method for preparing oxidized graphene nanoribbons, said method comprising:
providing a plurality of multi-wall carbon nanotubes; and
reacting the plurality of multi-wall carbon nanotubes with at least one oxidant in the presence of at least one protective agent and at least one acid;
wherein the reacting occurs under conditions where the at least one oxidant longitudinally opens the multi-wall carbon nanotubes by breaking carbon-carbon double bonds along the longitudinal axes of the multi-wall carbon nanotubes to form oxidized graphene nanoribbons that are structurally intact, and
wherein each multi-wall carbon nanotube produces individual oxidized graphene nanoribbon is.

32. The method of claim 31, wherein the at least one oxidant comprises potassium permanganate, the at least one acid is selected from the group consisting of oleum, sulfuric acid, chlorosulfonic acid, fluorosulfonic acid, trifluoromethanesulfonic acid, and combinations thereof, and the at least one protective agent is selected from the group consisting of trifluoroacetic acid; phosphoric acid; orthophosphoric acid; metaphosphoric acid; polyphosphoric acid; boric acid; trifluoroacetic anhydride; phosphoric anhydride; orthophosphoric anhydride; metaphosphoric anhydride; polyphosphoric anhydride; boric anhydride; mixed anhydrides of trifluoroacetic acid, phosphoric acid, orthophosphoric acid, metaphosphoric acid, polyphosphoric acid, and boric acid; and combinations thereof.

33. The method of claim 31, wherein vicinal diols form on the formed graphene nanoribbons from the oxidant during the reacting step, and wherein the at least one protective agent reacts with the vicinal diols that form during the reacting step.

* * * * *